(12) United States Patent
Klug et al.

(10) Patent No.: US 7,529,725 B1
(45) Date of Patent: *May 5, 2009

(54) WORLD WIDE WEB REGISTRATION INFORMATION PROCESSING SYSTEM

(75) Inventors: John R. Klug, Evergreen, CO (US); Thad D. Peterson, Marietta, GA (US)

(73) Assignee: Registrar Systems LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/032,754

(22) Filed: Jan. 10, 2005

Related U.S. Application Data

(60) Division of application No. 10/411,829, filed on Apr. 10, 2003, now Pat. No. 7,089,224, which is a continuation of application No. 09/884,779, filed on Jun. 19, 2001, now Pat. No. 6,823,327, which is a continuation of application No. 09/128,915, filed on Aug. 4, 1998, now abandoned, which is a continuation of application No. 08/595,837, filed on Feb. 2, 1996, now Pat. No. 5,790,785.

(60) Provisional application No. 60/008,736, filed on Dec. 11, 1995.

(51) Int. Cl.
G06F 17/30 (2006.01)
(52) U.S. Cl. .............................................. 707/1; 713/2
(58) Field of Classification Search .................. 707/1–6, 707/9–10, 100–104; 705/1, 14, 44, 64–67; 713/200–202; 235/2–3, 6–7; 709/200–203, 709/223–232
See application file for complete search history.

(56) References Cited

U.S. PATENT DOCUMENTS

| 4,654,482 A | 3/1987 | DeAngelis |
| 4,755,940 A | 7/1988 | Brachtl et al. |
| 4,766,293 A | 8/1988 | Boston |
| 4,774,663 A | 9/1988 | Musmanno et al. |
| 5,001,628 A | 3/1991 | Johnson et al. |
| 5,235,642 A | 8/1993 | Wobber et al. |

(Continued)

FOREIGN PATENT DOCUMENTS

EP 711090 A2 * 5/1996

(Continued)

OTHER PUBLICATIONS

Baker, "Satellites and Faxes on the Internet", UNIX Review, v11n12, pp. 23-32, Dec. 1993, ISSN: 0742-3136.*

(Continued)

Primary Examiner—Mary Cheung
(74) Attorney, Agent, or Firm—Dorsey & Whitney LLP

(57) ABSTRACT

A World Wide Web registration processing system is disclosed for assisting World Wide Web users in registering at World Wide Web web sites. For each such user, the registration processing system includes a long term repository for the user's web site registration information so that this information can be automatically transferred to a plurality of web sites to which the user may at time to time request to be registered. Further, the registration processing system provides the user with the capability to have a common user identification that may be used for accessing services at a plurality of web sites.

13 Claims, 19 Drawing Sheets

U.S. PATENT DOCUMENTS

| | | | |
|---|---|---|---|
| 5,241,594 A | 8/1993 | Kung | |
| 5,263,158 A | 11/1993 | Janis | |
| 5,305,195 A | 4/1994 | Murphy | |
| 5,319,542 A | 6/1994 | King, Jr. et al. | |
| 5,347,632 A | 9/1994 | Filepp et al. | |
| 5,375,240 A | 12/1994 | Grundy | |
| 5,383,113 A | 1/1995 | Kight et al. | |
| 5,416,842 A | 5/1995 | Aziz | |
| 5,428,778 A | 6/1995 | Brookes | |
| 5,446,919 A | 8/1995 | Wilkins | |
| 5,455,953 A | 10/1995 | Russell | |
| 5,469,576 A | 11/1995 | Dauerer et al. | |
| 5,481,720 A | 1/1996 | Loucks et al. | |
| 5,506,961 A | 4/1996 | Carlson et al. | |
| 5,515,490 A | 5/1996 | Buchanan et al. | |
| 5,544,322 A | 8/1996 | Cheng et al. | |
| 5,572,643 A | 11/1996 | Judson | |
| 5,586,260 A | 12/1996 | Hu | |
| 5,590,197 A | 12/1996 | Chen et al. | |
| 5,592,378 A | 1/1997 | Cameron et al. | |
| 5,604,490 A | 2/1997 | Blakely, III et al. | |
| 5,604,542 A | 2/1997 | Dedrick | |
| 5,606,507 A | 2/1997 | Kara | |
| 5,611,048 A | 3/1997 | Jacobs et al. | |
| 5,619,574 A | 4/1997 | Johnson et al. | |
| 5,627,886 A | 5/1997 | Bowman | |
| 5,642,515 A | 6/1997 | Jones et al. | |
| 5,647,450 A | 7/1997 | Ogawa et al. | |
| 5,657,450 A | 8/1997 | Rao et al. | |
| 5,664,948 A | 9/1997 | Dimitriadis et al. | |
| 5,671,354 A | 9/1997 | Ito et al. | |
| 5,678,041 A | 10/1997 | Baker et al. | |
| 5,682,428 A | 10/1997 | Johnson | |
| 5,682,478 A | 10/1997 | Watson et al. | |
| 5,689,638 A | 11/1997 | Sadovsky | |
| 5,692,049 A | 11/1997 | Johnson | |
| 5,694,595 A | 12/1997 | Jacobs et al. | |
| 5,696,824 A | 12/1997 | Walsh | |
| 5,696,965 A | 12/1997 | Dedrick | |
| 5,699,528 A | 12/1997 | Hogan | |
| 5,708,780 A | 1/1998 | Levergood et al. | |
| 5,708,828 A | 1/1998 | Coleman | |
| 5,710,887 A | 1/1998 | Chelliah et al. | |
| 5,712,979 A | 1/1998 | Graber et al. | |
| 5,715,314 A | 2/1998 | Payne et al. | |
| 5,717,923 A | 2/1998 | Dedrick | |
| 5,724,424 A | 3/1998 | Gifford | |
| 5,724,521 A | 3/1998 | Dedrick | |
| 5,724,567 A | 3/1998 | Rose et al. | |
| 5,729,689 A | 3/1998 | Allard et al. | |
| 5,737,619 A | 4/1998 | Judson | |
| 5,740,252 A | 4/1998 | Minor et al. | |
| 5,740,549 A | 4/1998 | Reilly et al. | |
| 5,752,238 A | 5/1998 | Dedrick | |
| 5,757,920 A | 5/1998 | Misra et al. | |
| 5,758,257 A | 5/1998 | Herz et al. | |
| 5,764,890 A | 6/1998 | Glasser et al. | |
| 5,765,152 A | 6/1998 | Erickson | |
| 5,768,382 A | 6/1998 | Schneier et al. | |
| 5,768,504 A | 6/1998 | Kells et al. | |
| 5,768,508 A | 6/1998 | Eikeland | |
| 5,768,521 A | 6/1998 | Dedrick | |
| 5,768,890 A | 6/1998 | Bekkering et al. | |
| 5,774,551 A | 6/1998 | Wu et al. | |
| 5,774,869 A * | 6/1998 | Toader | 705/10 |
| 5,781,894 A | 7/1998 | Petrecca et al. | |
| 5,787,254 A | 7/1998 | Maddalozzo et al. | |
| 5,790,785 A | 8/1998 | Klug et al. | |
| 5,794,210 A | 8/1998 | Goldhaber et al. | |
| 5,794,259 A | 8/1998 | Kikinis | |
| 5,796,952 A | 8/1998 | Davis et al. | |
| 5,796,967 A | 8/1998 | Filepp et al. | |
| 5,801,698 A | 9/1998 | Lection et al. | |
| 5,805,815 A | 9/1998 | Hill | |
| 5,809,144 A | 9/1998 | Sirbu et al. | |
| 5,809,237 A | 9/1998 | Watts et al. | |
| 5,809,242 A | 9/1998 | Shaw et al. | |
| 5,812,776 A | 9/1998 | Gifford | |
| 5,812,784 A | 9/1998 | Watson et al. | |
| 5,813,009 A | 9/1998 | Johnson et al. | |
| 5,835,087 A | 11/1998 | Herz et al. | |
| 5,848,397 A | 12/1998 | Marsh et al. | |
| 5,848,399 A | 12/1998 | Burke | |
| 5,848,412 A | 12/1998 | Rowland et al. | |
| 5,854,897 A | 12/1998 | Radziewicz et al. | |
| 5,855,007 A | 12/1998 | Jovicic et al. | |
| 5,866,889 A | 2/1999 | Weiss et al. | |
| 5,884,312 A | 3/1999 | Dustan et al. | |
| 5,890,140 A | 3/1999 | Clark et al. | |
| 5,892,917 A * | 4/1999 | Myerson | 709/224 |
| 5,896,530 A | 4/1999 | White | |
| 5,910,987 A | 6/1999 | Ginter et al. | |
| 5,913,040 A | 6/1999 | Rakavy et al. | |
| 5,915,243 A | 6/1999 | Smolen | |
| 5,918,224 A | 6/1999 | Bredenberg | |
| 5,933,811 A | 8/1999 | Angles et al. | |
| 5,941,947 A * | 8/1999 | Brown et al. | 709/225 |
| 5,944,794 A | 8/1999 | Okamoto et al. | |
| 5,946,664 A | 8/1999 | Ebisawa | |
| 5,948,061 A | 9/1999 | Merriman et al. | |
| 5,966,695 A | 10/1999 | Melchione et al. | |
| 5,974,451 A | 10/1999 | Simmons | |
| 5,983,351 A | 11/1999 | Glogau | |
| 5,991,799 A | 11/1999 | Yen et al. | |
| 5,996,007 A | 11/1999 | Klug et al. | |
| 5,999,912 A | 12/1999 | Wodarz et al. | |
| 6,003,076 A | 12/1999 | Maruyama et al. | |
| 6,011,537 A | 1/2000 | Slotznick | |
| 6,016,509 A | 1/2000 | Dedrick | |
| 6,029,195 A | 2/2000 | Herz | |
| 6,058,378 A | 5/2000 | Clark et al. | |
| 6,058,393 A | 5/2000 | Meier et al. | |
| 6,073,105 A | 6/2000 | Sutcliffe et al. | |
| 6,094,677 A | 7/2000 | Capek et al. | |
| 6,131,810 A | 10/2000 | Weiss et al. | |
| 6,138,162 A | 10/2000 | Pistriotto et al. | |
| 6,148,332 A | 11/2000 | Brewer et al. | |
| 6,151,600 A | 11/2000 | Dedrick | |
| 6,173,287 B1 | 1/2001 | Eberman et al. | |
| 6,185,586 B1 | 2/2001 | Judson | |
| 6,199,106 B1 | 3/2001 | Shaw et al. | |
| 6,223,188 B1 | 4/2001 | Albers et al. | |
| 6,240,555 B1 | 5/2001 | Shoff et al. | |
| 6,247,047 B1 | 6/2001 | Wolff | |
| 6,285,987 B1 | 9/2001 | Roth et al. | |
| 6,308,202 B1 | 10/2001 | Cohn et al. | |
| 6,311,211 B1 | 10/2001 | Shaw et al. | |
| 6,317,789 B1 | 11/2001 | Rakavy et al. | |
| 6,385,592 B1 | 5/2002 | Angles et al. | |
| 6,507,872 B1 | 1/2003 | Geshwind | |
| 6,513,069 B1 | 1/2003 | Abato et al. | |
| 6,591,245 B1 | 7/2003 | Klug | |
| 6,615,251 B1 | 9/2003 | Klug et al. | |
| 6,769,019 B2 | 7/2004 | Ferguson | |
| 6,792,445 B1 | 9/2004 | Jones et al. | |
| 6,823,327 B1 | 11/2004 | Klug et al. | |
| 6,892,354 B1 | 5/2005 | Servan-Schreiber et al. | |
| 7,412,434 B1 | 8/2008 | Klug et al. | |
| 2003/0195797 A1 | 10/2003 | Klug et al. | |
| 2004/0010546 A1 | 1/2004 | Klug et al. | |

2008/0288478 A1 11/2008 Klug

FOREIGN PATENT DOCUMENTS

JP 07028724 1/1995
WO WO96/08756 3/1996

OTHER PUBLICATIONS

About Netscape, Netscape, Firefly, and VeriSign Propose Open Prefiling Standard (OPS) to Enable Broad Personalization Services, (printed May 28, 1997), 3 pages.
Advertisement in 1995 by Internet Profiles Corporation on the World Wide Web, at Website URL: http://www.ipro.com.
Author Unknown, "News from Newshare Corp.; Clickshare Universal-ID, profiling and micro-transaction system enters alpha; personalized "test drives" begin", Business Wire, Oct. 23, 1995.
Author Unknown, "One-bill, universal-password access to Internet information available by subscription of "by click" early next year via Newshare Corp.'s "Clickshare" publishing system; advertisers can track systemwide visits by anonymous user", Business Wire, Sep. 15, 1995.
Author Unknown, "The Checkfree Wallet Enables Secure Internet Purchases", PR Newswire, Apr. 10, 1995.
Baron et al., "Implementing a Web Shopping Cart", Dr. Dobb's Journal, No. 251, pp. 64-85, 1996.
Buck, S. Peter, "Electronic commerce—would, could and should you use current Internet payment mechanisms?", Internet Research: Electronic Networking Applications and Policy, vol. 6, No. 2/3, pp. 5-18, 1996.
"C&WC Lays Out Interactive TV Plans," Computer Program International, CGN08200041, ComputerWire Inc., (Aug. 20, 1998).
Davison, Andrew, "Coding with HTML Forms", Dr. Dobb's Journal, No. 231, pp. 70-75 and 106-109, Jun. 1995.
Dutt, G. Dinesh, "CGI and the World Wide Web", Dr. Dobb's Journal, No. 244, pp. 42-50 and 92-96, Feb. 1996.
Fickenscher, Lisa, "Discover's Virtual Card Follows Users Around the Web", The American Banker, Feb. 3, 2000.
Hämmäinen et al., "Distributed Form Management", ACM Transactions on Information Systems, vol. 8, No. 1, pp. 50-76, Jan. 1990.
Hill, G. Christian, "Group of Firms Propose Standard for Privacy on Net," The Wall Street Journal, (May 27, 1997), 2 pages.
Kerven, David, "HTML 3 How-To", Waite Group Press, Corte Madera, CA, pp. 326-329, 1996.
McMahon, P.V., "Sesame V2 Public Key & Authorization to Kerberos", IEEE, pp. 114-130.
"NCR: NCR & Quadstone Help Banks Improve Service and Reduce Risk by Better Predicting Customer Behaviour," M2 Presswire, M2 Communications, Ltd., (Jul. 6, 1998).
Pitt, Brad, Internet Pathfinder, E-Mail News Web-Business News, Internet leaders to Offer Privacy Protection, (no date), 2 pages.
Sirbu et al., "NetBill: An Internet Commerce System Optimized for Network-Delivered Services", Digest of Papers—Compcon '95—Technologies for the Information Superhighway, vol. 2, No. 4, Aug. 1995.
Sirbu et al., "NetBill: An Internet Commerce System Optimized for Network-Delivered Services", IEEE Personal Communications, San Francisco, CA, vol. 2, No. 4, Mar. 5-9, 1995.
Slater, A.F., "Controlled by the Web", Computer Networks and ISDN Systems, No. 27, pp. 289-295, 1994.
Trostle, J.T., "A Flexible Distributed Authorization Protocol", IEEE, pp. 43-52.
Welz, Gary, "A ripening Internet market. secure systems, and digital currency are reshaping global commerce", Internet World, pp. 36-41, Jun. 1995.
World, "Netscape Pitches OPS for Push Delivery," (May 26, 1997), 1 page.
Complaint and Jury Demand, *Registrar Systems LLC* vs. *Amazon. com, Target Corporation and Target.com*, Case 1:05-cv-02676-MSK, 11 pages, filed Dec. 30, 2005.
Request for Ex Parte Reexamination of U.S. Patent. No. 6,823,327, issued Oct. 20, 1998.
Request for Ex Parte Reexamination of U.S. Patent No. 5,790,785, issued Aug. 4, 1998.
Yamada, Ken, "Tracking a Silent Threat", Computer Reseller News, ISSN: 0893-8377, p. 45, Jun. 19, 1995.
Request for Ex Parte Reexamination of U.S. Patent. No. 6, 823,327, issued Nov. 23, 2004.
Order Granting Request for Ex Parte Reexamination of U.S. Patent No. 5,790,785, issued Aug. 14, 1998. Reexamination U.S. Appl. No. 90/007,961.
Kormann et al., "Risks of the Passport Single Signon Protocol", Bates No. AMZ-R0004866-4897, 12 pages, 2000. (Bates Nos. AMZ-R0004886-0004897).
Author Unknown, "The Big 3 of Net Surfing", Byte.com, 3 pages, 2005. (Bates Nos. AMZ-R0005489-0005491).
Bond, George, "Gateways to the Internet, America Online, CompuServe, and Prodigy offer Web browsers, FTP, and more, but these services aren't for everyone", BYTE.com, 5 pages, Sep. 1995. (Bates Nos. Amz-R0005492-0005496).
Berners-Lee et al., "World-Wide Web: The Information Universe", 9 pages, date unknown. (Bates Nos. AMZ-R0005646-0005654).
Borghoff et al., "Distributed Systems: A Comprehensive Survey", Mathematisches Institut und Institut fur Informatik Techn Univ Munchen, 85 pages, Nov. 1998. (Bates Nos. AMZ-R0005655-0005739).
Author Unknown, "E-commerce turns 10", CNET Networks, Inc., CNET News.com, 3 pages, Aug. 11, 2004. Bates Nos. AMZ-R0005740-0005747).
Author Unknown, "E-commerce turns 10", CNET Networks, Inc., CNET News.com, 5 pages, Aug. 11, 2004. (Bates Nos. AMZ-R0005743-0005747).
Freedman, Avi "Vermont Teddy Bears", Google newsgroup thread, Google Groups, 1 page, Nov. 1, 1994. (Bates No. AMZ-R0005748).
Baxter, Anthony, "hmmm . . . servers producing per-browser customized output", 1 page, Nov. 2, 1994. (Bates No. AMZ-R0005749).
Behlendorf, Brian, "hmmm . . . servers producing per browser customised output", 1 page, Nov. 2, 1994. (Bates No. AMZ-R0005750).
Marrs, Bill, "How to protect pages (not with passwd file)", Google Groups, 1 page, Dec. 12, 1994. (Bates No. AMZ-R0005751).
Author Unknown, "NetMarket: PGP Help", The NetMarket Company, netmarket.com, 3 pages, 1994. (Bates Nos. AMZ-R0005752-0005754).
Hamer, Christian, "ANNOUNCE:Condom Country Holiday Features", 1 page, Dec. 14, 1994. (Bates No. AMZ-R0005755).
Mullen et al., "A Simple Computational Market for Network Information Services", 7 pages, date unknown. (Bates Nos. AMZ-R0005756-0005762).
Various Authors, "HTTP-wg Archive by date", Archive of Messge Postings, 5,503 pages, Sep. 30, 1994 - Jan. 9, 1996. (Bates Nos. AMZ-R005763-R0011265).
Seidman, Robert D., "In, Around and Online, Issue 2.11 - Week Ending Mar. 17, 1995", 6 pages, Mar. 18, 1995. (Bates Nos. AMZ-R0011266-0011271).
Baty et al., "InterShop: Enhancing the vendor/customer dialect in electronic shopping", Journal of Management Information Systems: JMIS, vol. 11, No. 4, pp. 9-31, Spring 1995. (Bates Nos. AMZ-R0011272-0011282).
Lapham, Chris, "The Cutting Edge, Your Oasis On The Net", Computer-Mediated Communication Magazine, vol. 2, No. 5, 4 pages, May 1, 1995. (Bates Nos. AMZ-R0011283-0011286).
Townson, Patrick A., "TELECOM Digest", International Telecommunication Union, Genevia, Switzerland, vol. 15, Issue 251, 536 pages, May 23, 1995. (Bates Nos. AMZ-R0011287-0011822).
Hauser et al., "Generic Extensions of WWW Browsers", IBM Research Division, Zurich Switzerland, 6 pages, Jun. 23, 1995. (Bates Nos. AMZ-R0011823-0011828).
Gifford et al., "Payment Switches for Open Networks", USENIX Workshop on Electronic Commerce, New York, New York, 8 pages, Jul. 1995. (Bates Nos. AMZ-R0011829-0011836).
Dedrick, Rick, "A Consumption Model for Targeted Electronic Advertising", IEEE Multimedia, pp. 41-49, Summer 1995. (Bates Nos. AMZ-R0011837-0011845).
Wetherall et al., "Active Pages: Intelligent Nodes on the World Wide Web", MIT Laboratory for Computer Science, 8 pages, Mar. 31, 1994. (Bates Nos. AMZ-R0011846-00118453).

Author Unknown, "The Compuserve Commitment to Electronic Shopping", CompuServe Magazine, 2 pages, May 1994. (Bates Nos. AMZ-R0011854-0011855).
Author Unknown, "info HIGHWAY, News of the Internet", InfoHighway Ltd., Essex, UK vol. 1, No. 2, pp. 1-16, Jun. 20, 1994. (Bates Nos. AMZ-R0011856-0011871).
Hirai, Eijl, "Re: Noteworthy on the internet yet?", Google, 2 pages, Jul. 15, 1994. (Bates Nos. AMZ-R0011872-0011873).
Kohn, Daniel, "Noteworthy Music Compact Discs on the net & Web (mail-order catalog)", Google Groups, 1 page, Jul. 21, 1994. (Bates No. AMZ-R0011874).
Birmingham, Mark, "800-The-Rose" Flowers On The Net & Web (online flower ordering), Google Groups, 1 page, Jul. 22, 1994. (Bates No. AMZ-R0011875).
Kohn, Daniel, "Will Noteworthy take international orders for CDs", Google Groups, 1 page, Jul. 27, 1994. (Bates No. AMZ-R0011876).
Haskin, Guy, "ANNOUNCE: International Shipping for Noteworthy Music on the Internet", Google Groups, 1 page, May 8, 1994. (Bates No. AMZ-R0011877).
Leach, Harold, "MIT Enterprise Forum — workshop on marketing for entrepreneurs", Google Groups, 1 page, Aug. 17, 1994. (Bates No. AMZ-R0011878).
Haskin, Guy, "ANNOUNCE: Fringe Science Books Available on the Internet", Google Groups, 1 page, Sep. 5, 1994. (Bates No. AMZ-R00118879).
Haskin, Guy, "ANNOUNCE: Wines, Fringe Science and Big Band on WWW", Google Groups, 1 page, Sep. 5, 1994. (Bates No. AMZ-R00118880).
Orr, Douglas B. et al., "Strange Bedfellows: Issues in Object Naming Under Unix", University of Utah, 5 pages, date unknown. (Bates Nos. AMZ-R0011881-0011885).
Hamer, Christian, "ANNOUNCE:Condom Country On-Line", 1 page, Sep. 26, 1994. (Bates No. AMZ-R0011886).
Hamer, Christian, "ANNOUNCE:Condom Country On-Line", 1 page, Sep. 26, 1994. (Bates No. AMZ-R0011887).
Hamer, Christian, "ANNOUNCE:Condom Country On-Line", 1 page, Sep. 26, 1994. (Bates No. AMZ-R0011888).
Hamer, Christian, "ANNOUNCE:Condom Country On-Line", 1 page, Sep. 26, 1994. (Bates No. AMZ-R0011889).
Various Authors, "Electronic Proceedings of the Second World Wide Web Confrence '94: Mosaic and the Web", Archive of Message Postings, 1, 677 pages, Oct. 20,1994. (Bates Nos. AMZ-R0011890-0013566).
Maurer et al., "J.USC — The Next Generation In Electronic Journal Publishing", Graz University of Technology, Austria, pp. 117-26m date unknown. (Bates Nos. AMZ-R0013567-0013576).
Tait, Carl Downing, "A Fire System for Mobile Computing", Columbia University, 130 pages, 1993. (Bates Nos. AMZ-R0013577-706).
Azadok, E., "HLFSD: Delivering Email to Your $home", Columbia University, pp. 1-15, date unknown. (Bates Nos. AMZ-R0013707-0013721).
Zhou, Songnian, "UTOPIA: A Load Sharing Facility for Large, Heterogeneous Distributed Computer Systems", Computer Systems Research Institute, pp. 1-36, Apr. 1992. (Bates Nos. AMZ-R0013722-0013758).
Abbey, Jonathan, "The Group Administration Shell and Gash Network Computing Environment", Lisa, pp. 911-924, Sep. 19-24, 1994. (Bates Nos. AMZ-R0013759-0013772).
Dedrick, Rick, "Interactive Electronic Advertising", IEEE, pp. 55-56, date unknown. (Bates Nos. AMZ-R0013773-0013784).
Author Unknown, "First Virtual's Information Warehouse", 15 pages, date unknown. (Bates Nos. AMZ-R0013785-0013799).
Lih et al., "PGMAKE: A portable Distributed Make System", Columbia University, pp. 1-5, date unknown. (Bates Nos. AMZ-R0013800-0013804).
Hanna, Sherman, "SECTION 3. The Economics of Information", The Ohio State University, 7 pages, 1994. (Bates Nos. AMZ-R0013805-0073811).
Author Unknown, Advertisment: "PATHFINDER, from Time Warner", 1 page, Nov. 28 - Dec. 4, 1994. (Bates No. AMZ-R0013812).

Tierney, Mark, "A world of information at your fingertips", Broadcom Eircann Research Ltd., 9 pages, date unknown. (Bates Nos. AMZ-R0013813-0013821).
Maurer, H., "Hyper-G: Advancing the Ideas of World-Wide-Web", Institute for Information Processing and Supported New Media, Graz. University of Technology, Graz/Austria, 3 pages. Mar. 1994. (Bates Nos. AMZ-R0013822-0013824).
Dannenberg et al., "A Butler Process for Resource Sharing on Spice Machines", ACM Transactions on Office Information Systems, vol. 3, No. 3, pp. 234-252, Jul. 1985. (Bates Nos. AMZ-R0013825-0013843).
Peterson, Larry L., "A Yellow-Pages Service for a Local-Area Network", ACM, pp. 235-242, 1988. (Bates Nos. AMZ-R0013844-0013851).
Hess, David K., "A Unix Network Protocol Security Study: Network Information Services ", Texas A&M University, 5 pages, date unknown. (Bates Nos. AMZ-R0013852-0012856).
Welch, Brent Ballinger, "Naming, State Management, and User-Level Extensions in the Sprite Distributed File System", Source Unknown, 201 pages, 1990. (Bates Nos. AMZ-R0013857-R0014057).
Baker et al., "Measurements of a Distributed File System", Electrical Engineering and Computer Sciences, University of California, pp. 1-15, Jul. 25, 1991. (Bates Nos. MAZ-R0014058-0014072).
McManis et al., "Solaris ONC, Network Information Service Plus (NIS+), A White Paper", SunSoft, Inc., 25 pages, 1991. (Bates Nos. AMZ-R0014073-0014097).
Schwartz et al., "A Comparison of Internet Resource Discovery Approaches", Computing Systems, vol. 5, No. 4, pp. 1-16, Aug. 1992. (Bates Nos. AMZ-R0014098-0014114).
Schonwalder, "Administration of large distributed UNIX LANs with Bones", Institute for Operating Systems and Computer Networks, 7 pages, date unknown. (Bates Nos. AMZ-R0014115-0014121).
Andrews et al., "On Second Generation Hypermedia Systems", pp. 127-133 and 245-247, date unknown. (Bates Nos. AMZ-R0014122-001431).
Lantz, Keith A., "Towards a Universal Directory System", AMC, pp. 250-260, 1985. (Bates Nos. AMZ-R0014132-001142).
Sandberg et al., "Design and Implementation of the Sun Network filesystem", Sun Microsystems, 12 pages, Summer 1985. (Bates Nos. AMZ-R0014143-0014154).
Dawson, Frank, "Electronic Business Card Specification, A Contribution from Apple, AT&T, IBM, Siemens Rolm, and Counterpoint Systems", Draft 5, 32 pages, Jan. 10, 1996. (Bates Nos. AMZ-R0014155-0014186).
Author Unknown, E-mail to Frank Dawson, 4 pages, Oct. 30, 1995. (Bates Nos. AMZ-R0014187-0014190).
Dawson, Frank, "Electronic Business Card Specification, a Contribution from Apple, AT&T, IBM, Siemens Rolm, and Counterpoint Systems", Draft Specification, 29 pages, Dec. 4, 1995. (Bates Nos. AMZ-R0014191-0014219).
Dawson, Frank, "Electronic Business Card (vCard) Specification", Draft Final Specification, 51 pages, Feb. 16, 1996. (Bates Nos. AMZ-R0014220-0014270).
Alden et al., "vCard, The Electronic Business Card, Version 2.0", *versit* Consortium Specification, 32 pages, Apr. 29, 1996. (Bates Nos. AMZ-R0014271-0014307).
Alden et al., "vCard, The Electronic Business Card, Version 2.0", 32 pages, Sep. 18, 1996. Bates Nos. AMZ-R0014308-0014339).
Author Unknown, "Build a Web Site, The Programmer's Guide to Creating, Building, and Maintaining a Web Presence", Prima Online, 2 pages, 1995. (Bates Nos. AMZ-R0014340-0014341).
Wang, Wallace, "CompuServe for Dummies, A Reference for the Rest of Us!", IDG Books, 2 pages, 1994. (Bates Nos. AMZ-R0014342-0014343).
Bowen et al., "Hot to get the most out of Compuserve", The Bantam On-Line Services Library, 2 pages, 1989. (Bates Nos. AMZ-R0014344-0014345).
Tatters, Wes, "Navigating the Internet with CompuServe", Sams.net Publishing, 2 pages, 1995. (Bates Nos. AMZ-R0014346-0014347).
Author Unknown, "Prodigy Made Easy", Second Edition, Osborne McGraw-Hill, 2 pages, 1993. (Bates Nos. AMZ-R0014348-0014349).

Viescas, John L., "The Offical Guide To The Prodigy Service", Microsoft Press, 2 pages, 1991. (Bates Nos. AMZ-R0014350-0014351)

Author Unknown, "Using Compuserve", Que Corporation, 2 pages, 1994. (Bates Nos. AMZ-R0014352-0014353).

Author Unknown, "Using Mosaic", Que Corporation, 2 pages, 1994. (Bates Nos. AMZ-R0014354-5).

Author Unknown, "Condom Country", The Condom Country Homepage, 43 pages, date unknown. (Bates Nos. AMZ-R0014356-00143598).

Author Unknown, "Condom Country", Pages from the Condom Country web site, 59 pages, date unknown. (Bates Nos. AMZ-R0014399-00143457).

McCandlish, Stanton, "EduPage note on CyberCash "digital purse" e-money rollout", Google, 1 page, Sep. 14, 1994. (Bates No. AMZ-R0014458).

Millison, Doug, Web Posting on Google, 10 pages, Apr. 11, 1995. (Bates Nos. AMZ-R0014459-0014468).

Melton, William N., "Management", cybercash.com, 3 pages, date unknown. (Bates Nos. AMZ-R0014469-0014471).

Author Unknown, "Financial Services Whitepaper", cybercash.com, 13 pages, date unknown. (Bates Nos. AMZ-R0014472-0014484).

Author Unknown, "CyberCash Benefits", cybercash.com, 2 pages, date unknown. (Bates Nos. AMZ-R0014485-0014486).

Author Unknown, "Merchant Benfits", cybercash.com, 3 pages, date unknown. (Bates Nos. AMZ-R0014487-0014489).

Author Unknown, "Merchant Services Whitepaper", cybercash.com, 12 pages, date unknown. (Bates Nos. AMZ-R0014490-0014501).

Author Unknown, "CyberCash Overview", cybercash.com, 2 pages, date unknown. (Bates Nos. AMZ-R0014502-0014503).

Author Unknown, "CyberCash, Inc. Privacy Code", cybercash.com, 2 pages, date unknown. (Bates Nos. AMZ-R0014504-0014505).

Eastlake et al., "CyberCash Credit Protocol Version 0.8", 58 pages, Oct. 31, 1995. (Bates Nos. AMZ-R0014506-0014563).

Author Unkown, "Getting Started at CyberCash Merchant: Part 2", cybercash.com, 14 pages, date unknown. (Bates Nos. AMZ-R0014564-0014577).

Author Unknown, "Getting Started at CyberCash Merchant: Part 1", cybercash.com, 17 pages, date unknown. (Bates Nos. AMZ-R0014578-0014594).

Author Unknown, "Getting the Cybercash Wallet", cybercash.com, 3 pages, date unknown. (Bates Nos. Amz-R0014595-0014597).

Author Unknown, "The Six Steps in a Secure Internet Credit Card Payment", cybercash.com, 2 pages, date unknown. (Bates Nos. AMZ-R0014598-0014599).

Author Unknown, "What the Media is Saying . . . ", cybercash.com, 13 pages, date unknown. (Bates Nos. AMZ-R0014600-0014612).

Poler Ariel, "Improving WWW Marketing through User Information and Non-Intrusive Communications", Internet Profiles Corporation, 3 pages, date unknown. (Bates Nos. AMZ-R0014613-0014615).

Poler, Ariel, Web Posting on Google, 1 page, Nov. 15, 1994. (Bates No. AMZ-R0014616).

Author Unknown, "About I/PRO", ipro.com, 5 pages, date unknown. (Bates Nos. AMZ-R0014617-0014621).

Author Unknown, "Notice", I/PRO, 42 pages, Mar. 1995. (Bates Nos. Amz-R0014622-0014663).

Author Unknown, "PR Newswire Website Directory", PR Newswire, 11 pages, Apr. 17 (1996-2002). (Bates Nos. AMZ-R0014664-0014674).

Wolfe, Michael, Web Posting on Google, 1 page, Apr. 6, 1995. (Bates No. AMZ-R0014675).

Author Unknown, "Software tracks Web demographics", PC Week, vol. 12, Issue 14, 1 page, Apr. 10, 1995. (Bates No. AMZ-R0014676).

Millison, Doug, Web Posting on Google, 8 pages, Apr. 11, 1995. (Bates Nos. AMZ-R0014677-0014684).

Author Unknown, "I/Pro Meters Web advertising exposure", Seybold Report on Desktop Publishing, vol. 9 No. 9, 3 pages, 1996. (Bates Nos. AMZ-R0014685-0014687).

Author Unknown, "US firm to track true cost of Internet use", Publishing Technology Review, vol. 2, Issue 6, 2 pages, May 1, 1995. (Bates Nos. AMZ-R0014688-0014689).

Author Unknown, "Market research firms target Web traffic data", PC Week, vol. 12, Issue 21, 2 pages, May 29, 1995. (Bates Nos. AMZ-R0014690-0014691).

Author Unknwon "Articles", google.com, 5 pages, Jun. 20, 1995. (Bates Nos. AMZ-R0014692-0014696).

Author Unknown "Compuserve to Track Users During Internet Hunt", Media Daily, vol. 3, Issue 119, 2 pages, Jun. 20, 1995. (Bates Nos. AMZ-R0014697-0015698).

Author Unknown, "News Products", SunWorld Online, 13 pages, Jul. 1995. (Bates Nos. AMZ-R0014699-0014711).

Kennedy et al., "Making Money Online", SunWorld, 17 pages, Sep. 1995. (Bates Nos. Amz-R0014712-0014728).

Author Unknown, "The Medium is the Measure", ADWEEK Eastern Addition, 5 pages, Sep. 25, 1995. (Bates Nos. AMZ-R0014729-0014733).

Dawson, Keith, "TBTF for Oct. 1, 1995: Web-site registration and privacy", 4 pages, Oct. 1, 1995. (Bates Nos. AMZ-R0014734-0014737).

Romney, Jason, "Jason Romney's Business on the Internet keynote address", 14 pages, Oct. 10, 1995. (Bates Nos. AMZ-R0014738-0014751).

Brown et al., "Privacy and the NII: Safteguarding Telecommunications-Related Personal Information", 48 pages, Oct. 1995. (Bates Nos. AMZ-R0014752-0014799).

Author Unknown, "I/PRO to test audits of websites for BPA members", Business Publisher, vol. 10, Issue 7, 2 pages, Oct. 31, 1995. (Bates Nos. AMZ-R0014800-0014801).

Author Unknown, "I/Pro and Genesis Team for Website Measurement", Newsbytes PM, 2 pages, Jan. 30, 1996. (Bates Nos. AMZ-R0014802-0014803).

Author Unknown, "Interactive Advertising", Report on Electronic Commerce, vol. 3, Issue 5, 2 pages, Mar. 5, 1996. (Bates Nos. AMZ-R0014804-0014805).

Author Unknown, "Your webpage: get what you pay for", Forbes, vol. 157, Issue 7, 5 pages, Apr. 8, 1996. (Bates Nos. AMZ-R0014806-0014810).

Creedy, Steve, "Counting Heads on the Web Internet Sites Want Visitors to Register So They Can Customize Content", Pittsburgh Post Gazette, 2 pages, May 12, 1996. (Bates Nos. AMZ-R0014811-0014812).

Author Unknown, "Online", Report on Elevtronic Commerce, vol. 3, Issue 11, 4 pages, May 28, 1996. (Bates Nos. AMZ-R0014813-0014816).

Author Unknown, "I/Pro Seeks New Registration System, Shelves I/Code", Media Daily, vol. 4, Issue 5, 2 pages, Nov. 8, 1996. (Bates Nos. AMZ-R0014817-0014818).

Author Unknown, "Recent I/Pro Announcements", I/Pro, 2 pages, Jun. 23, 1997. (Bates Nos. AMZ-R0014819-0014823).

Author Unknown, "I/Audit For Ad Networks", Nielson, 3 pages, date unknown. (Bates Nos. AMZ-R0014821-00014823).

Author Unknown, "I/Audit TopLine", Nielson, 2 pages, date unknown. (Bates Nos. AMZ-R0014824-0014825).

Author Unknown, "Comparative Analysis Report: McNet, Inc. —Nielson I/PRO Web Averages", Nielson, 1 page, date unknown. (Bates No. AMZ-R0014826).

Author Unknown, "Comparative Analysis Report: McNet, Inc. —Average Pages Per Visit", Nielson, 1 page, date unknown. (Bates No. AMZ-R0014827).

Author Unknown, "AdResults", Nielson, 1 page, date unknown. (Bates No. AMZ-R0014828).

Author Unknown, "I/Audit", Nielson, 5 pages, date unknown. (Bates Nos. AMZ-R0014829-0014833).

Author Unknown, "Comparative Analysis Report: McNet, Inc. —Depth and Duration Visit", Nielson, 1 page, date unknown. (Bates No. AMZ-R0014834).

Author Unknown, "Comparative Analysis Report: McNet, Inc.—% of Traffic of U.S. Origin", Nielson, 1 page, date unknown. (Bates No. AMZ-R0014835).

Author Unknown, "Comparative Analysis Report: McNet, Inc. —Percent of Total Traffic by Non-U.S. Country Origin", Nielson, 1 page, date unknown. (Bates No. AMZ-R0014836).

Author Unknown, "Comparative Analysis Report: McNet, Inc.—Percent of Traffic by U.S. Hierarchy", Nielson, 1 page, date unknown. (Bates No. AMZ-R0014837).
Author Unknown, "Comparative Analysis Report: McNet, Inc.—Percentage Change in Average Daily Visits", Nielson, 1 page, date unknown. (Bates No. AMZ-R0014838).
Author Unknown, "Comparative Analysis Report: McNet, Inc. - Average Visit Length", Nielson, 1 page, date unknown. (Bates No. AMZ-R0014839).
Author Unknown, "Branch Mail", 1 page, date unknown. (Bates No. AMZ-R0014840).
Author Unknown, "CommerceNet", 1 page, date unknown. (Bates No. AMZ-R0014841).
Author Unknown, "Directories", 1 page, date unknown. (Bates No. AMZ-R0014843).
Author Unknown, "Order Confirmation", 1 page, date unknown. (Bates No. AMZ-R0014843).
Author Unknown, "Internet Shopping Network", 1 page, date unknown. (Bates No. AMZ-R0014846).
Author Unknown, "Internet Shopping Network", 1 page, date unknown. (Bates No. AMZ-R0014847).
Author Unknown, "Welcome to OpenMarket", 1 page, date unknown. (Bates No. AMZ-R0014851).
Author Unknown, "VIDEOS", 2 pages, date unknown. (Bates No. AMZ-R0015852-0014853).
Author Unknown, "NetMarket Storefront Development Agreement", 2 pages, Mar. 9, 1995. (Bates Nos. AMZ-R0014854-0014865).
Author Unknown, "NetMarket Storefront Development Agreement", 13 pages, Apr. 18, 1995. (Bates Nos. AMZ-R0014866-0014878).
Author Unknown, "Table of Contents", 6 pages, date unknown. (Bates Nos. AMZ-R0014879-0014884).
Kohn, Daniel M., Letter to Rick Flynn, 2 pages, Apr. 4, 1995. (Bates Nos. AMZ-R0014885-0014886).
Kohn, Daniel M., Letter to Rick Flynn, 2 pages, Apr. 5, 1995. (Bates Nos. AMZ-R0014887-0014888).
Author Unknown, "NetMarket Storefront Development Agreement", 6 pages, Feb. 22, 1995. (Bates Nos. AMZ-R0014889-0014904).
Author Unknown, "NetMarket Storefront Development Agreement", 6 pages, Feb. 22, 1995. (Bates Nos. AMZ-R0014905-0014920).
Author Unknwon, "Land's End on the Internet", 5 pages, date unknown. (Bates Nos. AMZ-R0014921-0014925).
Author Unknown, "Letter of Intent Between Lands' End, Inc. and The NetMarket Company", 3 pages, Jan. 12, 1995. (Bates Nos. AMZ-R0014926-0014928).
Author Unknown, "Letter of Intent Between Lands' End, Inc. and The NetMarket Company", 3 pages, Jan. 17, 1995. (Bates Nos. AMZ-R0014929-0014931).
Author Unknown, "Contract for the MIT Elecetronic Catalog Design and "Lab" Phases", 12 pages, April 11, 1995. (Bates Nos. AMZ-R0014932-0014943).
Author Unknown, "Contract for the MIT Electronic Catalog", 11 pages, Apr. 11, 1995. (Bates Nos. AMZ-R0014944-0014954).
Author Unknown, "Contract for the MIT Electronic Catalog Design and "Lab" Phases", 12 pages, Apr. 20, 1995. (Bates Nos. AMZ-R0014955-0014966).
Author Unknown, "The MIT Electronic Catalog", 4 pages, date unknown. (Bates Nos. AMZ-R0014967-0014970).
Author Unknown, "Letter of Intent Between Newbury Comics, Inc. and The NetMarket Company", 3 pages, Jan. 25, 1995. (Bates Nos. AMZ-R0014971-0014973).
Author Unknown, "Letter of Intent Between Newbury Comics, Inc. and The NetMarket Company", 3 pages, Jan. 16, 1995. (Bates Nos. AMZ-R0014974-0014976).
Author Unknown, "Letter of Intent Between Newbury Comics, Inc. and The NetMarket Company", 3 pages, Feb. 6, 1995. (Bates Nos. AMZ-R0014977-0014979).
Author Unknown, "Letter of Intent Between Newbury Comics, Inc. and The NetMarket Company", 3 pages, Jan. 30, 1995. (Bates Nos. AMZ-R0014981-0014983).
Author Unknown, "Agreement", 9 pages, Feb. 6, 1995. (Bates Nos. AMZ-R0014984-0014992).
Author Unknown, "Agreement", 10 pages, Feb. 6, 1995. (Bates Nos. AMZ-R0014993-0015002).
Author Unknown, "Agreement", 12 pages, Feb. 14, 1995. (Bates Nos. AMZ-R00015003-0015014).
Author Unknown, "NetMarket Storefront Development Agreement", 13 pages, Feb. 15, 1995. (Bates Nos. AMZ-R0015015-0015027).
Author Unknown, "Netmarket Storefront Development Agreement", 13 pages, Feb. 16, 1995. (Bates Nos. AMZ-R0015028-0015040).
Author Unknown, "NetMarket Storefront Development Agreement", 13 pages, Feb. 16, 1995. (Bates Nos. AMZ-R0015041-001503).
Author Unknown, "NetMarket Storefront Development Agreement [TEMPLATE] ", 13 pages, Feb. 20, 1995. (Bates Nos. AMZ-R0015054-0015066).
Author Unknown, Greement between NFO Research, Inc. and The Net Market Company, 8 pages, May 4, 1995. (Bates Nos. AMZ-R0015067-0015074).
Author Unknown, "Sales Agency Agreement", 14 pages, Jun. 1, 1994. (Bates Nos. AMZ-R0015075-0015088).
Author Unknown, "Merchant Agreement", 14 pages, 1994 (Bates Nos. AMZ-R0015089-0015102).
Author Unknown, "CUC-centric versus non-CUC work", 2 pages, date unknown. (Bates Nos. AMZ-R0015103-0015104).
Harai, Eiji, Letter to Mr. Willie Doyle, 2 pages, Jan 31, 1994. (Bates Nos. AMZ-R0015105-0015106).
Author Unknown, Spreadsheet, 2 pages, date unknown. (Bates No. AMZ-R0015107-0015108).
Lee, Roger, Memo to Craig Adams, 1 page, date unknown. (Bates No. AMZ-R0015109).
Author Unknown, "Suggested inserts to be added to Section 5", 2 pages, date unknown. (Bates Nos. AMZ-R0015110-0015111).
Author Unknown, "Sales Agency Agreement", 13 pages, Feb. 9, 1994. (Bates Nos. AMZ-R0015112-0015124).
Author Unknown, "Sales Agency Agreement", 13 pages, Mar. 25, 1994. (Bates Nos. AMZ-R0015125-0015137).
Author Unknown, "Sales Agency Agreement", 13 pages, Mar. 29, 1994. (Bates Nos. AMZ-R0015138-0015150).
Author Unkknown, Spreadsheet, 6 pages, date unknown. (Bates Nos. AMZ-R0015151-0015156).
Rog., Letter to Dan, 1 page, date unknown. (Bates No. AMZ-R0015157).
Author Unknown, "NCSA Mosaic: Document View-The NetMarket Company", 1 page, date unknown, (Bates No. AMZ-R0015158).
Author Unknown, "NCSA Mosaic: Document View-Noteworthy Music Compact Disk Catalog", 1 page date unknown. (Bates No. AMZ-R0015159).
Author Unknown, "NCSA Mosaic: Document View-About Noteworthy Music", 1 page, date unknown. (Bates No. AMZ-R0015160).
Author Unknown, "NCSA Mosaic: Document View-Noteworthy Music: Popular Titles", 1 page, date unknown. (Bates No. AMZ-R0015161).
Author Unknown, "NCSA Mosiac: Document View-Police", 1 page, date unknown. (Bates No. AMZ-R0015162).
Author Unknown, "NCSA Mosaic: Document View-Noteworthy Music: Shopping List", 1 page, date unknown. (Bates No. AMZ-R0015163).
Lee, Roger, Letter to Mr. Don Soto, 2 pages, Jun. 12, 1994. (Bates Nos. AMZ-R0015164-0015165).
Author Unknown, "Sales Agency Agreement", 13 pages, Feb. 9, 1994. (Bates Nos. AMZ-R0015166-0015178).
Author Unknown, "Sales Agency Agreement", 13 pages, Feb. 9, 1994. (Bates Nos. AMZ-R0015179-0015191).
Author Unknown, "Sales Agency Agreement", 14 pages, Jun. 1, 1994. (Bates Nos. AMZ-R0015192-0015205).
Author Unknown, "Executive Summary", 14 pages, date unknown. (Bates Nos. AMZ-R0015206-0015219).
Lee, Roger, Letter to Mr. Craig Adams, 2 pages, Jan. 17, 1994. (Bates Nos. AMZ-R0015220-0015221).
Lee, Roger, Letter to Mr. Craig Adams, 2 pages, Jan. 17, 1994. (Bates Nos. AMZ-R0015222-0015223).
Author Unknown, "Executive Summary", 8 pages, date unknown. (Bates Nos. AMZ-R0015224-0015231).
Lee, Roger, Letter to Mr. Craig Adams, 2 pages, Jan. 17, 1994. (Bates Nos. AMZ-R0015232-0015233).
Author Unknown, "Executive Summary", 14 pages, date unknown. (Bates Nos. AMZ-R0015234-0015247).

Lee, Roger, Fax to Peter Pellam, 1 page, date unknown. (Bates No. AMZ-R0015248).
Lee, Roger, Memo to Annagret Burtchy, 2 pages, date unknown. (Bates Nos. AMZ-R0015249-0015250).
Haskin, Guy H. T., Fax to Peter Gauvin, 2 pages, August 11, 1994. (Bates Nos. AMZ-R0015255-0015256).
Kohn, Daniel M., Letter to Rod Larmee, 1 page, Aug. 16, 1994. (Bates No. AMZ-R0015257).
Lee, Roger, Letter to Ms. Michelle Johnson, 1 page, Aug. 9, 1994. (Bates No. AMZ-R0015258).
Author Unknown, Letter to Mr. Dave Wallace, 3 pages, date unknown. (Bates Nos. Amz-R0015259-0015261).
Lee, Roger, Letter to Mr. Dave Wallace, 4 pages, Feb. 17, 1994. (Bates Nos. AMZ-R0015262-0015265).
Lee, Roger, Letter to Mr. Dave Wallace, 3 pages, Feb 21, 1994. (Bates Nos. AMZ-R0015266-0015268).
Lee, Roger, Letter to Mr. Dave Wallace, 3 pages, Feb. 21, 1994. (Bates Nos. AMZ-R0015269-0015271).
Lee, Roger, Letter to Mr. Dave Wallace, 3 pages, Feb. 21, 1994. (Bates Nos. AMZ-R0015272-0015274).
Lee, Roger, Letter to Mr. Steve Young, 1 page, Aug. 9, 1994. (Bates No. AMZ-R0015275).
Lee, Roger, Letter to Mrs. Carol J. Loomis, 4 pages, Mar. 21, 1994. (Bates Nos. AMZ-R0015276-0015279).
Lee, Roger, Letter to Mrs. Carol J. Loomis, 4 pages, Mar. 31, 1994. (Bates Nos. AMZ-R0015280-0015283).
Lee, Roger, Letter to Mrs. Carol J. Loomis, 2 pages, Mar. 31, 1994. (Bates Nos. AMZ-R0015284-0015285).
Kohn, Daniel M., Letter to Peter Lewis, 4 pages, Aug. 3, 1994. (Bates Nos. AMZ-R0015286-0015289).
Haskin, Guy H. T., Fax to Michael Rozansky, 1 page, Jul. 25, 1994. (Bates No. AMZ-R0015290).
Haskin, Guy H. T., Letter to Jerry Byrd, 4 pages, May 17, 1994. (Bates Nos. AMZ-R0015291-0015294).
Haskin, Guy H. T., Letter to Christopher King, 4 pages, May 18, 1994. (Bates Nos. AMZ-R0015295-0015298).
Haskin, Guy H. T., Letter to Bill Frischling, 3 pages, June 2, 1994. (Bates Nos. AMZ-R0015299-0015301).
Kohn, Daniel M., Letter to Tim Cossairt, 3 pages, Apr. 19, 2006. (Bates Nos. AMZ-R0015302-0015304).
oak.cc.swarthmore.edu, E-mail regarding Apollo Brochure Questions, 5 pages, Jul. 24, 1993. (Bates Nos. Amz-R0015305-0015309).
Kohn, Daniel, Letter and Brochure to Tim Cossairt, 6 pages, Jul. 27, 1993. (Bates Nos. AMZ-R0015310-0015315).
Kohn, Daniel, Letter and Brochure to Tim Cossairt, 6 pages, Sep. 6, 1993. (Bates Nos. AMZ-R0015316-0015321).
Author Unknown, Spreadsheet of Cost Analysis Project, 2 pages, date unknown. (Bates Nos. AMZ-R0015322-0015323).
Kohn et al., "The Daedalus Project: A Prospectus", 12 pages, date unknown. (Bates Nos. AMZ-R0015324-0015335).
Author Unknown, "The Daedalus Project: A Prospectus", 10 pages, date unknown. (Bates Nos. AMZ-R0015336-0015345).
Author Unknown, Spreadsheet, 4 pages, date unknown. (Bates Nos. 00015346-0015349).
Author Unknown, "PC Travel on the Internet:", 5 pages, Jul. 5, 1994. (Bates Nos. AMZ-R0015352-0015356).
Kohn, Daniel M., Letter to David Lea, 2 pages, Jul. 27, 1994. (Bates Nos. AMZ-R0015357-0015358).
Author Unknown, "PC Travel and NetMarket", 3 pages, Jul. 11, 1994. (Bates Nos. AMZ-R0015359-0015361).
Author Unknown, "PC Travel and NetMarket:", 4 pages, Jul. 13, 1994. (Bates Nos. AMZ-R0015362-0015365).
Kohn, Daniel M., Letter to David Lea, 1 page, Jul. 13, 1994. (Bates No. AMZ-R0015366).
Kohn, Daniel M., Letter to Mr. Verbruggen, 2 pages, Jul. 14, 1994. (Bates Nos. AMZ-R0015367-0015368).
Author Unknown, "AGENDA - Nov. 21, 1994", 2 pages, Nov. 21, 1994. (Bates Nos. AMZ-R0015371-0015374).
Author Unknown, "Frequently Asked Questions", 2 pages, date unknown. (Bates Nos. AMZ-R0015375-0015376).
Author Unknown, "Marketing Strategies for the NetMarket Company (Draft)", 3 pages, date unknown. (Bates Nos. AMZ-R0015377-0015379).
Author Unknown, "The NetMarketCompany", 6 pages, date unknown. (Bates Nos. AMZ-R0015380-0015385).
Author Unknown, "Introduction", 6 pages, date unknown. (Bates Nos. AMZ-R0015386-0015391).
Lee, Roger, Memo to Mr. Greg, 2 pages, Apr. 13, 1994. (Bates Nos. AMZ-R0015392-0015393).
Lee, Roger, Letter to Mr. Greg Feigenbaum, 2 pages, Sep. 16, 1994. (Bates Nos. AMZ-R0015394-0015395).
Author Unknown, Letter to Mr. Greg Feigenbaum, 1 page, date unknown. (Bates No. AMZ-R000015396).
Author Unknown, "Sales Agency Agreement", 13 pages, Mar. 15 1994. (Bates Nos. AMZ-R0015397-0015409).
Author Unknown, Spreadsheet of the NetMarket Company, 1 page, date unknown. (Bates No. AMZ-R0015410).
Lee, Roger, Letter to Ms. Lynn Feigenbaum, 1 page, Jul. 14, 1994. (Bates No. AMZ-R0015411).
Author Unknown, "Sales Agency Agreement",13 pages, Feb. 9, 1994. (Bates Nos. AMZ-R0015412-0015424).
Author Unknown, "Eastman Kodak Company", 15 pages, Jan. 1994. (Bates Nos. AMZ-R0015425-0015439).
Kohn, Daniel M., Letter to Gordon Cook, 1 page, Feb. 15, 1995. (Bates No. AMZ-R0015440).
Author Unknown, "CUC International Acquires NetMarket Company, A Leader in Bringing Commerce to the Internet", Stamford, Connecticut, 2 pages, Nov. 15, 1994. (Bates Nos. AMZ-R0015441-0015442).
Author Unknown, "CUC International Acquires NetMarket Company, A Leader in Bringing Commerce to the Internet", Stamford, Connecticut, 2 pages, Nov. 15, 1994. (Bates Nos. AMZ-R0015443-0015444).
Kohn et al., "NetMarket Implements the First Automatic Encryption of Commercial Transactions on the Internet", Nashua New Hampshire, 3 pages, Aug. 11,1994. (Bates Nos. AMZ-R0015447-0015449).
Kohn et al., "NetMarket Implements the First Automatic Encryption of Commercial Transactions on the Internet", Nashua New Hampshire, 3 pages, Aug. 11,1994. (Bates Nos. AMZ-R0015450-0015452).
Author Unknown, Spreadsheet, 1 page, date unknown. (Bates No. AMZ-R0015453).
Author Unknown, Spreadsheet of Actual Revenue, 2 pages, date unknown. (Bates Nos. AMZ-R0015454-0015455).
Author Unknown, Spreadsheet, 2 pages, date unknown. (Bates No. AMZ-R0015456-0015457).
Author Unknown, Spreadsheet, 2 pages, date unknown. (Bates No. AMZ-R0015458-0015459).
Author Unknown, Spreadsheet of NetMarket Budget, 2 pages, Fiscal Year 1995. (Bates Nos. AMZ-R0015460-0015461).
Author Unknown, Spreadsheet of NetMarket Budget, 4 pages, Fiscal Year 1995. (Bates Nos. AMZ-R0015462-0015465).
Author Unknown, Spreadsheet of NetMarket Budget, 4 pages, Fiscal Year 1995. (Bates Nos. AMZ-R0015466-0015469).
Author Unknown, Spreadsheet of NetMarket Payroll, 1 page, Fiscal Year 1995. (Bates No. AMZ-R0015470).
Author Unknown, Spreadsheet , 2 pages, date unknown. (Bates Nos. AMZ-R0015471-0015472).
Author Unknown, Spreadsheet , 2 pages, date unknown. (Bates Nos. AMZ-R0015473-0015474).
Author Unknown, Spreadsheet, 8 pages, date unknown. (Bates Nos. AMZ-R0015475-0015482).
Author Unknown, Spreadsheet, 2 pages, date unknown. (Bates Nos. AMZ-R0015483-0015484).
Author Unknown, Spreadsheet, 2 pages, date unknown. (Bates Nos. AMZ-R0015485-0015486).
Author Unknown, Spreadsheet, 8 pages, date unknown. (Bates Nos. AMZ-R0015487-0015494).
Author Unknown, Spreadsheet, 2 pages, date unknown. (Bates Nos. AMZ-R0015495-0015496).
Author Unknown, Spreadsheet, 2 pages, date unknown. (Bates Nos. AMZ-R0015497-0015498).
Author Unknown, Spreadsheet, 2 pages, date unknown. (Bates Nos. AMZ-R0015400-0015500).

Author Unknown, Spreadsheet, 2 pages, date unknown. (Bates Nos. AMZ-R0015501-0015502).
Author Unknown, Spreadsheet, 2 pages, date unknown. (Bates Nos. AMZ-R0015503-0015504).
Author Unknown, Spreadsheet, 2 pages, date unknown. (Bates Nos. AMZ-R0015505-0015506).
Author Unknown, Spreadsheet, 1 page, date unknown. (Bates No. AMZ-R0015507).
Author Unknown, Spreadsheet if Phone Bill, 1 page, date unknown. (Bates Nos. AMZ-R0015508).
Kohn, Daniel M., Letter to Augustus Warren, 1 page, Nov. 17, 1994. (Bates No. AMZ-R0015509).
Kohn, Daniel M., Letter to Augustus Warren, 1 page, Nov. 17, 1994. (Bates No. AMZ-R0015510).
Kohn, Daniel M., Letter to Hal Pomeranz, 1 page, Nov. 14, 1994. (Bates No. AMZ-R0015511).
Author Unknown, "Original Agreement", 1 page, date unknown. (Bates No. AMZ-R0015512).
Author Unknown, "Original Agreement", 1 page, date unknown. (Bates No. AMZ-R0015513).
Kohn, Daniel M., Letter to Hal Pomeranz, 2 pages, Nov. 14, 1994. (Bates No. AMZ-R0015514-0015515).
Kohn, Daniel M., Letter to Jason Bluming, 1 page, Dec. 8, 1994. (Bates No. AMZ-R0015516).
Kohn, Daniel M., Letter to Jason Bluming, 1 page, Dec. 14, 1994. (Bates No. AMZ-R0015517).
Kohn, Daniel M., Letter to Josh Smith, 1 page, Nov. 17, 1994. (Bates No. AMZ-R0015518).
Kohn, Daniel M., Letter to Josh Smith, 1 page, Nov. 17, 1994. (Bates No. AMZ-R0015519).
Kohn, Daniel M., Letter to Kit Buckley, 1 page, Nov. 30, 1994. (Bates No. AMZ-R0015520).
Kohn, Daniel M., Letter to Kit Buckley, 1 page, Nov. 30, 1994. (Bates No. AMZ-R0015521).
Kohn, Daniel M., Letter to Libby Curtis, 1 page, Nov. 17, 1994. (Bates No. AMZ-R0015522).
Kohn, Daniel M., Letter to Libby Curtis, 1 page, Nov. 17, 1994. (Bates No. AMZ-R0015523).
Lee, Roger, Letter to Misha Davidson, 1 page, Apr. 19, 1995. (Bates No. AMZ-R001524).
Kohn, Daniel M., Letter to Nathan Shnidman, 1 page, Feb. 14, 1995. (Bates No. AMZ-R0015525).
Author Unknown, Spreadsheet of Salaries, 4 pages, date unknown. (Bates No. AMZ-R0015526-0015529).
Author Unknown, List of Employees, 1 page, date unknown. (Bates No. AMZ-R0015530).
Kohn, Daniel M., Letter to Rebecca Russell, 1 page, Mar. 30, 1995. (Bates No. AMZ-R0015531).
Kohn, Daniel M., Letter to Rebecca Russell, 1 page, Apr. 14, 1995. (Bates No. AMZ-R0015532).
Kohn, Daniel M., Letter to Rich Salz, 1 page, Feb. 21, 1995. (Bates No. AMZ-R0015533).
Kohn, Daniel M., Letter to Sean Hogarty, 1 page, Jan. 11, 1995. (Bates No. AMZ-R0015534).
Kohn, Daniel M., Letter to Will Porteous, 1 page, Jan. 9, 1995. (Bates No. AMZ-R0015535).
Kehoe, Brendan, E-mail to dan@netmarket.com, 14 pages, Feb. 28, 1995. (Bates Nos. AMZ-R0015536-0015549).
Kohn, Daniel M., Letter to Mr. Mark Joseph Birmingham, 1 page, Apr. 12, 1994. (Bates No. AMZ-R0015550).
Lee, Roger, Letter to Libby, 3 pages, Sep. 6, 1994. (Bates Nos. AMZ-R0015551-0015553).
Lee, Roger, Letter to Gus, 3 pages, Sep. 6, 1994. (Bates Nos. AMZ-R0015554-0015556).
Lee, Roger, Letter to Gus, 3 pages, Sep. 6, 1994. (Bates Nos. AMZ-R0015557-0015559).
Lee, Roger, Letter to Josh, 3 pages, Sep. 6, 1994. (Bates Nos. AMZ-R0015560-0015562).
Lee, Roger, Letter to Josh, 3 pages, Sep. 6, 1994. (Bates Nos. AMZ-R0015563-0015565).
Author Unknown, Letter to Mr. Stuart McMillan, 2 pages, Aug. 26, 1994. (Bates Nos. AMZ-R0015566-0015567).
Author Unknown, "Wanted Immediately", 1 page, date unknown. (Bates No. AMZ-R0015568).
Kohn, Daniel M., Letter to Brendan Kehoe, 1 page, Aug. 25, 1994. (Bates No. AMZ-R0015569).
Kohn, Daniel M., Resume of Daniel M. Kohn, 2 pages, date unknown. (Bates Nos. AMZ-R0015570-0015571).
Hirai, Eiji, Resume of Eiji Hirai, 2 pages, date unknown. (Bates Nos. AMZ-R0015572-0015573).
Lee, Robert H., Resume of Robert H. Lee, 2 pages, date unknown. (Bates Nos. AMZ-R0015574-0015575).
Author Unknown, "%IPS-Adobe-2.0", 18 pages, Mar. 10, 1994. (Bates Nos. AMZ-R0015576-0015593).
Author Unknown, Spreadsheet, 4 pages, date unknown. (Bates Nos. AMZ-R015594-0015597).
Author Unknown, Spreadsheet, 2 pages, date unknown. (Bates Nos. AMZ-R015598-0015599).
Author Unknown, Spreadsheet, 1 page, date unknown. (Bates No. AMZ-R015600).
Lee, Roger, Letter to Mr. Richard J. Fernandes, 1 page, Apr. 19, 2006. (Bates No. AMZ-R0015601).
Lee, Roger, Letter to Mr. Richard J. Fernandes, 1 page, Aug. 16, 1995. (Bates No. AMZ-R0015602).
Lee, Roger, Letter to Mr. Richard J. Fernandes, 2 pages, Aug. 23, 1995. (Bates No. AMZ-R0015603-0015604).
Roger, Letter to Mr. Richard J. Fernandes, 2 pages, Aug. 25, 1995. (Bates No. AMZ-R0015605-0015606).
Author Unknown, "Daniel M. Kohn is the founder of the NetMarket Company, a hi-tech start-up providing innovative Internet-based solutions to commercial retail, business-to-business, and content provider organizations seeking to expand the scope of their business to the global information infrastructure", 1 page, date unknown. (Bates No. AMZ-R0015607).
Kohn, Daniel, "So you want to build your own Web site?", The NetMarket Company, 1 page, date unknown. (Bates No. AMZ-R0015608).
Author Unknown, "Selling Over the Internet: Desinging Complete Solutions for Secure Transactions", 1 page, date unknown. (Bates No. AMZ-R0015609).
Kohn, Daniel M., Fax to Kelly Silver, 1 page, Apr. 19, 2006. (Bates Nos. AMZ-R0015610).
Kohn, Daniel, "Security Implications of Doing Business on the Internet", 2 pages, date unknown. (Bates Nos. AMZ-R0015611-0015612).
Kohn, Daniel M., Fax to Liz Sherlock, 1 page, Apr. 19, 2006. (Bates No. AMZ-R0015613).
Kohn, Daniel M., Fax to Liz Sherlock, 1 page, Apr. 19, 2006. (Bates No. AMZ-R0015614).
Kohn, Daniel M., Fax to Elizabeth Sherlock, 1 page, Mar. 19, 1995. (Bates No. AMZ-R0015615).
Author Unknown, "Selling Over the Internet: Accepting Financial Transactions Securely", 2 pages, date unknown. (Bates Nos. AMZ-R0015616-0015617).
Author Unknown, "Intro: one person's view, both theory and practice", 2 pages, date unknown. (Bates Nos. AMZ-R0015618-0015619).
Kohn, Dan, Memo to Eugene CLark, 2 pages, date unknown. (Bates Nos. AMZ-R0015620-0015621).
Author Unknown, Letter to John, 1 page, date unknown. (Bates No. AMZ-R0015622).
Kohn, Dan, Memo to Walter Forbes, 1 page, date unknown. (Bates No. AMZ-R0015623).
Author Unknown, "NetMarket Business Review", 2 pages, Mar. 31, 1995. (Bates Nos. AMZ-R0015624-0015625).
Kohn, Daniel M., Fax to Sandra Morgan, 1 page, Apr. 19, 2006. (Bates No. AMZ-R0015626).
Author Unknown, "Agenda for CUC/NetMarket Meeting", 3 pages, October 27, 1994. (Bates Nos. AMZ-R0015627-0015629).
Lee, Roger, Letter to Mr. Richard J. Fernandes, 1 page, Sep. 16, 1994. (Bates No. AMZ-R0015630).
Author Unknown, "CUC on the Internet", 2 pages, date unknown. (Bates Nos. AMZ-R0015631-0015632).
Author Unknown, Letter to Mr. Rick Fernandes, 1 page, date unknown (Bates No. AMZ-R0015633).

Lee, Roger, Memo to Chris McLeod, 1 page, date unknown. (Bates No. AMZ-R0015634).
Author Unknown, "Introduction", 1 page, date unknown. (Bates No. AMZ-R0015635).
Kohn, Daniel M., Letter to Ellen Alexander, 2 pages, Mar. 10, 1995. (Bates Nos. AMZ-R015636-0015637).
Author Unknown, "NetMarket - NaBANCO Agreement", 2 pages, Mar. 27, 1995. (Bates Nos. AMZ-R0015638-0015639).
Author Unknown, "NetMarket - NaBANCO Agreement", 2 pages, Apr. 3, 1995. (Bates Nos. AMZ-R0015640-0015641).
Author Unknown, "Prodigy and NetMarket: A Proposal", 2 pages, May 9, 1995. (Bates Nos. AMZ-R0015642-0015643).
Kohn, Daniel M., Letter to Al Vezza, 2 pages, Feb. 14, 1995. (Bates Nos. AMZ-R015644-0015645).
Kohn, Daniel M., Letter to Dr. Al Vezza, 1 page, Feb. 23, 1995. (Bates Nos. AMZ-R015646).
Kohn, Daniel M., Letter to Jeff Gershowitz, 1 page, Jan. 29, 1995. (Bates Nos. AMZ-R015647).
Kohn, Dan, "David-Although this document started out as an overview, it has become an in-depth analysis of how to do the technical implementation of the digital cash side of the NetCard", 10 pages, date unknown. (Bates Nos. AMZ-R0015658-0015659).
Author Unknown, "PPP Directions", 2 pages, Date Unknown. (Bates Nos. AMZ-R0015658-0015659).
Author Unknown, "NetMarket Stats - Jan. 1995", 5 pages, Jan. 1995. (Bates Nos. AMZ-R015660-0015664).
Author Unknown, "Hits 103994", 3 pages, date unknown. (Bates Nos. AMZ-R015665-0015667).
Author Unknown, "Hits 123204", 4 pages, date unknown. (Bates Nos. AMZ-R015668-0015671).
Author Unknown, "Hits 133476", 4 pages, date unknown. (Bates Nos. AMZ-R015672-0015675).
Author Unknown, "Hits 127599", 4 pages, date unknown. (Bates Nos. AMZ-R015676-0015679).
Author Unknown, "Hits 87762", 4 pages, date unknown. (Bates Nos. AMZ-R015680-0015683).
Author Unknown, "Every client relationship is different, and a lot of that difference depends on the unique character of the NetMarket employee who develops the relationship", 7 pages, date unknown. (Bates Nos. AMZ-R0015684-0015690).
Author Unknown, "Marketing Strategies for the NetMarket Company (Draft)", 6 pages, date unknown. (Bates Nos. AMZ-R0015700-0015705).
Author Unknown, "CGI Configuration", http://hoohoo.ncsa.uiuc.edu/docs/tutorials/cgi.html, 2 pages, Sep. 27, 1995. (Bates Nos. AMZ-R0015706-0015707).
Author Unknown, "NCSA Imagemap Tutorial", http://hoohoo.ncsa.uiuc.edu/docs/tutorials/imagemapping.html, 6 pages, Nov. 5, 1995. (Bates Nos. AMZ-R0015708-0015713).
Author Unknown, "NCSA Server Side Includes (SSI)", http://hoohoo.ncsa.uiuc.edu/docs/tutorials/includes.html, 4 pages, Dec. 5, 1995. (Bates Nos. AMZ-R0015714-0015718).
Author Unknown, "Installation Instructions", http://hoohoo.ncsa.uiuc.edu/docs/setup/instillation.html, 3 pages, Oct. 30, 1995. (Bates Nos. AMZ-R0015718-0015720).
Author Unknown, "Making your setup more secure", http://hoohoo.ncsa.uiuc.edu/docs/tutorials/security.html, 2 pages, Sep. 11, 1995. (Bates Nos. AMZ-R0015721-0015722).
Author Unknown, "Mosiac User Authentication Tutorial", http://hoohoo.ncsa.uiuc.edu/docs/tutorials/user.html, 7 pages, Sep. 27, 1995. (Bates Nos. AMZ-R0015723-0015729).
Author Unknown, "What is multihome/Virtualhost support", http://hoohoo.ncsa.uiuc.edu/docs/tutorials/VirtualHost.html, 3 pages, Oct. 20, 1995. (Bates Nos. AMZ-R0015730-0015732).
Author Unknown, "Note: Bugs are mentioned in the version they are found in", 2 pages, date unknown. (Bates Nos. AMZ-R0015741-0015742).
Author Unknown, "Changes for 1.5.2a", 5 pages, date unknown. (Bates Nos. AMZ-R0015743-0015747).
Author Unknown, "The official NCSA HTTPd copyright statement follows", University of Illinois, 2 pages, 1995. (Bates Nos. AMZ-R0015748-0015749).
Author Unknown, "We like to give credit where due", 3 pages, date unknown. (Bates Nos. AMZ-R0015750-0015752).
Author Unknown, This FastCGI application library source and object code (the "Software") and its documentation (the "Documentation") are copyrighted by Open Market, Inc. ("Open Market")., 1 page, date unknown. (Bates No. AMZ-R0015753).
Author Unknown, "### NCSA HTTPd 1.5", 2 pages, date unknown. (Bates Nos. AMZ-R0015754-0015755).
Author Unknown, "NCSA HTTPd Server 1.5.2", University of Illinois, 2 pages, 1995. (Bates Nos. AMZ-R0015756-0015757).
Author Unknown, "The information in this was the information in the README for the FCGI patch from Openmarket, and may not necessarily apply to this version of the server", 1 page, date unknown. (Bates No. AMZ-R015758).
Author Unknown, "NCSA HTTPd Server 1.5.2", University of Illinois, 2 pages, 1995. (Bates Nos. AMZ-R0015759-0015760).
Author Unknown, "#1/bin/sh", 1 page, date unknown. (Bates No. AMZ-R015761).
Author Unknown, "Calendar", 1 page, date unknown. (Bates No. AMZ-R015762).
Author Unknown, "#1/bin/sh", 1 page, date unknown. (Bates No. AMZ-R015763).
Author Unknown, "#1/bin/sh", 1 page, date unknown. (Bates Nos. AMZ-R0015764).
Author Unknown, "Finger Gateway", 1 page, date unknown. (Bates No. AMZ-R0015765).
Author Unknown, "#1/bin/sh", 1 page, date unknown. (bates No. AMZ-R015766).
Author Unknown, "#1/usr/local/bin/perl", 7 pages, Oct. 17, 1995. (Bates Nos. AMZ-R0015767-0015773).
Author Unknown, "#1/usr/local/bin/perl", 2 pages, date unknown. (Bates Nos. AMZ-R0015774-0015775).
Author Unknown, "#1/bin/sh", 1 page, date unknown. (Bates Nos. AMZ-R0015776).
Author Unknown, "#1/bin/sh", 1 page, date unknown. (Bates Nos. AMZ-R0015778).
Author Unknown, "#1/usr/local/bin/tcish", 1 page, date unknown. (Bates Nos. AMZ-R0015779).
Author Unknown, "#1/bin/sh", 1 page, date unknown. (Bates Nos. AMZ-R0015780).
Author Unknown, "#1/bin/sh", 1 page, date unknown. (Bates Nos. AMZ-R0015781).
Author Unknown, "#1/usr/local/bin/perl", 1 page, date unknown. (Bates Nos. AMZ-R0015782).
Author Unknown, "# For gcc", 2 pagea, date unknown. (Bates Nos. AMZ-R0015783-0015784).
Author Unknown, "NCSA HTTPd (comments, questions to httpd@ncsa.uiuc.edu)", 1 page, date unknown. (Bates No. AMZ-R0015785).
Author Unknown, "NCSA HTTPd (comments, questions to httpd@ncsa.uiuc.edu)", 5 pages, date unknown. (Bates No. AMZ-R0015786-0015790).
Author Unknown, "# With this document, you define the name space that users see of your http", 1 page, date unknown. (Bates No. 0015791).
Author Unknown, "This is a comment",1 page, date unknown. (Bates No. AMZ-R0015792).
Author Unknown, "NCSA HTTPd (comments, questions to httpd@ncsa.uluc.edu)", 2 pages, date unknown. (Bates Nos. AMZ-R0015793-0015794).
Author Unknown, "1.5.2a", 1 page, date unknown. (Bates No. AMZ-R0015821).
Author Unknown, "The following is NCSA HTTPd treatment of HTTP headers", 2 pages, date unknown. (Bates Nos. AMZ-R0015822-0015823).
Author Unknown, .TH httpd 1m "Oct. 1995 ", 1 page, date unknown. (Bates No. AMZ-R0015824).
Author Unknown, "child_main", 4 pages, date unknown. (Bates Nos. AMZ-R0015825-0015828).
Author Unknown, "# NCSA HTTPd 1.5", 6 pages, date unknown. (Bates Nos. AMZ-R0015829-0015834).
Author Unknown, "The format for change-passwd", 2 pages, date unknown. (Bates Nos. AMZ-R0015835-0015836).

Author Unknown, "## NCSA HTTPd", 3 pages, date unknown. (Bates Nos. AMZ-R0015837-0015839).

Author Unknown, "## NCSA HTTPd Server 1.5", Board of Trustees, University of Illinois, http://hoohoo.ncsa.uluc.edu/, 1 page, 1995. (Bates Nos. AMZ-R0015840).

Author Unknown, "## NCSA HTTPd change passwd", 2 pages, date unknown. (Bates Nos. AMZ-R0015841-0015842).

Author Unknown, "#1/bin/sh", 1 page, date unknown. (Bates Nos. AMZ-R0015843).

Author Unknown, "#1/bin/sh", 1 page, date unknown. (Bates Nos. AMZ-R0015844).

Author Unknown, "#1/bin/sh", 1 page, date unknown. (Bates Nos. AMZ-R0015845).

Author Unknown, "#1/bin/sh", 1 page, date unknown. (Bates Nos. AMZ-R0015846).

Various Authors, "WWW Talk 1991 Archives", Archive of Message Postings, 84 pages, Oct. 28, 1991. (Bates Nos. AMZ-R0015876-0015959).

Various Authors, "WWW Talk 1992 Archives", Archive of Message Postings, 1,133 pages, Jan. 9, 1992. (Bates Nos. AMZ-R0015860-0017092).

Various Authors, "WWW Talk Apr.-Jun. 1993 Archives", Archive of Message Postings, 1,449 pages, Mar. 31, 1993. (Bates Nos. AMZ-R0017093-0018541).

Various Authors, "WWW Talk Jul.-Oct. 1993 Archives", Archive of Message Postings, 2,234 pages, Jun. 30, 1993. (Bates Nos. AMZ-R0018542-0020775).

Various Authors, "WWW Talk Jan.-Mar. 1994", Archive of Message Postings, 2,561 pages, Jan. 1, 1994. (Bates Nos. AMZ-R0022765-0022764).

Various Authors, WWW Talk Oct. 1993-Present, Archive of Message Postings,1,989 pages, Sep. 30, 1993. (Bates Nos. AMZ-R0022765-0025325).

Various Authors, "WWW Talk Apr.-Jun. 1994", Archive of Message Postings, 3,044 pages, Apr. 1, 1994. (Bates Nos. AMZ-R0025326-0028369).

Various Authors, "WWW Talk Jul. 1994-Sep. 1994 by thread", Archive of Message Postings, 2,427 pages, Jul. 1, 1994. (Bates Nos. AMZ-R0028370-0030796).

Various Authors, "WWW Talk Oct.-Dec. 1994 by thread", Archive of Message Postings, 2,419 pages, Oct. 1, 1994 - Jan. 17, 1995. (Bates Nos. AMZ-R0030797-0033215).

Various Authors, "WWW Talk Jul. 95-present by thread", Archive of Message Postings, 600 pages, Jul. 3, 1995 - Aug. 2, 1995. (Bates Nos. AMZ-R0033215-0033815).

Author Unknown, E-mail regarding eCard, 1 page, Jun. 26, 1996 (Bates No. AMZ-R0033816).

Author Unknown, E-mail regarding eCard, 1 page, Jun. 14, 1994 (Bates No. AMZ-R0033817).

internetlbmmail.comlusib5ssz, E-mail regarding Four11, 2 pages, Oct. 12, 1995. (Bates Nos. AMZ-R0033818-0033819).

internetlbmmail.comlusib5ssz, E-mail regarding Four11, 5 pages, Oct. 13, 1995. (Bates Nos. AMZ-R0033820-0033824).

internetlbmmail.comlusib5rgt, E-mail regarding InterOp PDI Messages, 4 pages, Sep. 13, 1995. (Bates Nos. AMZ-R0033825-0033828).

Dawson, Frank, E-mail regarding Vcard Spec of Mar. 1996?, 1 page, Sep. 9, 2004. (Bates No. AMZ-R0033829).

Ralden@alden.attnmail.com, E-mail regarding part 2 HTML for Comdex, 4 pages, Oct. 30, 1995. (Bates Nos. AMZ-R0033830-0033833).

Frederking, Rick, E-mail reagarding Vcard Spec of Mar. 1996@, 2 pages, Aug. 31, 2004. (Bates Nos. AMZ-R0033834-0033835).

Author Unknown, E-mail regarding eCard, 1 page, Jun. 2, 1994. (Bates No. AMZ-R0033844).

Author Unknown, E-mail regarding eCard, 1 page, Jun. 2, 1994. (Bates No. AMZ-R0033845).

Author Unknown, E-mail regarding eCard, 2 pages, May 31, 1994. (Bates No. AMZ-R0033846-0033847).

Yesil, Magdalena, "Creating the Virtual Store", John Wiley & Sons, Inc., 2 pages, 1997. (Bates Nos. AMZ-R0036848-0036849).

Wang, Wallace, "CompuServe for Dummies, A Reference for the Rest of Usl", IDG Books, 3 pages, 1994. (Bates Nos. AMZ-R0036850-0036852).

Tatters, Wes, "Navigating the Internet with CompuServe", Sams.net Publishing, 3 pages, 1995. (Bates Nos. AMZ-R0036853-0036855).

Davis, Steve, "CompuServe Information Manager for Windows", CompuServe Incorporarted, 3 pages, 1994. (Bates Nos. AMZ-R0036856-0036858).

Zheng et al., "Networks for Computer Scientists and Engineers", Oxford University Press, 3 pages, 2002. (Bates Nos. AMZ-R0036859-0036861).

Dougherty et al., "The Mosaic Handbook", O'Reily & Associates, Inc., 3 pages, 1994. (Bates Nos. AMZ-R0036862-0036864).

Halsall, Fred, "Data Communications, Computer Networks and Open Systems", Addison-Wesley Publishing Co., Inc., 3 pages, 1992. (Bates Nos. AMZ-R003865-003867).

Wiggins, Richard W., "The Internet for Everyone", R. R. Donnelly & Sons, Inc., 3 pages, 1994. (Bates Nos. AMZ-R0036868-0036870).

Wynkoop, Stephen, "Running a Perfect Web Site", Que Corporation, 3 pages, 1996. (Bates Nos. AMZ-R0036871-0036873).

Quarterman, John S., "The Matrix", Butterworth-Heinemann, 3 pages, 1997. (Bates Nos. AMZ-R0036874-0036876).

Eckel, George, "Building a Unix Internet Server", New Riders Publishing, 4 pages, 1995. (Bates Nos. AMZ-R0036877-0036880).

Stein, Lincoln D., "How to Set Up and Maintain a World Wide Web Site", Corporate & Professional Publishing Group, 4 pages, 1995. (Bates Nos. AMZ-R003681-0036884).

Liu et al., "Managing Internet Information Services", O'Reilly & Associates, Inc., 3 pages, 1994. (Bates Nos. AMZ-R0036885-0036887).

Tanenbaum, Andrew S., "Computer Networks", Prentice-Hall, Inc., 3 pages, 1989. (Bates Nos. AMZ-R0036888-0036890).

Tanenbaum, Andrew S., "Computer Networks", Prentice-Hall, Inc., 3 pages, 1996. (Bates Nos. AMZ-R0036891-0036893).

Tittel et al., "World Wide Web Programming with HTML & CGI", IDG Books Worldwide, Inc., 3 pages, 1995. (Bates Nos. AMZ-R0036894-0036896).

Powell et al., "Atlas to the World Wide Web", Ziff-Davis Press, 3 pages, 1995. (Bates Nos. AMZ-R0036897-0036899).

Author Unknown, "IBM Dictionary of Computing", International Business Machines Corporation, 3 pages, 1994. (Bates Nos. AMZ-R0036900-0036902).

Author Unknown, "Dictionary of Computing", Oxford University Pressm, 4 pages, 1990. (Bates Nos. AMZ-R0036903-0036906).

Author Unknown, "Computing Dictionary", Microsoft Press, 3 pages, 1994. (Bates Nos. AMZ-R0036907-0036909).

Gunton, Tony, "A Dictionary of Information Technology and COmputer Science", Penguin Books Limited, 3 pages, 1993. (Bates Nos. AMZ-R0036910-0036912).

Cronin, Mary J., "Doing Business on the Internet", Van Nostrand Reinhold, 3 pages, 1995. (Bates Nos. AMZ-R0036913-0036915).

Vaughan-Nichols et al., "Inside the World Wide Web", New Riders Publishing, 3 pages, 1995. (Bates Nos. AMZ-R0036916-0036918).

Eager et al., "Using the World WIde Web and Mosaic", Que Corporation, 3 pages, 1995. (Bates Nos. AMZ-R0036919-0036921).

Corner, Douglas E., Internetworking with TCP/IP, vol. 1, Prentice-Hall, Inc., 3 pages, 1991. (Bates Nos. AMZ-R0036922-0036924).

Author Unknown, "Computer Dictionary", Microsoft Press, 3 pages, 1991. (Bates Nos. AMZ-R0036925-0036927).

Stalling, William, "Data and Computer Communications", Macmillan Publishing Company, 3 pages, 1988. (Bates Nos. AMZ-R0036928-0036930).

Author Unknown, "The American Heritage Dictionary", Dell Publishing, 2 pages, 1992. (Bates Nos. AMZ-R0036931-0036932).

Author Unknown, "Webster's Third New International Dictionary", Merriam-Webster Inc., 2 pages, 1993. (Bates Nos. AMZ-R0036933-0036934).

Hanna et al., "Section 3. The Economics of Information", The Ohio State University, 7 pages, 1994. (Bates Nos. AMZ-R0036935-0036941).

Andrews et al., "Soaring through hyperspace: A snapshot of Hyper-G and its Harmony Client", Proc. Of Eurographics Symposium and Workshop Multimedia: Multimedia/Hypemedia in Open Distributed Environments, Graz, Austria, 10 pages, Jun. 1994. (Bates Nos. AMZ-R0036942-0036951).

Author Unknown, "AIIM", Applied Image, Inc., 193 pages, date unknown. (Bates Nos. AMZ-R0036952-0037144).

Cavanagh, Luke, "Charting a New Course: Time Retires Pathfinder in Favor of Vertical Theme Portals", The Seybold Report on Internet Publishing, vol. 3, No. 10, pp. 3-5, date unknown. (Bates Nos. AMZ-R0037145-0037147).

Author Unknown, "Research Firms Strive for Web Tracking that Counts: New Tracking Systems Promise Individual Consumer Portraits", Interactive Marketing News, vol. 2, No. 13, Jun. 23, 1995.

Kennedy, James, "Opinion-Is 'Irrltainment' Good for Advertisers?", World Internet Adveritisn Report, http://www.internet.com, Mecklemedia Corp., 4 pages, 1996.

Krantz, Michael, "Web feat: Site auditing", Mediaweek, vol. 5, No. 34, pp. 23, Sep. 11, 1995.

Taylor, Catharine P., "Interstitial Ads Make an Appearance", Interactive Week, Cybermedia Online Contents, Services and Communications, p. 29, May 19, 1997.

Author Unknown, "Webster's New World Dictionary of Computer Terms", 4th Edition, 2 pages, 1992. (Bates Nos. AMZ-R0037218-0037219).

Ellsworth et al., "The Internet Business Book", 2 pages, 1994. (Bates Nos. AMZ-R00037220-0037221).

Author Unknown, "getstats 1.2", 1 page, Apr. 16, 1994. (Bates Nos. AMZ-R0037222).

Author Unknown, "Overridden by -C, -N, -G,-A, and -O options", 85 pages, date unknown. (Bates AMZ-R0037223-0037307).

Behlendorf, Brian, "statform 1.0", 7 pages, Apr. 15, 1994. (Bates Nos. AMZ-R0037308-0037314).

Author Unknown, "Getstats From Interface", 3 pages, date unknown. (Bates Nos. AMZ-R0037315-0037317).

Author Unknown, "Loggins Control in W3C httpd", 3 pages, Jul. 1995. (Bates Nos. AMZ-R0037318-0037320).

Author Unknown, "Internet", Wikipedia, 11 pages, date unknown. (Bates Nos. AMZ-R0037321-0037331).

Author Unknown, "Dark Internet", Wikipedia, 2 pages, date unknown. (Bates Nos. AMZ-R0037332-0037333).

Author Unknown, "Demographics", Wikipedia, 4 pages, date unknown. (Bates Nos. AMZ-R0037334-0037337).

Author Unknown, "Internetworking", Wikipedia, 1 page, date unknown. (Bates Nos. AMZ-R0037338).

Hoffman et al., "Commercial Scenarios for the Web: Opportunitites and Challenges", http://www.ascusc.org/jcmc/vol1/issue3/hoffman.html, 21 pages, Aug. 30, 2000. (Bates Nos. AMZ-R0037358-0037378).

Author Unknown, "Hypertext Terms", 2 pages, 1992. (Bates Nos. AMZ-R0037379-0037380).

Lavole et al., "Web Characterization Terminology & Definitions Sheet", W3C, 10 pages, May 24, 1999. (Bates Nos. AMZ-R0037381-0037390).

Author Unknown, "In, Around and Online - Issue 5, Week Ending Oct. 7, 1994", 5 pages, Oct. 7, 1994. (Bates Nos. AMZ-R0037391-0037395).

Hamer, Christian, "Google Groups: rec.food.cooking", 1 page, Jan. 5, 1995. (Bates No. AMZ-R0037396).

Hamer, Christian, "Google Groups: biz.comp.services", 1 page, Oct. 25, 1994. (Bates No. AMZ-R0037397).

Minor et al., File History of U.S. Patent No. 5,740,252, Issued Apr. 14, 1998. (Bates Nos. AMZ-R0037409-0037496).

Author Unknown, "U.S. Census Bureau", 3 pages, Dec. 16, 1996. (Bates Nos. AMZ-R0037515-0037517).

Author Unknown, "U.S. Export Restricted Software Download FAQ", 4 pages, Mar. 14, 1997. (Bates Nos. AMZ-R0037518-0037521).

Freedman, Alan, "The Computer Glossary", Sixith Edition, 3 pages, 1993. (Bates Nos. AMZ-R0037522-0037524).

Johnson, Ned, "Navigating the Internet with Prodigy", 3 pages, 1995. (Bates Nos. AMZ-R0037525-0037527).

Author Unknown, "getstats.c version 1.2", Getstats Documentation, 11 pages, May 18, 1994. (Bates Nos. AMZ-R0037528-0037538).

Author Unknown, Business Wire, "CompuServe Selects I/PRO - Internet Profiles Corporation - to Provide User Registration and Measurement Capabilities for the World's First $1 Million Internet Scavenger Hunt," published Jun. 20, 1995, 2 pages.

Author Unknown, CompuServe, "CompuServe Internet Hunt," CompuServe Magazine, Aug. 1995, p. 56, 2 page.

Author Unknown, CompuServe, "The CompuServe $1,000,000 Internet Hunt 1995 Offical Contest Rules," CompuServe Magazine, Oct. 1995, p. 48, 2 pages.

Author Unknown, web pages describing the I/CODE Universal Registration System, published by Internet Profiles Corporation, www.ipro.com, Aug. 29, 1995, 4 pages.

Author Unknown, Market Research Firms Target Web Traffic Data, PC Week, May 29, 1995, 2 pages.

Author Unknown, Internet Profiles Corporation Business Plan, Mar. 1995, 39 pages.

Hall, D., et al., *Build a Website: The Programmer's Guide to Creating, Building and Maintaining a Web Presence*, First Edition, Apr. 1995, submitted on CD-Rom.

Pathfinder Source Code, 1385 computer files representing the source for a software application called Pathfinder, submitted on CD-Rom.

Reexamination U.S. Appl. No. 95/000,212 filed Jan. 25, 2007, submitted on CD-Rom.

Order Granting Request for Inter Partes Reexamination, mailed Mar. 21, 2007, U.S. Appl. No. 95/000,212, 30 pages.

Office Action in Inter Partes Reexamination, mailed May 21, 2007, U.S. Appl. No.95/000,212, 16 pages.

Response by Patent Owner to Office Action in Inter Partes Reexamination, dated Aug. 29, 2007, 31 pages.

Order Granting Request for Ex Parte Reexamination of U.S. Patent No. 6,823,327, issued Nov. 23, 2004, Reexamination Serial No. 90/007,962, 12 pages.

Research Firms Strive for Web Tracking that Counts New Tracking Systems Promise Individual Consumer Portraits, Interactive Marketing News, v2, n13, Jun. 13, 1995.

Office Action in Ex Parte Reexamination U.S. Appl. No. 90/007,961, mailed Oct. 22, 2007, 13 pages.

Response by Patent Owner to Office Action in Ex Partes Reexamination U.S. Appl. No. 90/007,961, dated Dec. 21, 2007, 20 pages.

Office Action in Ex Parte Reexamination U.S. Appl. No. 90/007,962, mailed Nov. 5, 2007, 38 pages.

Response by Patent Owner to Office Action in Ex Partes Reexamination U.S. Appl. No. 90/007,962, dated Jan. 7, 2008, 20 pages.

Final Office Action in Ex Parte Reexamination U.S. Appl. No. 90/007,962, dated Sep. 25, 2008, 40 pages.

Office Action in Inter Partes Reexamination, U.S. Appl. No. 95/000,212, mailed Oct. 21, 2008, 93 pages.

Office Action in Ex Parte Reexamination U.S. Appl. No. 90/007,961, mailed Dec. 19, 2008, 43 pages.

* cited by examiner

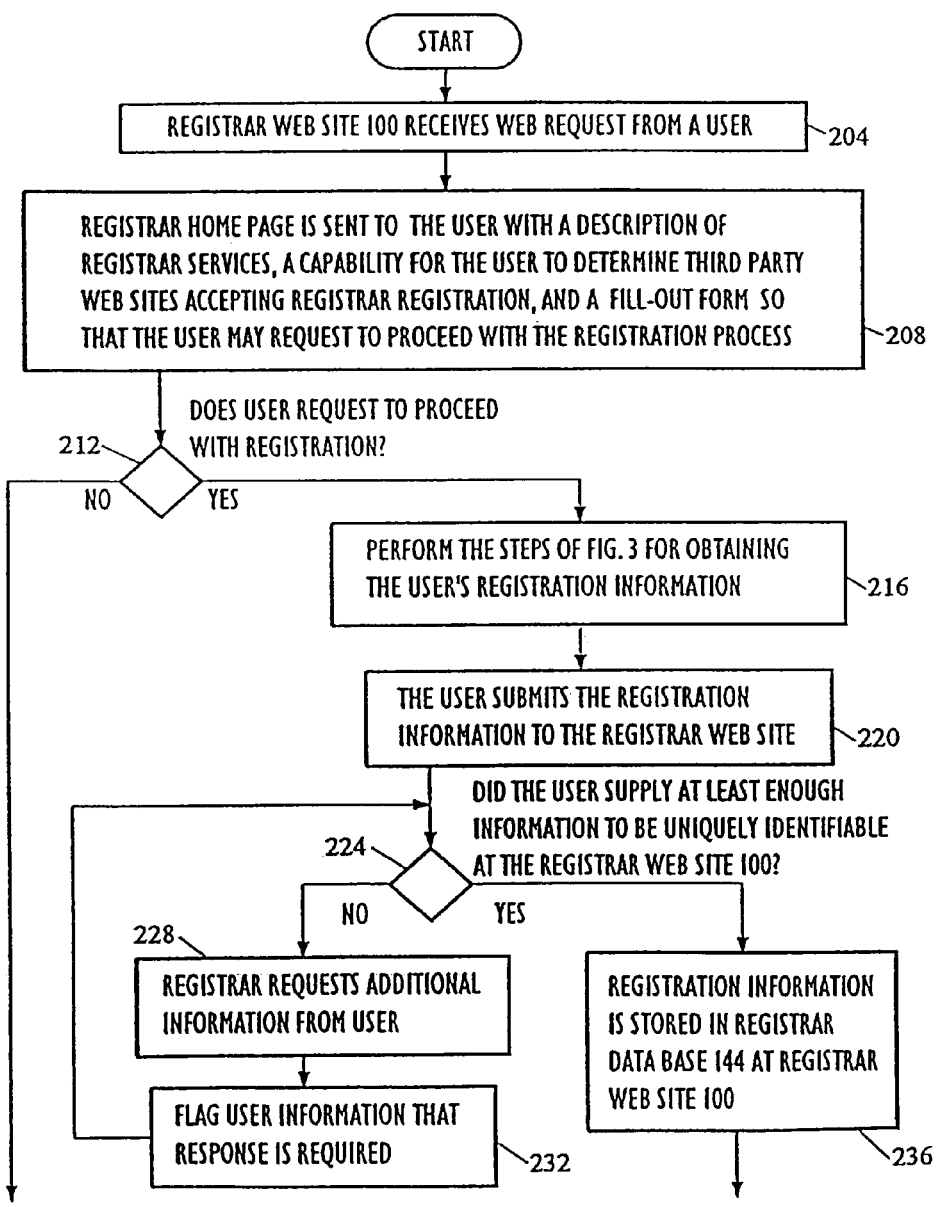
FIG. 2A  REGISTRAR REGISTRATION USING REGISTRAR WEB SITE TO STORE REGISTRATION INFORMATION FOR TRANSMITTAL TO THIRD PARTY WEB SITES FROM REGISTRAR WEB SITE (MAY BE INVOKED BY THE USER OR BY FIGS. 4)

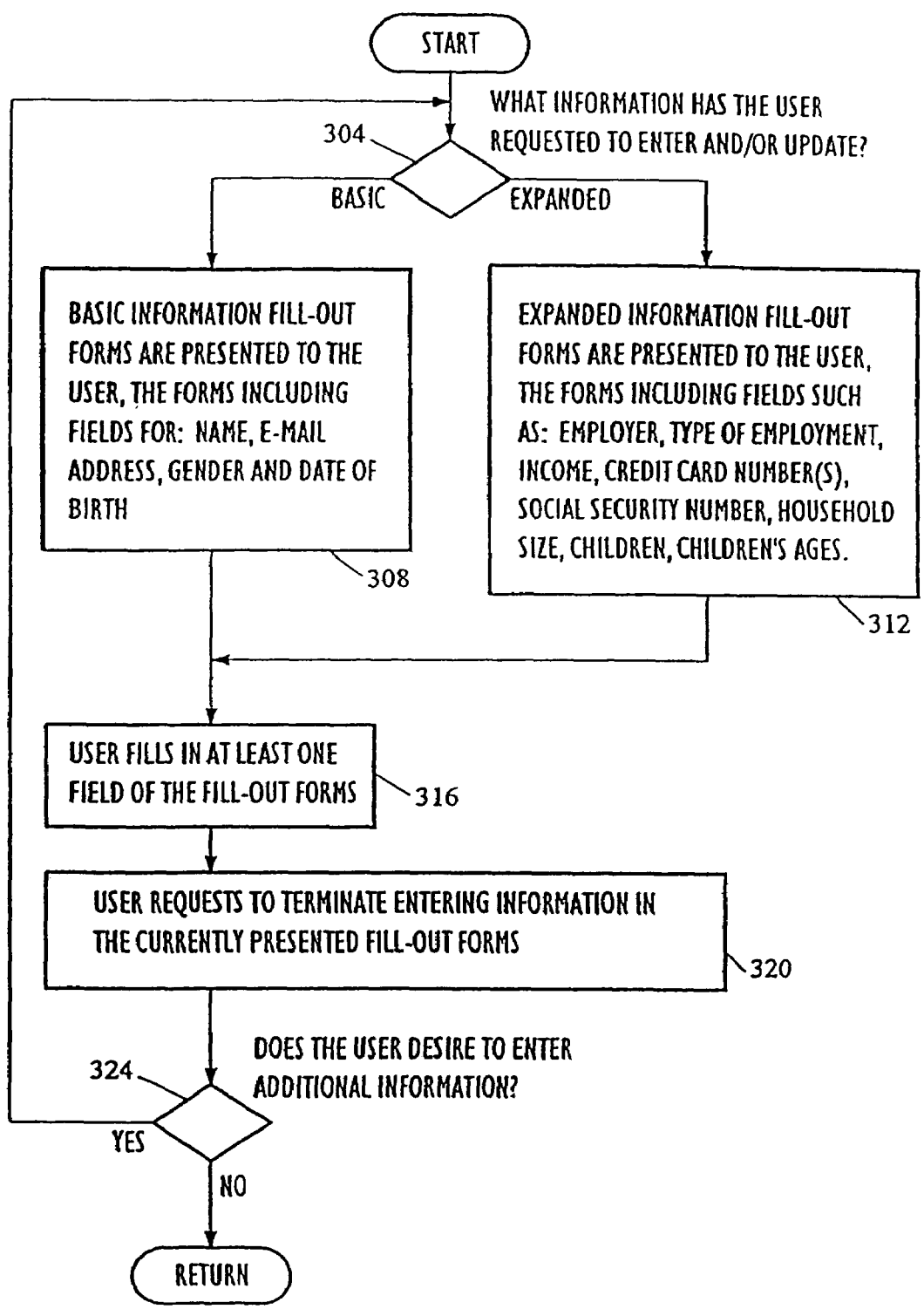
FIG. 3 USER ENTERS REGISTRAR INFORMATION (MAY BE INVOKED BY FIGS. 2 AND 12)

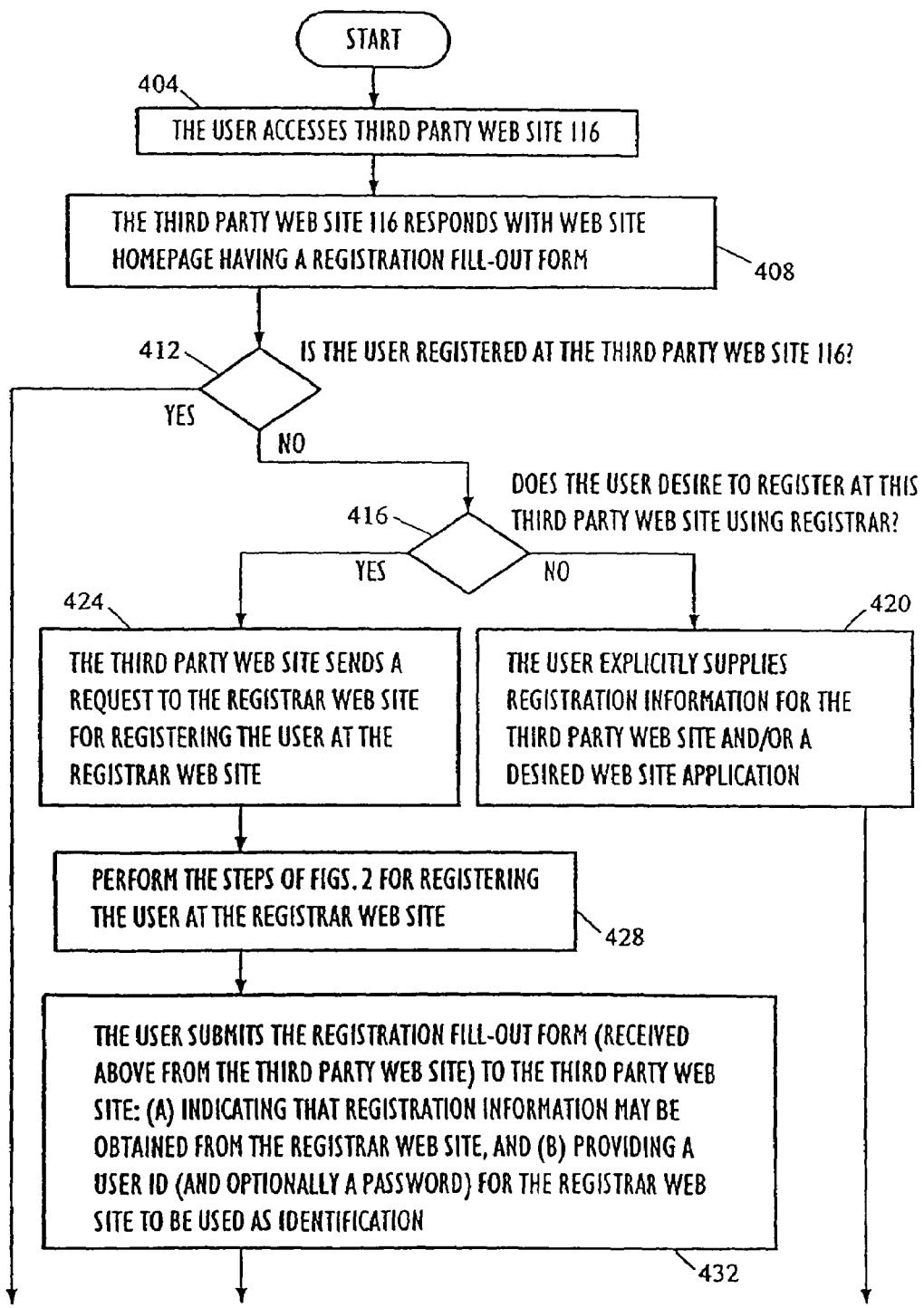
FIG. 4A THE USER REGISTERS AT THE REGISTRAR WEB SITE WHEREIN A THIRD PARTY WEB SITE IS FIRST ACCESSED FIG. 5   REGISTRATION TRANSMISSION PROCESS BETWEEN REGISTRAR WEB SITE AND THIRD PARTY WEB SITE (MAY BE INVOKED BY FIGS. 4)
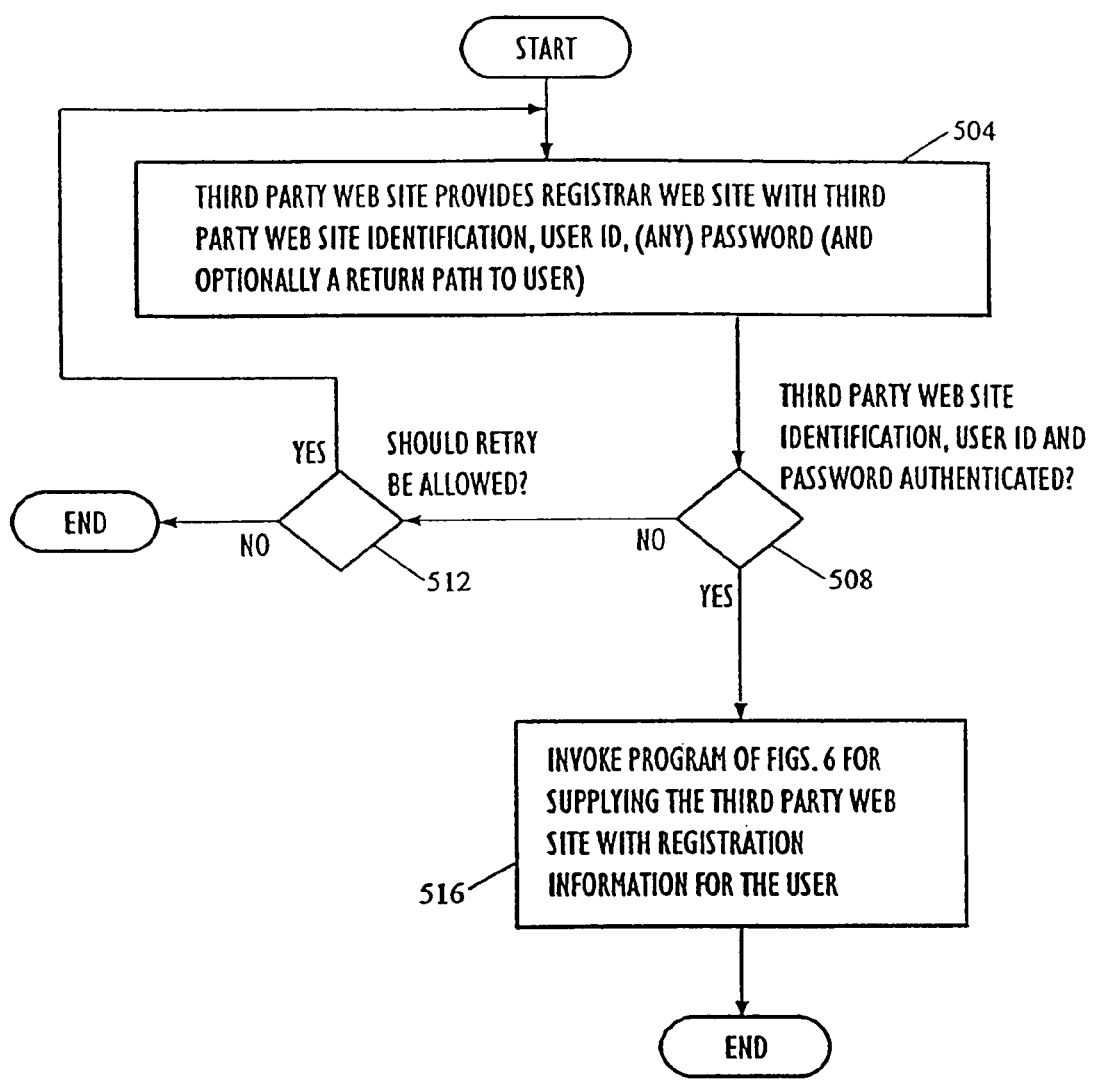

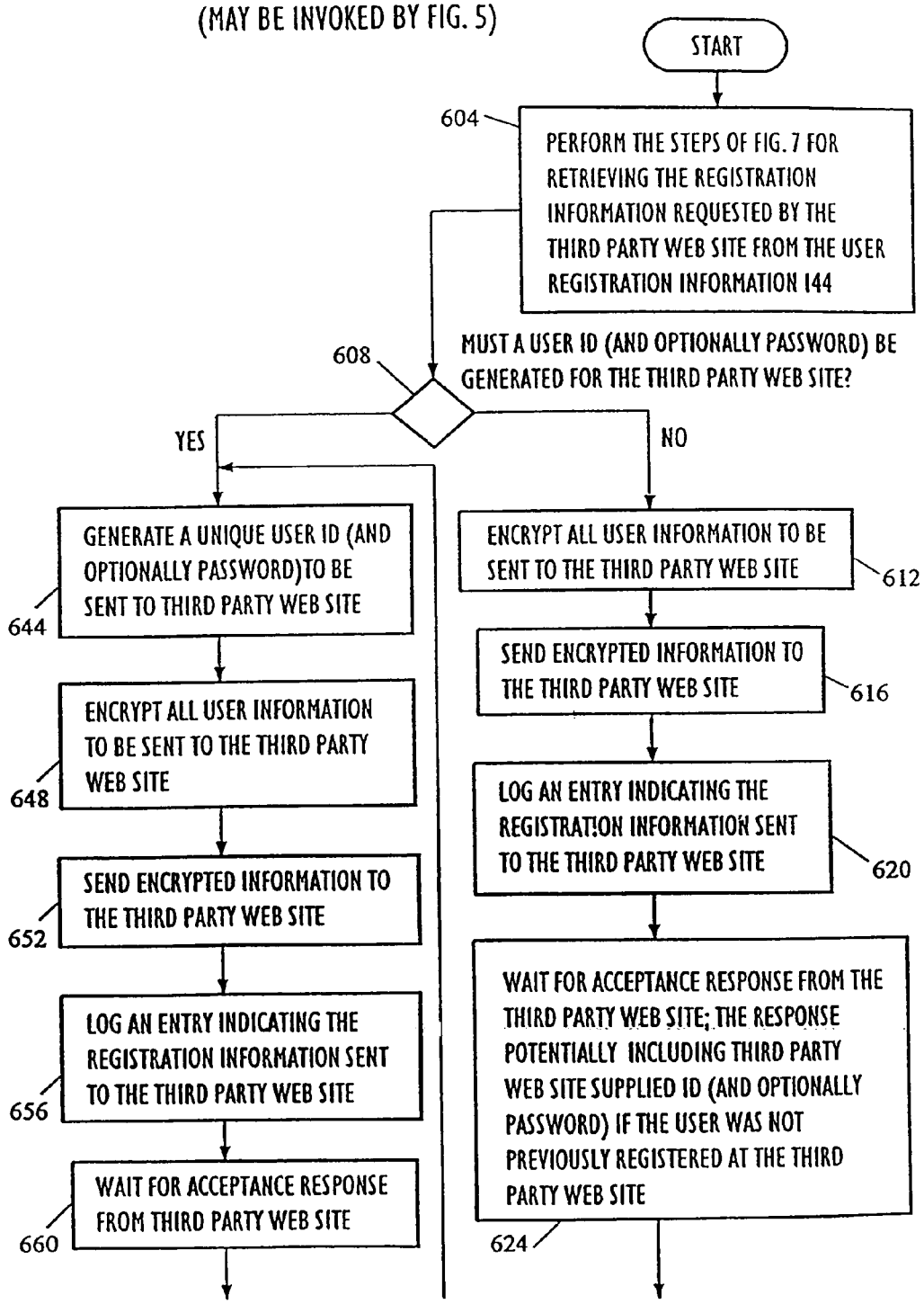
FIG. 6A PROGRAM FOR SUPPLYING A THIRD PARTY WEB SITE WITH REGISTRATION INFORMATION FROM REGISTRAR WEB SITE (MAY BE INVOKED BY FIG. 5)

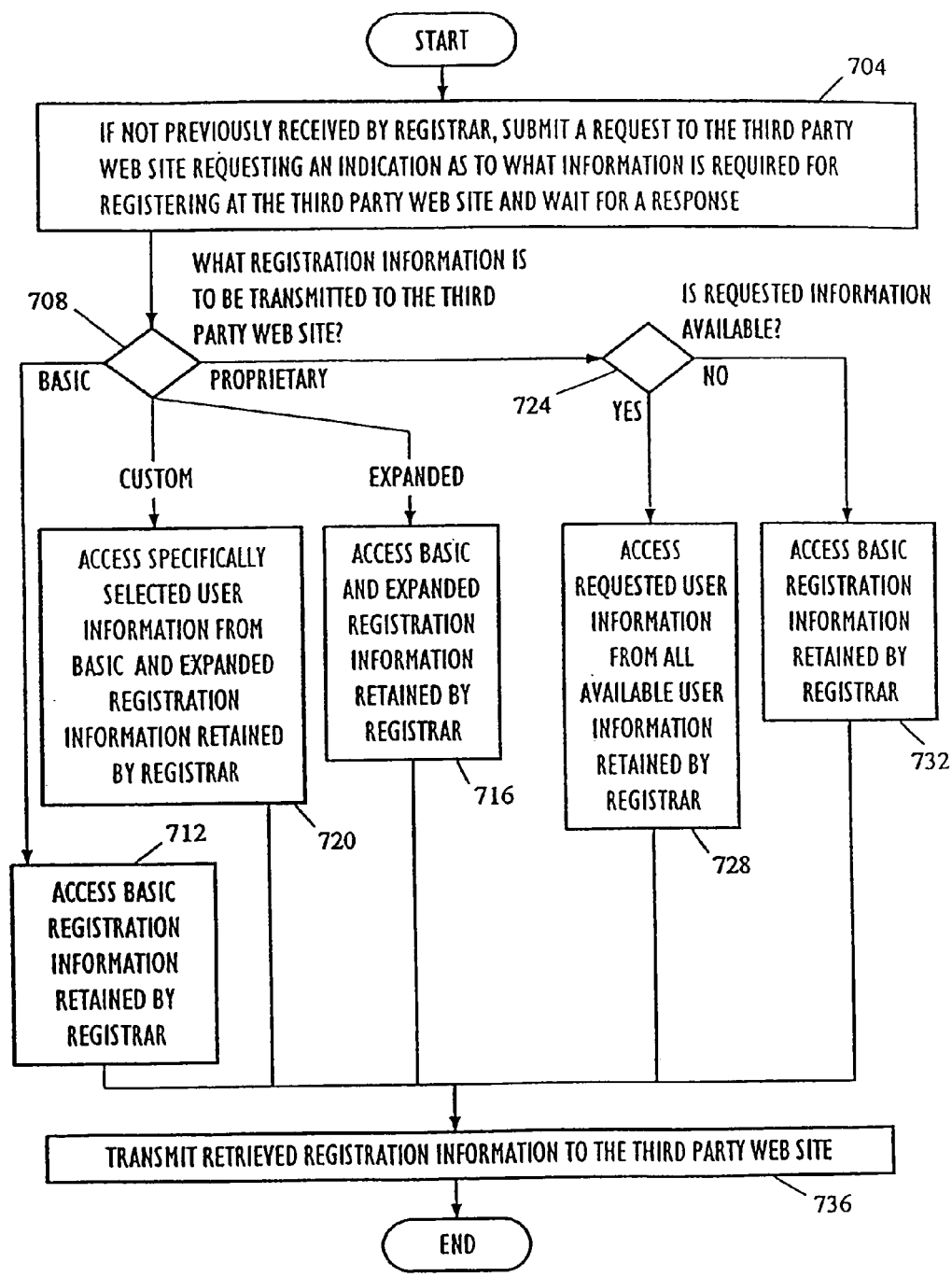
FIG. 7 PROGRAM FOR ACCESSING REGISTRATION INFORMATION FOR A THIRD PARTY WEB SITE (MAY BE INVOKED BY FIGS. 6A AND 10)

FIG. 8 REGISTRAR STORES THIRD PARTY WEB SITE USER ID AND PASSWORD (MAY BE INVOKED BY FIG. 6B)
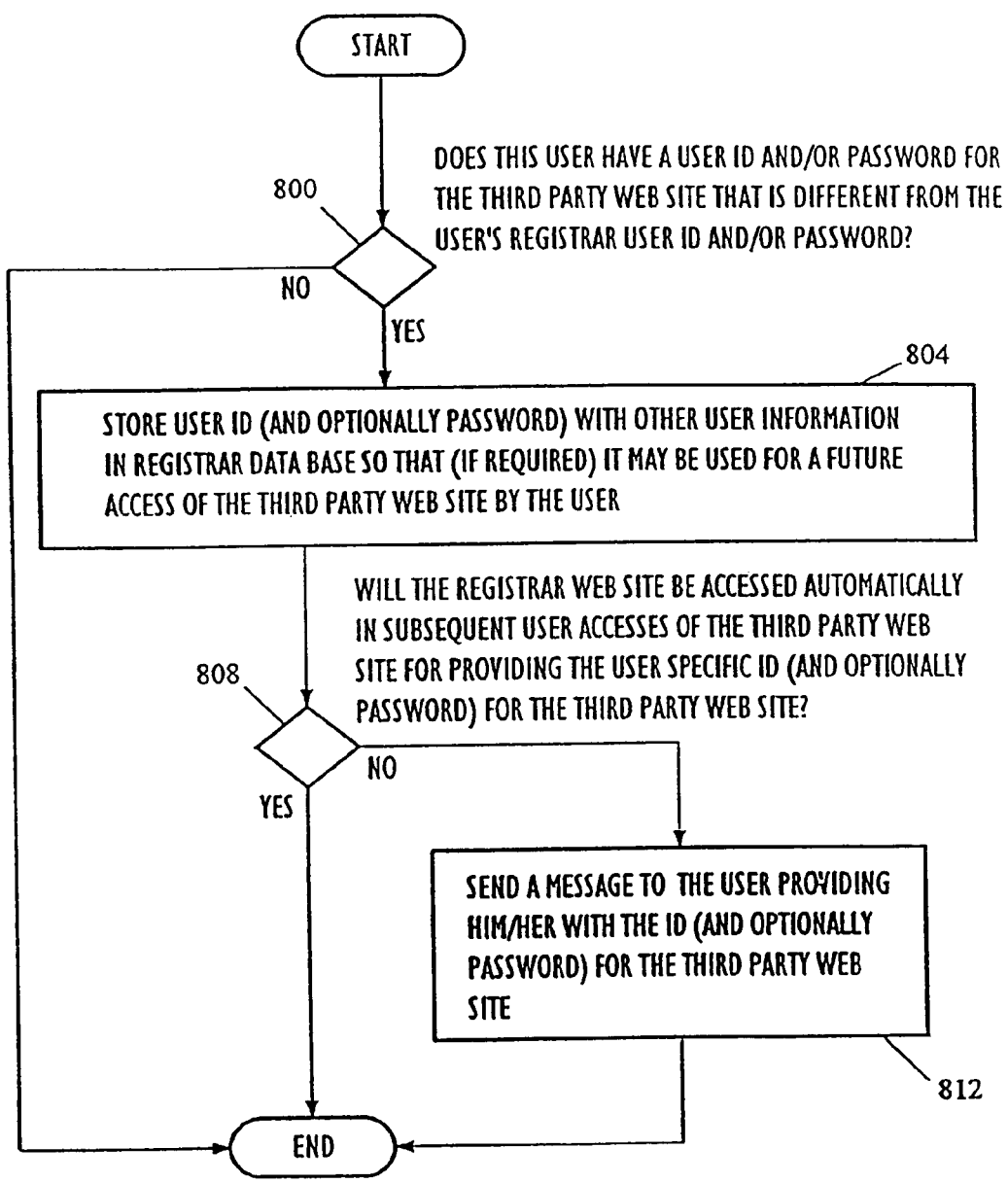

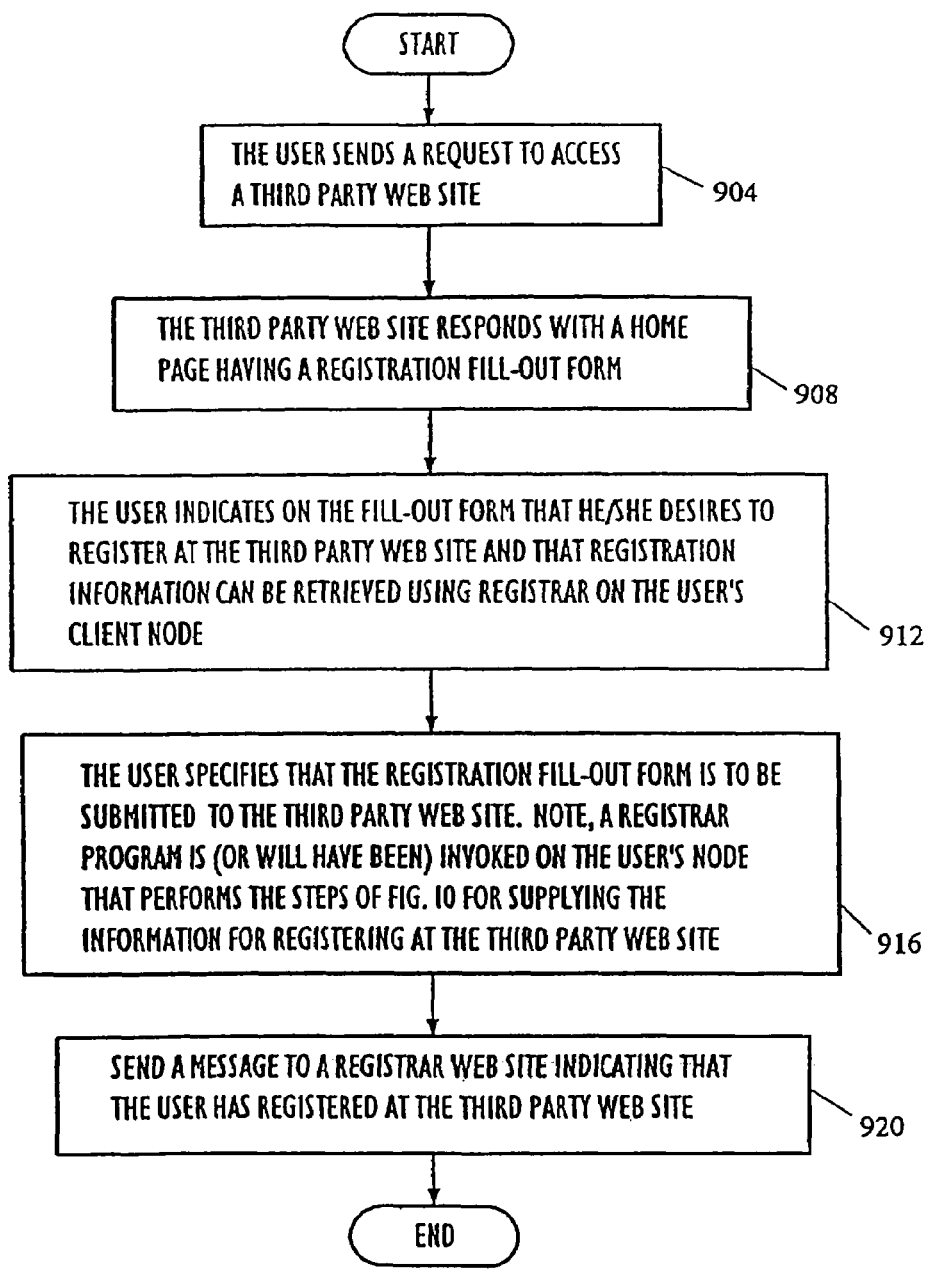
FIG. 9 REGISTRATION TRANSMISSION PROCESS BETWEEN REGISTRAR ON THE USER'S NETWORK NODE AND A THIRD PARTY WEB SITE (INVOKED BY THE USER)

FIG. 10    PROGRAM FOR SUPPLYING A THIRD PARTY WEB SITE WITH REGISTRATION INFORMATION RETAINED BY REGISTRAR ON THE USER'S NODE (MAY BE INVOKED BY FIG. 9)
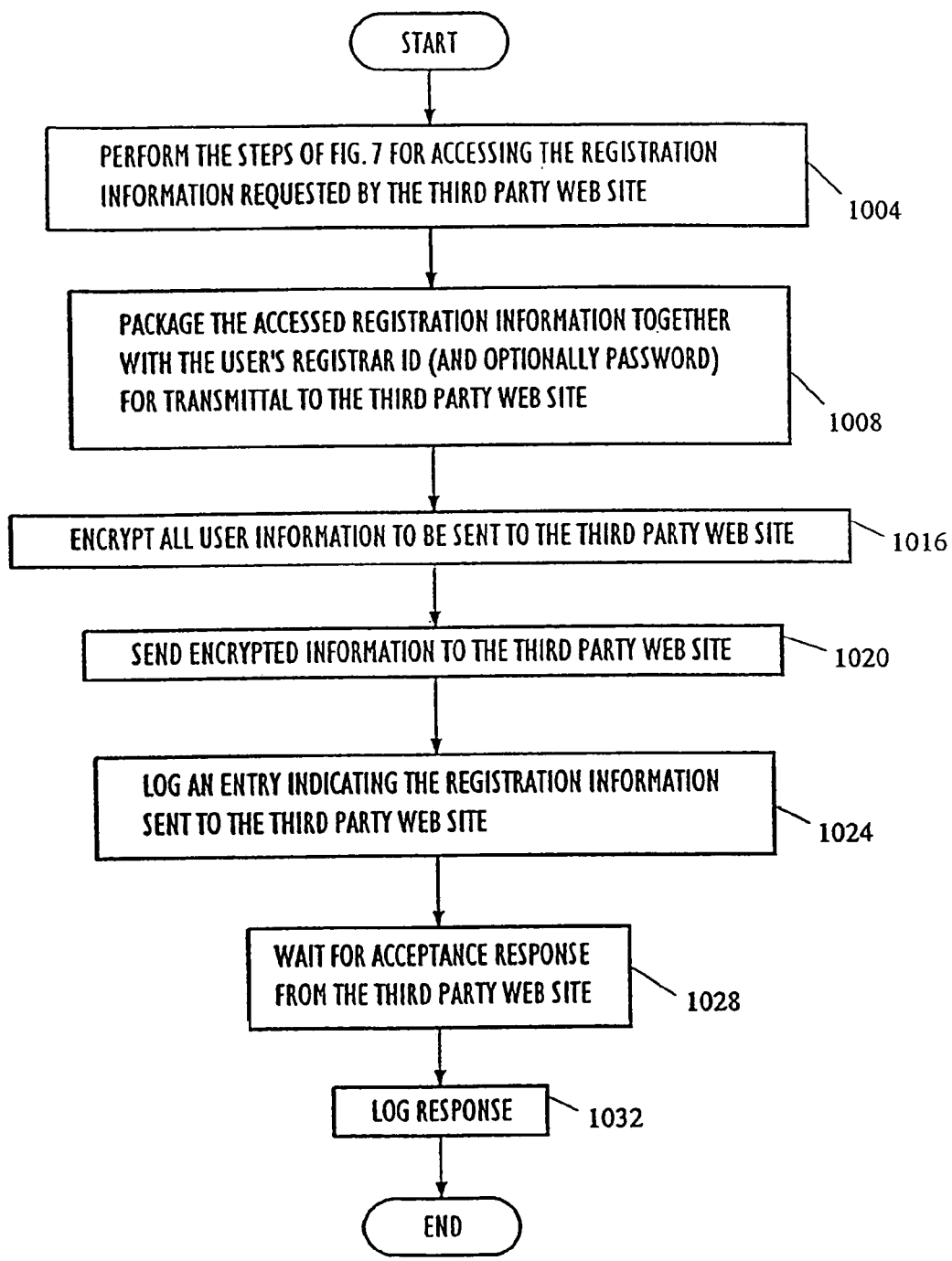

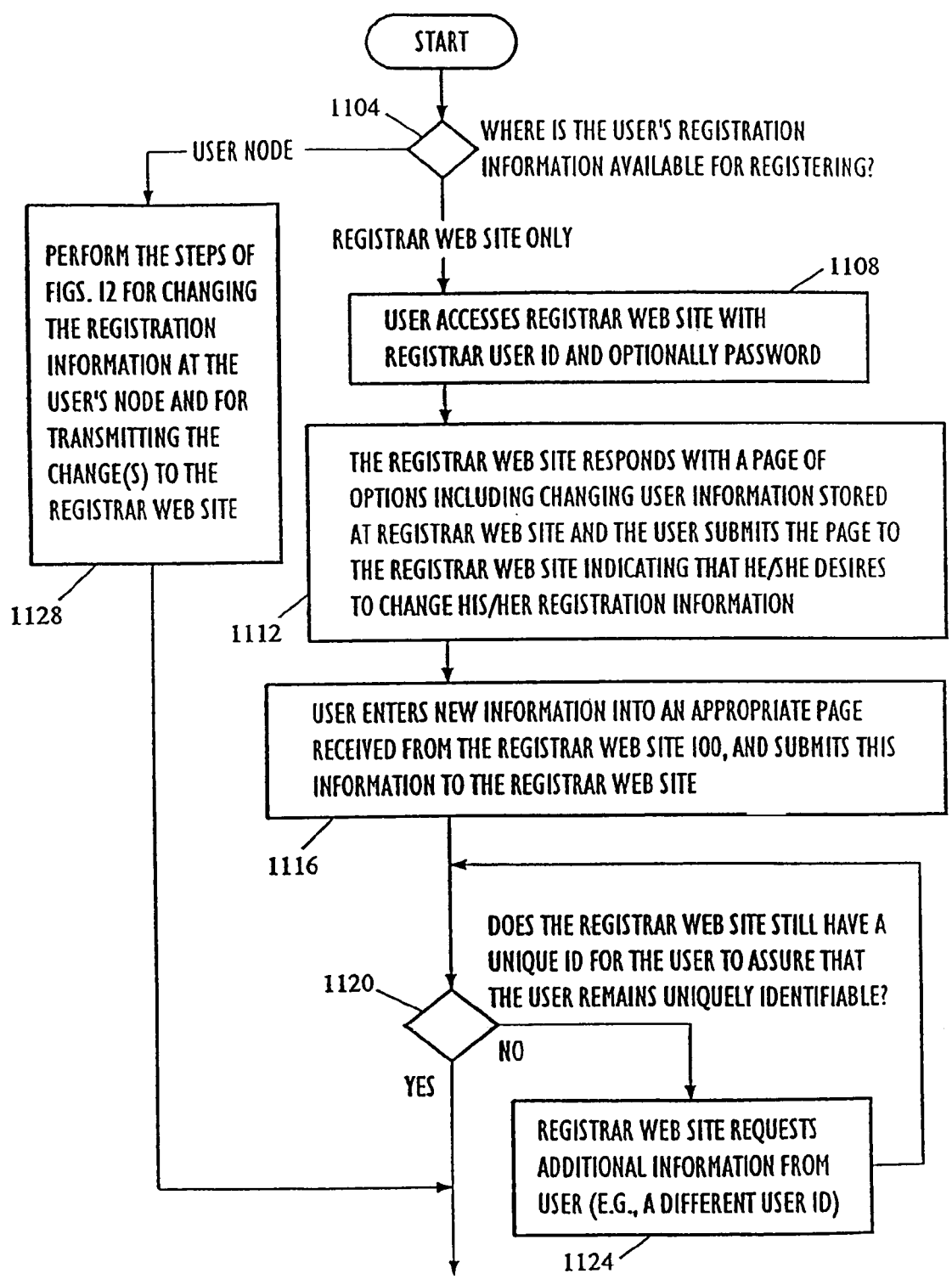
FIG. 11A  CHANGE USER INFORMATION IN REGISTRAR (INVOKED BY THE USER)

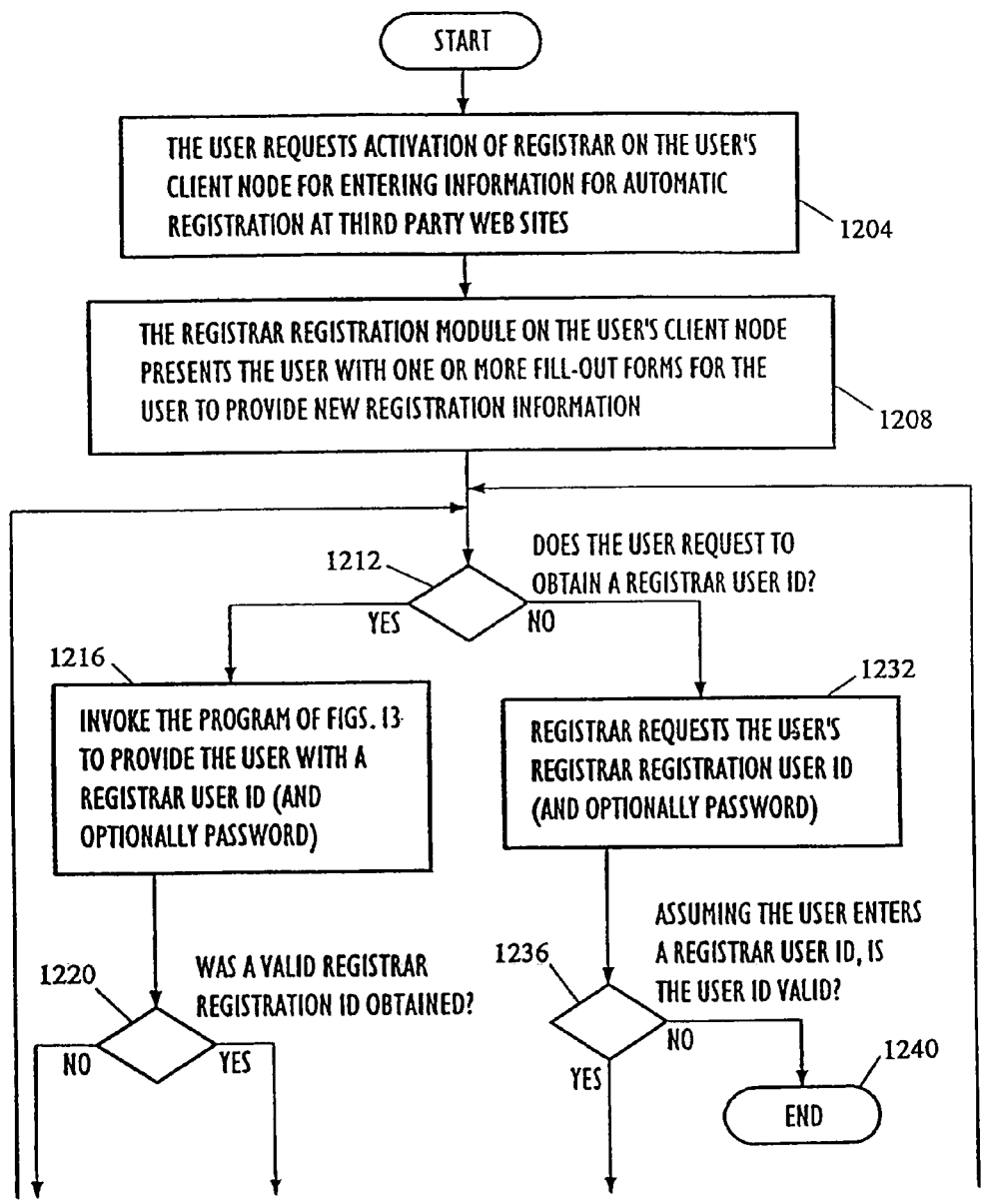
FIG. 12A USER ENTERS REGISTRATION INFORMATION INTO THE USER'S CLIENT NODE FOR TRANSMITTAL FROM THE USER'S NODE TO THE REGISTRAR WEB SITE (MAY BE INVOKED DIRECTLY BY THE USER OR BY FIGS. 11)

FIG. 13A   REGISTRAR USER ID PROVIDED FOR USER WHEREIN THE USER'S WEB SITE REGISTRATION IS MAINTAINED ON THE USER'S CLIENT NODE
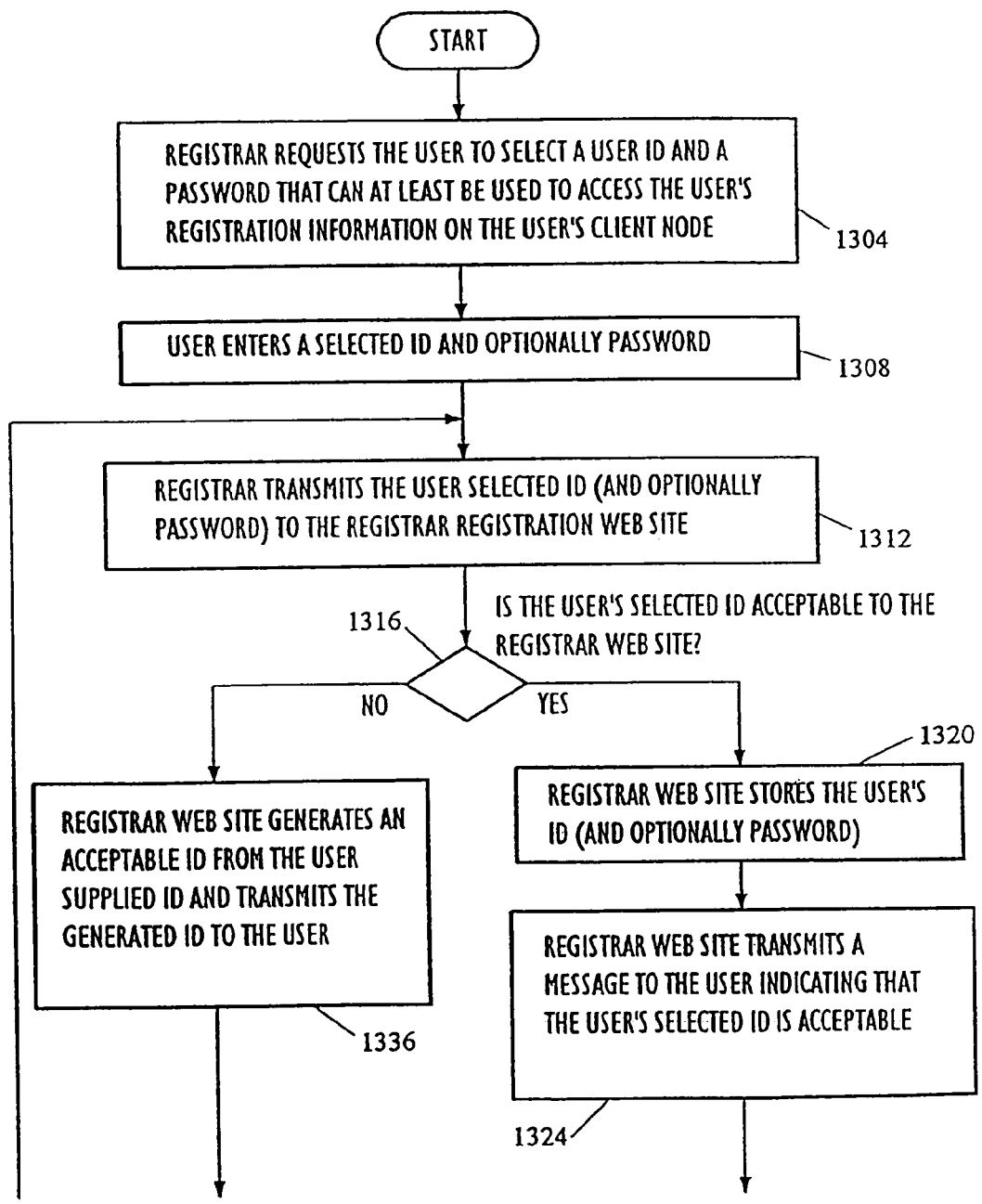

WORLD WIDE WEB REGISTRATION INFORMATION PROCESSING SYSTEM

CROSS REFERENCES TO RELATED APPLICATIONS

The present application is a divisional patent application of U.S. patent application Ser. No. 10/411,829, filed on Apr. 10, 2003, and entitled, "World Wide Web Registration Information Processing System"; which is a continuation patent application of U.S. patent application Ser. No. 09/884,779, filed Jun. 19, 2001, now U.S. Pat. No. 6,823,327 and entitled, "World Wide Web Registration Information Processing System"; which is a continuation patent application of U.S. patent application Ser. No. 09/128,915, filed Aug. 4, 1998, now abandoned and entitled, "World Wide Web Registration Information Processing System"; which is a continuation patent application of U.S. patent application Ser. No. 08/595,837, filed Feb. 2, 1996, now U.S. Pat. No. 5,790,785 and entitled "World Wide Web Registration Information Processing System"; which claims the benefit of U.S. Provisional Application No. 60/008,736, filed Dec. 11, 1995, and entitled "World Wide Web Registration Information Processing System"; the disclosures of which are hereby incorporated herein in their entireties.

FIELD OF INVENTION

The present invention relates to a system for assisting World Wide Web users in registering at World Wide Web web sites. In particular, the present invention provides storage and access to web site registration information provided by a user of the present invention so that, upon requesting to register at a web site that cooperates with the present invention, the user can request his/her web site registration information stored by the present invention to be transmitted to the cooperating web site.

BACKGROUND OF INVENTION

The World Wide Web (WWW) is a global communications network having a client-server model as a paradigm for communications. That is, users on client nodes utilizing so called "web browsers" navigate the WWW to access desired server nodes (known as web sites) for at least obtaining information from the server nodes such as hypertext, audio, video, virtual reality, data, etc. For many web sites, it is important to those responsible for the design and maintenance of the web sites that they be capable of accurately measuring both the number and types o users accessing their web sites. In particular, such measurements may be important in determining fees that can be charged by web site developers for building and maintaining a web site. Further, such information may be useful in determining the degree of interest in services and products by web site users. Thus, in order to obtain these web site measurements, such web sites have begun requesting that each user provide information about himself/herself prior to the web site allowing access to web site services. That is, such web sites require a user to "register" at the web site, wherein the user is required to establish a user identification (user ID) and optionally a password with the web site as well as typically provide personal information such as, for example, the city of residence or family size. However, registering at multiple web sites is burdensome for users in that it is: (a) time consuming, and (b) the user is likely to have different user Ids at different web sites, thus requiring a user to maintain a list of user Ids (and optionally passwords) for the web sites to which he/she is registered.

Therefore, it would be advantageous to alleviate many of the above difficulties by automating the registration process at web sites so that users may register at a single web site and use the information provided at this web sited to more easily register at other web sites.

SUMMARY OF INVENTION

The present invention is a registration information processing system for the World Wide Web that substantially automates the user registration process at web sites. The registration system of the present invention includes a World Wide Web registration web site wherein a user accessing the World Wide Web can utilize this web site as a repository for registration information so that the user can request this registration information to be transmitted substantially automatically to another web site to which the user desires to register. Furthermore, the present invention provides the user with a common user ID, and optionally common password, that can be used to access a plurality of web sites so that there are fewer web site user IDs and passwords for the user to remember. Additionally, the present invention may establish the common user ID (and optionally password) through user input such that the user may request a candidate user ID (and optionally password) and, if acceptable, the candidate user ID becomes the common user ID. However, if the candidate user ID is unacceptable (e.g., because it is a duplicate of another user's common user ID), then the present invention provides the user with one or more alternatives for the common user ID (and optionally password) that the user may accept or reject. Further, note that whenever possible the present invention provides the user with alternative common user Ids wherein the alternatives are derived from the candidate user ID provided by the user.

The registration information processing system of the present invention has a first embodiment using a first system architecture wherein a user need not have any modules specific to the present invention loaded on his/her World Wide Web client node. In this embodiment, once the user has provided registration information to the registration web site of the present invention, when the user subsequently requests to register at a new web site cooperating with the registration process of the present invention, then the user provides this new web site with a user ID and optionally password (e.g., the above-mentioned common user ID) for the registration web site of the present invention together with an indication that any further information may be obtained from the registration web site. The new web site subsequently is able to automatically retrieve the user's registration information from the registration web site and register the user at the new web site. In a second embodiment of the present invention having a second architecture, World Wide Web client nodes have registration modules for the present invention loaded on them so that these nodes may interact with the registration web site for providing user registration information to cooperating web sites to which the user requests to register. In this second embodiment of the present invention, the user's registration information is stored both locally on the user's client node and at the registration web site, the web site being used as a backup. Thus, when the user desires to register at a new web site, the user's registration information is provided to the web site from the registration module residing on the user's client node.

In either embodiment, the present invention may also provide a "mass" registration capability, wherein a user may request that the present invention automatically register the user at a plurality of web sites. For example, the user may be provided with a capability to search for web sites cooperating with the present invention by, for example, category and request an automatic registration at multiple web sites substantially simultaneously.

Other features and benefits of the present invention will become apparent from the detailed description with the accompanying figures contained hereinafter.

BRIEF DESCRIPTION OF THE DRAWINGS

FIGS. 2A and 2B provide a flowchart for describing the steps performed when a user of the World Wide Web explicitly contacts the registrar web site 100 of the present invention for supplying registration information to be used in registering at third party web sites 116;

FIG. 3 is a flowchart presenting the steps a user of the World Wide Web performs when entering web site registration information into fill-out forms that are to be submitted to the registrar web site 100 of the present invention;

FIGS. 4A and 4B present a flowchart for the steps performed when a user of the World Wide Web accesses a third party web site 116, cooperating with the present invention, and in the process of registering at the third party web site the user is automatically put in contact with the registrar web site 100 of the present invention so that registration information may be provided to the present invention for registering the user at the present third party web site as well as other third party web sites that the user may subsequently request;

FIG. 5 is a flowchart of the steps performed by the present invention when transferring user registration information from the registrar web site 100 to a third party web site 116 to which the user has requested to register;

FIGS. 6A and 6B provide a flowchart of the steps performed when supplying a third party web site 116 with registration information from the registrar web site 100, assuming that the third party web site has requested such information and that the request has been authenticated at the registrar web site 100;

FIG. 7 presents a flowchart of the steps performed by the present invention when supplying a third party web site 116 with user registration information from the user registration information database 144;

FIG. 8 presents a flowchart of the steps performed when storing in the user registration information database 144 a user's ID (and optionally password) relating to a third party web site 116 to which the user is registered via using the present invention;

FIG. 9 is a flowchart of the steps performed when registering at a third party web site 116 using the module 156 of the present invention installed on the user's client node 108;

FIG. 10 is a flowchart of the steps performed when the registration module 156 on the user's client node is utilized in supplying a third party web site 116 with registration information;

FIGS. 11A and 11B present a flowchart of the steps performed when a World Wide Web user of the present invention changes his/her registration information stored in the present invention;

FIGS. 12A and 12B present a flowchart of the steps performed when the architecture of the present invention includes the registration module 156 provided at the user's client node 108 and the user requests to enter registration information into the present invention using this module; and FIGS. 13A and 13B provide a flowchart of the steps performed when a World Wide Web user requests a user ID for the registration information processing system of the present invention and the present invention includes module 156 on the user's client node 108.

DETAILED DESCRIPTION

Figure 1:
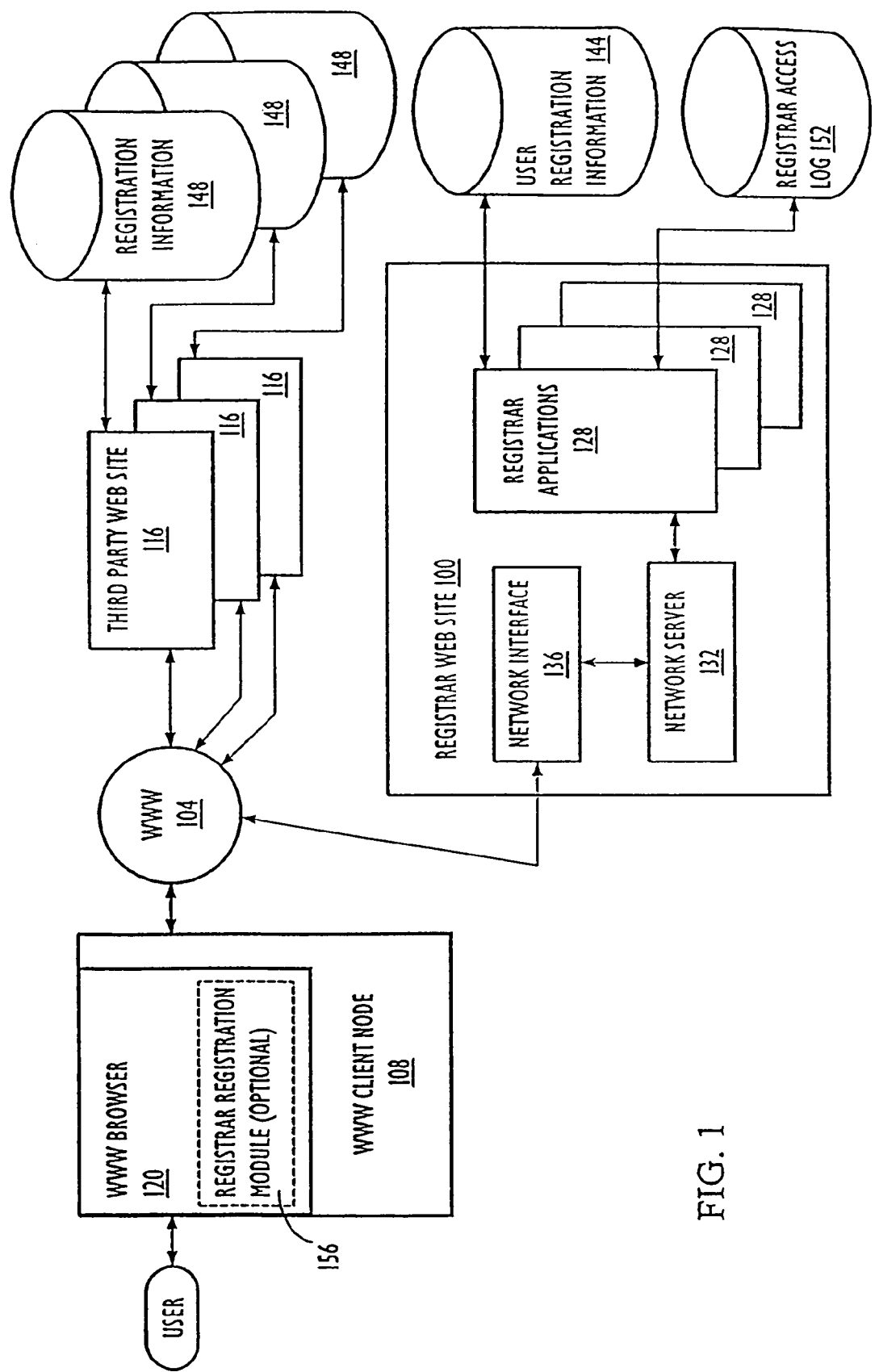
FIG. 1 is a block diagram of the web site registration information processing system of the present invention, wherein this system is shown in the context of its connections to various nodes of the World Wide Web.

FIG. 1 is a block diagram of a web site registration information processing system of the present invention, (hereinafter also denoted by the name "registrar") wherein this system is shown in the context of its connections to various nodes of the World Wide Web (WWW). In a first embodiment, a web site, denoted the registrar web site 100, provided by the present invention, is connected to the World Wide Web 104 for communicating with both World Wide Web client nodes such as WWW client node 108, and with other web sites such as third party web site 116, wherein the registrar web site 100 facilitates the registration of a user at a WWW client node 108 when this user desires to register at the third party web site 116. In this first embodiment, the user accesses the World Wide Web 104 through a WWW browser 120 on a WWW client node 108 wherein, to use the registration facilities of the registrar web site 100 for registering the user at a one or more third party web sites 116, the user must in some manner request explicit access to the registrar web site 100 for registering his/her registration information to the registrar web site 100. Additionally, in this first embodiment of the present invention, the WWW client node 108 need not have executable program modules designed specifically for interfacing with the registrar web site 100. That is, substantially any conventional World Wide Web browser may be used as the WWW browser 120.

Thus, the first embodiment of the present invention may be described as follows. In order for a user to register at one or more third party web sites 116, the user at a WWW client node 108 accesses the World Wide Web 104 and in a first scenario explicitly navigates through the World Wide Web 104 to the registrar web site 100 wherein a registrar web site 100 home page is communicated back to the user's WWW browser 120. As one skilled in the art will appreciate, program modules 128 (hereinafter denoted "registrar applications") output, to a World Wide Web network server 132, information in, for example, a hypertext markup language (HTML) related to capabilities of the registrar web site 100 in assisting the user in registering at third party web sites 116. Such outputs from registrar applications 128, are subsequently transmitted, via the network server 132 and the network interface 136, to the user's WWW browser 120 in the hypertext transfer protocol (HTTP), as one skilled in the art will appreciate. Thus, upon presentation of the registrar web site 100 home page on the user's WWW client node 108, the user subsequently may request to provide registration information to the registrar web site 100 so that he/she can have this information at the registrar web site 100 automatically transferred to a third party web site 116 when the user is requested to register at such a third party web site. Subsequently, after the user's request to supply registration information is transmitted to the registrar web site 100 (via World Wide Web 104, network interface 136 and network server 132), the registrar applications 128 receive the request and output to the user's WWW browser 120 one or more "web pages" having fill-out forms to be presented to the user via the WWW browser 120. Thus, upon submittal of the filled out forms by the user to the registrar web site 100 (more precisely, the registrar applications 128), the user's registration information is stored in the user registration information database 144.

Following the above registration procedure at the registrar web site 100, the user may then substantially automatically register at various third party web sites 116 that are affiliated with the registrar web site 100 in that an agreement has been reached between each such third party web site 116 and the registrar web site 120 for transmitting a user's registration information to the third party web site 116 when, for example, the user requests such transmittal. Thus, assuming the user accesses the third party web site 116 and, for example, the home page for the third party web site 116 includes a form field allowing the user to specify that the user's registration information is stored and accessible at the registrar web site 100, then the user can submit a response, via the World Wide Web 104, to the third party web site 116 indicating that the user's registration information should be obtained from the registrar web site 100. Thus, the third party web site 116 requests and receives the user's registration information from the registrar web site 100 and stores the user's registration information in registration information database 148 directly accessible by the third party web site 116. Additionally note that when the registrar web site 100 receives a request from the third party web site 116 for user registration information, a registrar application 128 records the request for the user's registration information in a registrar access log data base 152. Thus, the registrar web site 100 maintains a log of the third party web sites requesting registration information. Further, such third party web sites 116 may periodically provide the registrar web site 100 with information related to the frequency that users registered at the registrar web site 100 have accessed the third party web sites 116. Therefore, by also storing this information, for example, in the registrar access log 152, the registrar web site 100 is able to determine the frequency and type of access of third party web sites 116 by users.

In a second method of using the first embodiment of the present invention, instead of the user explicitly navigating the World Wide Web 104 to the registrar web site 100 for providing registration information, the user may instead access a third party web site 116 wherein the home page or registration page for the third party web site includes input fields allowing the user to request that the registrar web site 100 automatically be accessed so that the user can enter web site registration information at the registrar web site 100 and subsequently use the registration information provided to the registrar web site 100 for automatically registering at the third party web site 116 (as well as other third party web sites that may be subsequently requested). That is, the newly entered registration information is transferred to the third party web site 116 by entering into a registrar specific portion of the registration form for the third party web site 116 a registrar user identification and optionally a password for requesting that the third party web site access the registrar web site 100 to obtain the user's registration information. Thus, the user's registration information automatically is communicated to the third party web site 116 without the user explicitly having to navigate the World Wide Web 104 and access the registrar web site 100 to register his/her web site registration information.

Note that alternative embodiments are within the scope of the present invention, wherein program modules for the present invention are distributed so that there is an executable module provided on the user's WWW client node 108 for communication with the registrar web site 100 as well as with third party web sites 116 that accept registration information from the present invention. In one embodiment of such a distributed architecture for the present invention, a registrar registration module 156 is integrated into the user's WWW browser 120 for gathering the user's web site registration information and communicating with the registrar web site 100 as well as cooperating third party web sites 116 at which the user desires to register. Such a registration module 156 may provide the user with easier access to his/her registration information since the information resides locally on the user's WWW client node 108 in a persistent nonvolatile storage. Further, the registrar registration module 156 may be activated for entering or updating user registration information without the user necessarily being connected to the World Wide Web 104. Moreover, by integrating the registrar registration module 156 into the user's WWW browser 120, the user is presented with an integrated set of functions for registering and accessing third party web sites 116.

Thus, in such distributed architectures, after the user has entered registration information into the registrar registration module 156, this module will substantially automatically contact the registrar web site 100 (via the World Wide Web 104) and thereby communicate the user's registration information to the registrar web site 100 so that, for example, the user's registration information may be reliably stored in case there are failures at the user's WWW client node 108. Thus, to access a third party web site 116 that cooperates with the registrar for registering the user, once the user has made contact through the World Wide Web 104 with such a third party web site 116, the user transfers his/her registration information from the registration module 156 to the third party web site. Further note that in the registration process of the present embodiment, whenever the user registers at a third party web site 116, the registrar web site 100 is provided, by (for example) the module 156, with information related to the registration so that the user also has a off-site backup copy of all registrations at third party web sites residing at the registrar web site 100.

Note that other distributed architectures for the present invention are also contemplated wherein the registrar registration module 156 on the user's WWW client node 108 is not integrated with the user's WWW browser 120. In such an embodiment, the user may be faced with a different user interaction technique for the module 156 than that of the WWW browser 120. However, the user is provided with added flexibility in choosing a WWW browser 120 and/or using his/her existing browser 120 which may not contain as part of the browser the registrar registration module 156.

Figure 2B:
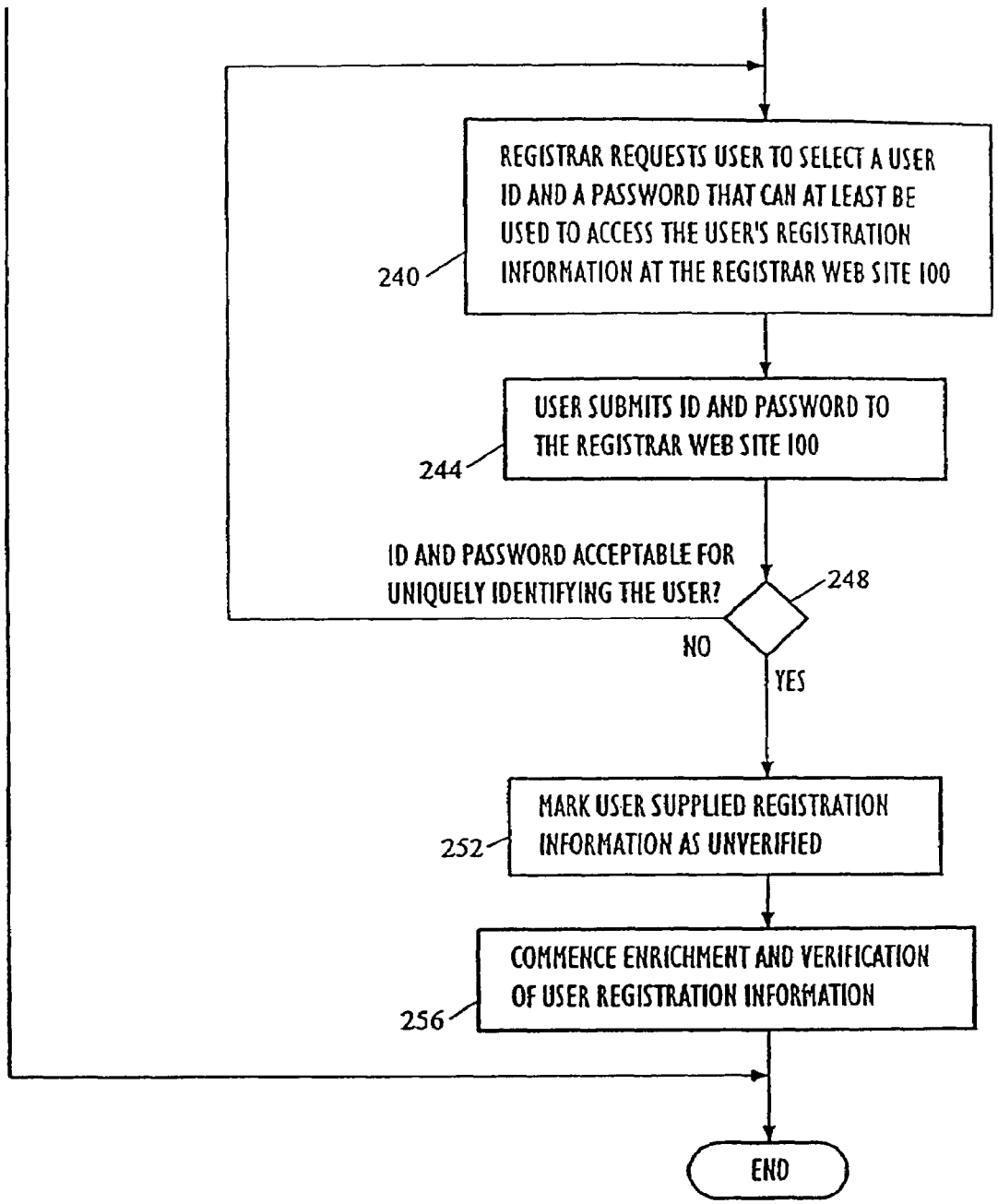

In FIGS. 2A and 2B, a flowchart is presented describing the steps performed when the user explicitly navigates the World Wide Web 104 to contact the registrar web site 100 for supplying registration information. Accordingly, assuming the user contacts the registrar web site 100, in step 204 the web site 100 receives the user's request for information. Subsequently, in step 208 the registrar web site 100 responds with a home page describing the registrar services, a selection or browsing capability for reviewing third party web sites 116 accepting registrar registrations, and a fill-out form so that the user may request to proceed, if desired, with entering registration information at the registrar web site 100. In step 212 the user determines whether to proceed with the registration process or not. Assuming the user elects to proceed, the request to proceed is transferred back to the registrar web site 100 wherein a registrar application 128 examines the response and outputs a fill-out form that is transmitted back to the user's WWW browser 120 so that the user may enter his/her registration information and submit it to the registrar web site 100. Thus, in step 216 the steps of the flowchart of FIG. 3 are performed by the user when entering information into the registration fill-out form provided by the registrar web site 100. Subsequently, in step 220 the user initiates the transfer of his/her registration information to the registrar web site 100. Note that the submittal of the registration information may be performed by a conventional electronic transfer through the World Wide Web 104 using any one of various internet protocols or, alternatively, other techniques for transferring the information to the registrar web site 100 are also contemplated. For example, the user may fax a printed copy of a completed registration form to the registrar web site 100 at which point the information may be manually input into the user registration information database 144. In step 224, upon receiving the user's registration information, one or more registrar applications 128 review the user's registration information for determining whether there is enough information supplied to at least uniquely identify the user. If not, then in steps 228 and 232 a registrar application(s) 128 requests additional information from the user and flags the user's information currently stored in the user registration information database 144 indicating that a user response is required to further process the user's information. As an aside, note that other feedback loops to the user are contemplated that are related to the loop of steps 224 through 232. For example, it may be the case that the user has supplied sufficient information to be uniquely identifiable at the registrar web site 100, but the user has supplied insufficient information for the registrar web site 100 to supply adequate information to most third party web sites 116 that utilize registrar registration capabilities. Thus, a similar feedback loop to loop 224 through 232 may be provided for requesting that the user supply additional information so that a substantial number of third party web sites 116 cooperative with registrar will allow the user to register at them using only the information supplied by the registrar web site 100.

Referring again to step 224, if a determination is made that sufficient registration information has been received at the registrar web site 100, the user's registration information is stored in the user registration information database 144 (step 236) and subsequently a registrar application 128 outputs a request to the user to select a user ID and password that can be at least used to access the user's registration information at the registrar web site 100 (step 240). Assuming, as in step 244, that the user submits a user ID and a password to the registrar web site 100, then in step 248 a determination is made by the present invention (more particularly, a registrar application 128) as to whether the user supplied ID and password is acceptable for uniquely identifying the user. If not, then steps 240 through 248 are repeated until an appropriate user ID and password are entered by the user. Thus, assuming that an acceptable user ID and password are provided, in step 252 the registration information supplied by the user is marked as unverified since there has been no independent confirmation that the user supplied information is accurate. Subsequently, in step 256 a registrar application 128 commences to enrich the user's supplied registration information with publicly available information related to the user and, to the degree possible (i.e., conforming with internet etiquette, privacy concerns of users, and public policy), to verify the user's registration information. Note that by comparing the user supplied information with information about the user from other sources, a determination can be made as to the accuracy of the user supplied information. Thus, whenever an item of the user supplied information is independently verified, then that item is unmarked. Alternatively, if discrepancies arise between the user-supplied information and other publicly available information about the user, then the user may be alerted to these discrepancies and requested to confirm his/her initial responses.

Referring now briefly to FIG. 3, this flowchart presents the steps a user performs when entering web site registration information into the fill-out forms to be submitted to registrar. Accordingly, in step 304 the user determines whether to supply basic information (i.e., requested by a substantial number of third party web sites 116) as described in step 308 or to supply expanded information (i.e., more extensive information about the user so that, for example, registrar has sufficient user information to register the user at substantially all cooperating third party web sites 116). Note that at least in one embodiment, the basic information supplied in step 308 (i.e., the user's name, e-mail address, gender and date of birth) is also requested in the forms for expanded information in step 312. Thus, upon filling in at least one field from the fill-out forms (step 316) presented in either step 308 or 312 the present invention field checks the user's unput for syntactically appropriate responses. Subsequently, in step 320, the user inputs a request to terminate entering information in the presently presented fill-out form(s) and in step 324 the user determines whether to enter additional information in either the basic registration information fill-out forms or the expanded information fill-out forms. If the user indicates that he/she desires to enter further registration information, then step 304 is again performed. Alternatively, the flowchart returns to the invoking program (flowchart) with the user supplied registration information.

Figure 4B:
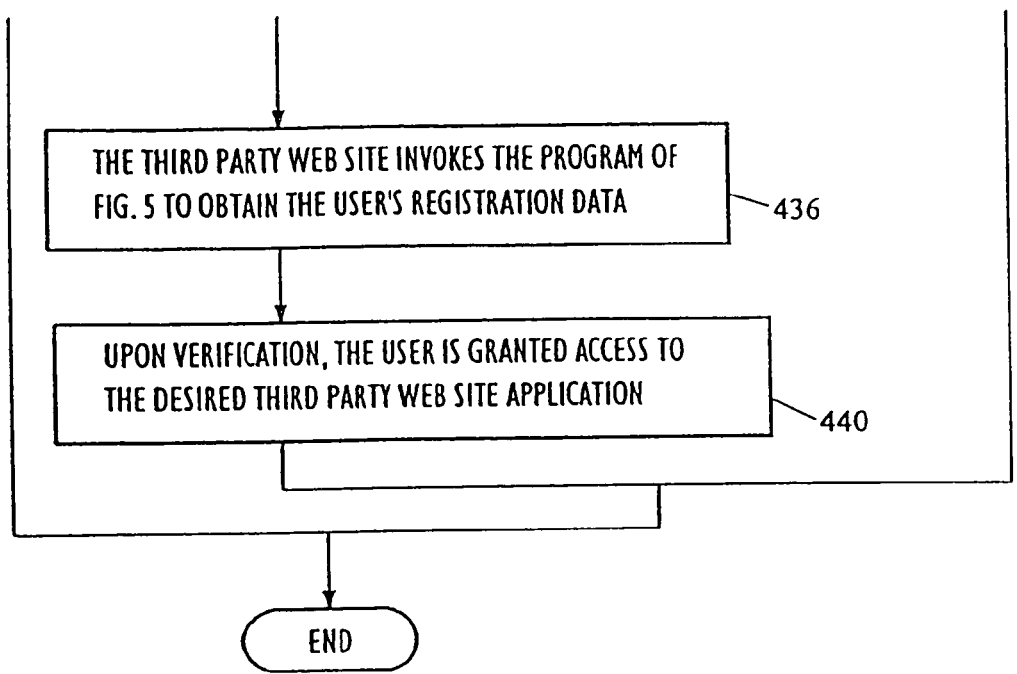

FIGS. 4A and 4B present a flowchart for the steps performed when the user accesses a present third party web site 116 cooperating with registrar, and in the process of registering at the third party web site the user is automatically put in contact with the registrar web site 100 so that registration information may be provided to registrar for registering the user at the present third party web site as well as other third party web sites that the user may request. Accordingly, assuming the user uses a WWW browser 120 to access a third party web site 116 as in step 404, the third party web site responds with a web site home page (step 408) typically having a registration fill-out form into which the user is requested to enter registration information. Note that the user may or may not be registered at this third party web site. Thus, if the user is registered, then he/she may only need to enter a user ID and optionally a password in order to gain access to a desired application at the third party web site. Further note that for different third party web sites 116, the user's identification (and optionally a password) may be different due to constraints on user ID (and password) syntax being different at different third party web sites. Further, such user IDs at different web sites may be different because a user ID requested by the user may already have been assigned to another user.

Subsequently, once the third party web site 116 has received a response from the user, a determination is made as to whether the user is registered at the web site (step 412). If the user is registered, then no further processing related to the present invention is required. Alternatively, if the user is not registered at the third party web site, then a response is transferred from the third party web site 116 through the World Wide Web 104 to the user's WWW browser 120 providing the user with the fill-out forms in which the user is requested to enter information for registering at the third party web site. Note that if the third party web site 116 is configured to accept user registration information from the present invention, then at least one fill-out form related to registering at the third party web site 116 will request information related to registering the user by using the present invention. In particular, the third party web site 116 may present the user with a fill-out form requesting the user to enter a user ID and optionally a password for the present invention (i.e., registrar) if the user is registered at the registrar web site 100. Additionally, the presented fill-out forms may request the user to indicate whether he/she prefers to register at the third party web site 116 by using registrar. Thus, assuming the user desires to register at the third party web site 116, a determination is made as to whether the user wishes to register using the present invention or register at the third party web site without using the present invention (step 416). If the user chooses to not use the present invention for registering at the third party web site 116, then the user explicitly supplies registration information for the present third party web site (step 420). Alternatively, if the user chooses to use registrar to register, then once the present third party web site 116 receives a response from the user indicating the choice to use registrar to register, in step 424, the present third party web site sends a request to the registrar web site 100 for registering the user at the registrar web site 100. Subsequently, in step 428 the steps of FIGS. 2A and 2B are performed for registering the user at the registrar web site 100. Subsequently, after registering at the registrar web site 100, in step 432, the user is automatically placed in contact with the present third party web site so that he/she submits a registration fill-out form to this third party web site 116: (a) indicating that the user's registration information may be obtained from the registrar web site 100; and (b) providing a user ID (and optionally a password) for the registrar web site 100 to be used as identification at the present third party web site. Following this, in step 436 the third party web site 116 invokes the program corresponding to FIG. 5 to obtain the user's registration data from the registrar web site 100. Lastly, upon verification by the third party web site 116 of the user's registration data, the user is granted access to the desired third party web site and/or application (step 440).

In FIG. 5, a flowchart is presented of the registration data transmission process from the registrar web site 100 to a third party web site 116. Accordingly, in step 504 the third party web site 116 provides the registrar web site 100 with identification of the third party web site, the user's registrar user ID and (any) registrar password. Further, in some instances, as will be described below, the third party web site 116 also supplies the registrar web site 100 with a return path to the user through the World Wide Web 104. Following this, in step 508, a determination is made by the registrar web site 100 as to whether the third party web site supplied information can be authenticated. If not all third party web site information is authenticated, then step 512 is encountered wherein a determination is made as to whether to request that the third party web site to resend the information of step 504. Note that such a determination may be made in one embodiment depending upon whether the third party web site identification is authenticated. That is, if the third party web site identification is authenticated, then a retry may be allowed. Otherwise, no retry may be allowed. Alternatively, referring again to step 508, if all information transmitted from the third party web site 116 is authenticated at the registrar web site 100, then step 516 is encountered. In this step, the program represented by FIG. 6 is performed for supplying the third party web site 116 with registration information related to the user from the user registration information database 144.

Figure 6B:
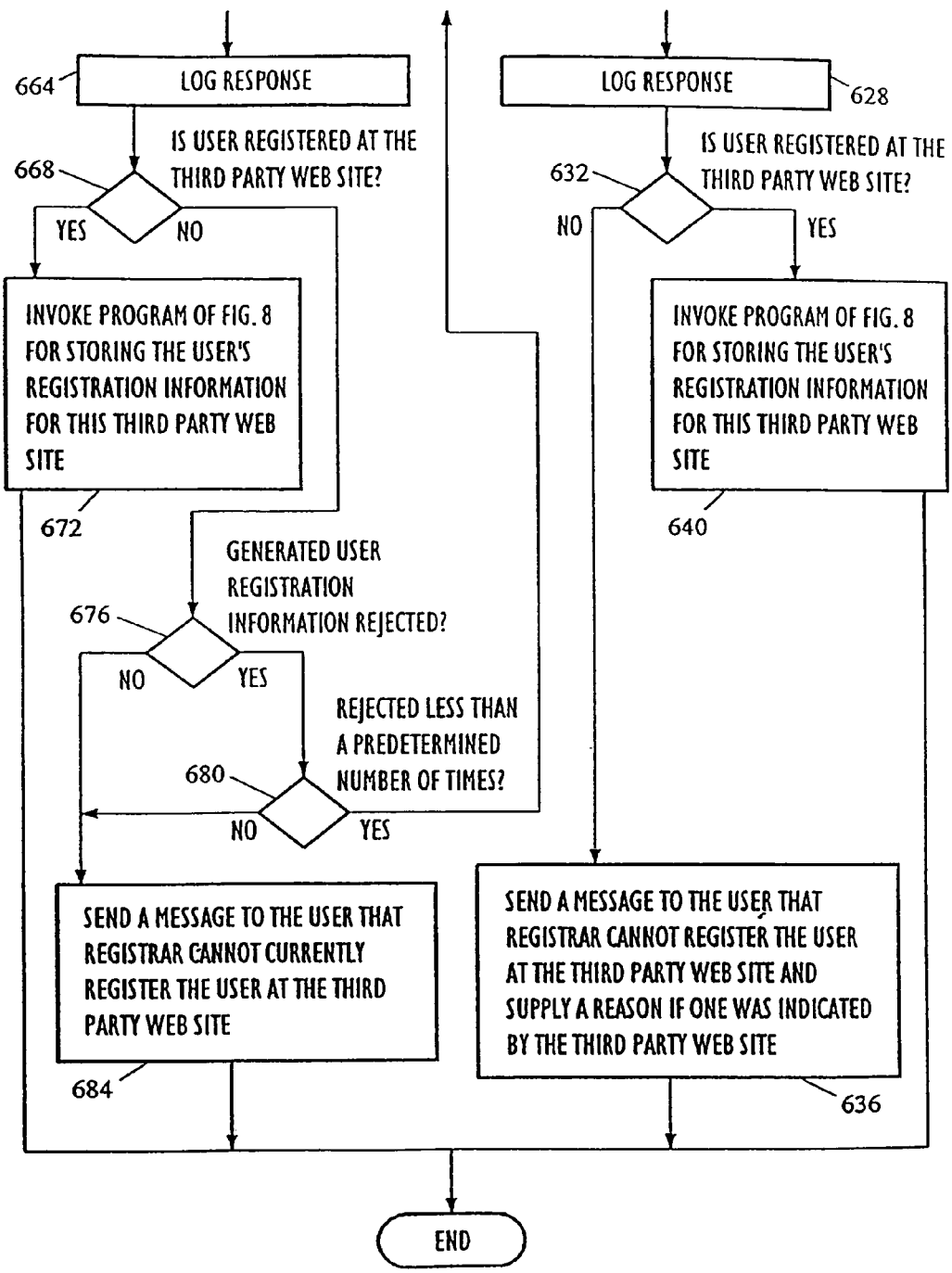

Referring now to FIGS. 6A and 6B, the flowchart presented here provides the steps for supplying a present third party web site 116 with registration information from the registrar web site 100, assuming that the present third party web site 116 has requested such information and that the request has been authenticated at the registrar web site 100. Accordingly, in step 604 the registrar web site 100 or, more precisely, a registrar application 128 performs the steps of FIG. 7 for retrieving the user registration information requested by the present third party web site 116 from the user registration information database 144. Note that a third party web site 116 may request various categories of information from the registrar web site 100 related to the user. In particular, a third party web site may request: (a) basic information as discussed in step 308 of FIG. 3; (b) expanded information as discussed in step 312 of FIG. 3; (c) custom information, wherein selected fields from the basic and expanded information are provided; and (d) proprietary information wherein one or more additional user related information items may be provided wherein these items have been obtained by the registrar web site 100 by, for example, enriching and verifying the registration information obtained from the user as in step 256 of FIG. 2B.

Following step 604, step 608 is encountered wherein a registration application 128 determines whether the present third party web site 116 requesting user information (for a user attempting to register at this third party web site) requires that a user ID (and optionally password) be generated specifically for this third party web site. That is, the third party web site 116 may require a user ID and/or password that conforms with a format peculiar to the third party web site 116. Note that to perform the step 608, in at least one embodiment of the present invention, information related to the requirements of the present third party web site 116 are stored at the registrar web site 100. In particular, the registrar web site 100 may store a user information request template for each third coordinating party web site 116 having access to user information at the registrar web site 100 such that a registrar application 128 (upon identifying a particular third party web site 116) may access a related user information request template for determining what information may be required by this third party web site.

If a user ID and optionally password need not be generated specifically for the requesting third party web site 116, then in step 612 the user information requested by the third party web site 116 is encrypted and in step 616 the encrypted information is sent to the third party web site. Following this, in step 620 a registrar application 128 logs an entry or a record in the registrar access log database 152 indicating that registration information for the user has been transmitted to the present third party web site 116. Subsequently, in step 624 a registrar application 128 (or, more precisely, an instantiation thereof) waits for an acceptance response from the present third party web site 116 to which the encrypted user information was sent. Note that the response from the present third party web site may include a third party web site specific user ID (and optionally password) if the user was not previously registered at this third party web site. That is, the third party web site may automatically generate at least a user ID if the user was not previously registered at the web site. Alternatively, it may be the case that the present third party web site uses the user's registrar registration user ID and password for registering the user at the third party web site 116. Note that in at least one embodiment for registration processing at a third party web site 116, the use of the registrar user ID does not create ambiguity in the identity of users registering at the third party web site. For example, a user seeking access to a cooperating third party web site may be required to indicate that his/her user ID and/or password is a registrar generated user ID (and/or password) so that the third party web site can process the entered user identification differently from that of users who have registered without using the present invention. Subsequently, when an acceptance response from the requesting third party web site 116 is provided to the registrar web site 100 (or, more precisely, a registrar application 128), this response is logged in the registrar access log database 152 in step 628. Following this latter step, in step 632, a determination is made as to whether the response from the present third party web site 116 indicates that the user is now registered at this third party web site. If no such indication is provided, then in step 636 a message is sent to the user at the user's WWW client node 108 that registrar cannot register the user at the present third party web site to which the user has requested registration and access. Further, the registrar application 128 performing step 636 may also supply the user with a reason as to why the user cannot register through registrar at the present party web site if such a reason was indicated by this third party web site when the response of step 624 was received.

Alternatively, if in step 632 it is determined that the user is registered at the present third party web site, then in step 640 the program corresponding to the flowchart of FIG. 8 is performed for storing at least the user's ID (and optionally password) for the present third party web site at the registrar web site 100 (more precisely, in the user registration information database 144) as will be discussed hereinbelow.

Referring again to step 608 of FIG. 6A, if a registrar application 128 is required to generate a user ID (and optionally password) for the third party web site 116, then step 644 is next performed wherein a registrar application 128 generates a user ID (and optionally password) to be transmitted to the third party web site 116. Subsequently, the sequence of steps 648 through 668 are performed. Note that this sequence of steps is substantially the same sequence of steps as steps 612 through 632. However, the response from the present third party web site logged in step 664 may include an indication as to whether the user generated by the registrar application 128 is acceptable to the present third party web site 116.

Accordingly, continuing the discussion of FIGS. 6A and 6B from step 668, if the response from the present third party web site 116 indicates that the user is registered at the desired third party web site, then step 672 is performed wherein the program corresponding to the flowchart of FIG. 8 is again used to store the user's ID (and optionally password) for the present third party web site in the user registration information database 144 (as in step 640). Alternatively, if in step 668 it is determined that the user is not registered at the present third party web site 116, then in step 676 a determination is made as to whether the generated user registration information (i.e., user ID and optionally password) step 644 has been rejected by the present third party web site. If so, then in step 680 a determination is made as to whether this rejection has occurred less than a predetermined number of times (i.e., the sequence of steps 644 through 668 have been iteratively performed less than a predetermined number of times in attempting to register the user at the present third party web site). If the results of the test in step 680 is affirmative, then step 644 is again encountered for generating alternative user registration information for the present third party web site. Note that it is an aspect of the present invention that, at least in one embodiment, such generations produce user IDs that are meaningful to the user and/or are related to other web site registration user IDs for the user. Thus, in one embodiment of the present invention, the step 644 uses the user's registrar user ID as a "seed" from which to generate a user ID acceptable to the present third party web site 116. Moreover, note that the generation process of step 644 may use various heuristics and third party web site constraints to generate acceptable user IDs.

Alternately, if the negative branch from step 676 is followed, then the third party web site 116 may have rejected registering the user for any of a number of reasons that may not be able to be alleviated in a timely fashion so that the user can be registered at this third party web site in a short amount of time. Accordingly, step 684 is encountered wherein a message is transmitted to the user's WWW client node 108 indicating that registrar cannot currently register the user at the requested third party web site 116. Further, note that if in step 680 it is determined that too many attempts have been made to generate acceptable registration information for the third party web site, then step 684 is also encountered.

The flowchart of FIGS. 6A and 6B is representative of the processing variations within the scope of the present invention for supplying a third party web site with registration information. For instance, those skilled in the art will appreciate that steps 624 and 660 may have a timer associated with them whereby if there is no response from the third party web site within a predetermined time period, then a default response is provided by a registrar application 128 so that one of the steps 684 or 636 is performed as part of the processing when such a timer expires and subsequent steps in the flowchart are performed. Additionally, other steps may be inserted, for example, on the negative branch from step 676 wherein these additional steps attempt to address other anomalies indicated in the acceptance response received in step 660. For example, if the third party web site 116 requests additional user information than what was provided in step 648, then if this additional information is in the user registration information database 144 and the user has indicated that it is permissible to disseminate this information, then the additional information may be transmitted to the present third party web site 116. Also, in such a case, the transmittal of this additional information is recorded in the registrar access log database 152.

Referring now to FIG. 7, wherein the flowchart for a program is provided for supplying, from the user registration information database 144, a requesting third party web site 116 with registration information related to a particular user. Accordingly, in step 704 of FIG. 7, if the registrar web site 100 has not been previously supplied with an indication as to what type of information is required by the requesting third party web site, then a registrar application 128 constructs such a request to be transmitted to the requesting third party web site and subsequently the application may wait for a response from this third party web site. Following step 704, in step 708 it is assumed that the registrar web site 100 has been provided with an indication or specification as to what information the requesting third party web site desires. Thus, the registrar application 128 performing step 704 may now determine what registration information is to be transmitted to this third party web site. Note that at least in one embodiment of step 708, the user registration information requested may require validation according to the following criteria:

(1.1) The type and amount of registration information for a user that the user has indicated is available to be transmitted to a requesting third party web site.

(1.2) The type and amount of information the requesting third party web site 116 has contracted with the registrar web site 100 for transmitting regarding a particular user or category of users.

(1.3) The registration information available in the user registration information database 144.

Thus, as discussed with respect to step 604 of FIG. 6A, either basic, expanded, custom or proprietary registration information related to a user is transmitted to the requesting third party web site in step 736.

FIG. 8 presents a flowchart for storing, in the user registration information database 144, a user's ID and/or password for a third party web site 116 to which the user is registered using registrar. More precisely, the user ID and/or password for such a third party web site is stored via the steps of FIG. 8 if this information is different from the user's registrar user ID and/or password. That is, it is believed that for many third party web sites 116, the registrar user ID and password for users registered at the registrar web site 100 will be identical to the user's user ID and password at third party web sites. Note that there are significant advantages to third party web sites 116 using, for each registered user, the user's registrar user ID and password (or, some other user ID and password in common with other third party web sites to which the user is registered). For instance, a user is required to remember fewer user IDs and passwords associated with web sites and the web sites providing this convenience may have a higher volume of users accessing the web site due to the greater ease of access.

Regarding the steps of FIG. 8, in step 800 a determination is made as to whether the user has been provided with a user ID (optionally password) for the third party web site 116 (to which the user is attempting to register) that is different from the user's registrar user ID and/or password. If not, then there is nothing additional to store at the registrar web site 100 and the flowchart ends. Alternatively, if the decision of step 800 results in a positive answer, then step 804 is performed wherein the user's specific user ID and optionally password for this third party web site is stored with other user registration information in the user registration information database 144. Note the following advantages accrue by storing user registration information at the registrar web site: (a) each user has the convenience of off-site storage backup for each such third party web site to which the user is registered and (b) depending on the registration process at the third party web site, it may be expedient for such a web site (at least temporarily) to automatically contact the registrar web site 100 for retrieving, for example, the user's third party web site specific user ID upon subsequent user accesses to the third party web site.

Following step 804, in step 808 a determination is made as to whether the third party web site has indicated that it will initiate requests as in (b) immediately above. If so, then no further processing needs to be accomplished here in that the user may enter his/her user registrar web site 100 user ID (and optionally password) when accessing the third party web site. Alternatively, if step 808 yields a negative answer then step 812 is performed wherein the registrar web site 100 sends a message to the user at the user's WWW client node 108 providing the user with the ID (and optionally password) for the third party web site.

In an alternative embodiment of the present invention, a registrar registration module 156 may be provided at the user's WWW client node 108. This module (whether incorporated into the WWW browser 120 or external to the browser and communicating with the browser through, for example, a browser 120 port) may store locally at the client node 108 registration information for accessing third party web sites 116 to which the user has registered using the present invention. In FIGS. 9–13, flowcharts are provided for programs illustrating the processing of this alternative embodiment of the present invention.

In FIG. 9, a flowchart is presented of the program for registering at a third party web site 116 when the module 156 is installed on the user's client node 108.

Describing now the steps of FIG. 9, in step 904 the user sends a request to access a third party web site 116 via the user's WWW browser 120. Subsequently, upon receiving the request, the accessed third party web site 116 responds with a home page having a registration fill-out form (step 908). Assuming that the registration fill-out form allows the user to indicate that user registration information may be obtained locally at the client node 108, in step 912 the user indicates on the fill-out form that he/she desires to register at the third party web site and that his/her registration information can be retrieved using the registrar registration module 156 residing on the user's client node 108. Further note that the user may be required to activate or alert the module 156 so that this module can supply the appropriate user registration information to be communicated to the third party web site 116. Also note that the home page from the third party web site 116 may indicate the type of information required to register the user and this information may be used either manually or automatically for determining the user registration information stored on the user's client node 108 that will be transmitted to the third party web site. Subsequently, in step 916 the user specifies that the registration fill-out form is to be submitted to the third party web site. Accordingly, the WWW browser 120 communicates with the registrar registration module 156 to supply the registration information to the third party web site. That is, the processing performed here includes the steps of FIG. 10 which are described herein below. Subsequently, in step 920 a message is sent from the registration module 156 to the registrar web site 100 indicating that the user has registered at the third party web site and additionally supplying the registrar web site 100 with any user ID and password specific to the third party web site. Note that by sending this information as well as, for example, a copy of substantially all of the user's registration information stored locally to the registrar web site 100, the user is provided with an automatic off-site backup of his/her registration information. Additionally, the user may be provided with other advantages by providing his/her user registration information to the registrar web site 100. In particular, the registrar web site 100 may enrich the user's registration information with publicly available information on the user and alert the user to discrepancies between the user information and various publicly available records on the user.

Referring now to the flowchart of FIG. 10, this flowchart describes the steps performed when supplying a third party web site 116 with registration information retained by the registrar registration module 156 on the user's node. In step 1004, the steps of the flowchart of FIG. 7 are performed for retrieving the registration information requested by the third party web site. Subsequently, in step 1008 the registrar registration module 156 packages the accessed registration information for the third party web site together with the user's registrar ID (and optionally password) for transmittal to the third party web site. Subsequently, in step 1016 the registration information packaged together in step 1008 is encrypted so that in step 1020 this encrypted information may be sent securely to the third party web site via the World Wide Web 104. Following this, in step 1024 the module 156 logs an entry into a local log on the client node 108 indicating what registration information was sent to the third party web site. Subsequently, in step 1028 a process may be instantiated to wait for an acceptance response from the third party web site so that when such a response is obtained it may be logged locally at the client node 108 in step 1032.

In one embodiment of the present invention the user may configure the registrar registration module 156 to log all activities with third party web sites 116 and provide the records of this log to the registrar web site 100. This allows the registrar web site 100 or personnel that maintain the registrar web site 100 to analyze user activities on the World Wide Web 104. Such analysis may be useful to both registrar users and third party web site personnel in that, given a user's World Wide Web 104 activity, the registrar web site 100 may suggest additional third party web sites 116 of which the user may not be aware. Further, by analyzing the user access logs of registrar users, the registrar web site 100 may provide statistics to the third party web sites 116 as to the number and types of users accessing their respective web sites.

Figure 11B:
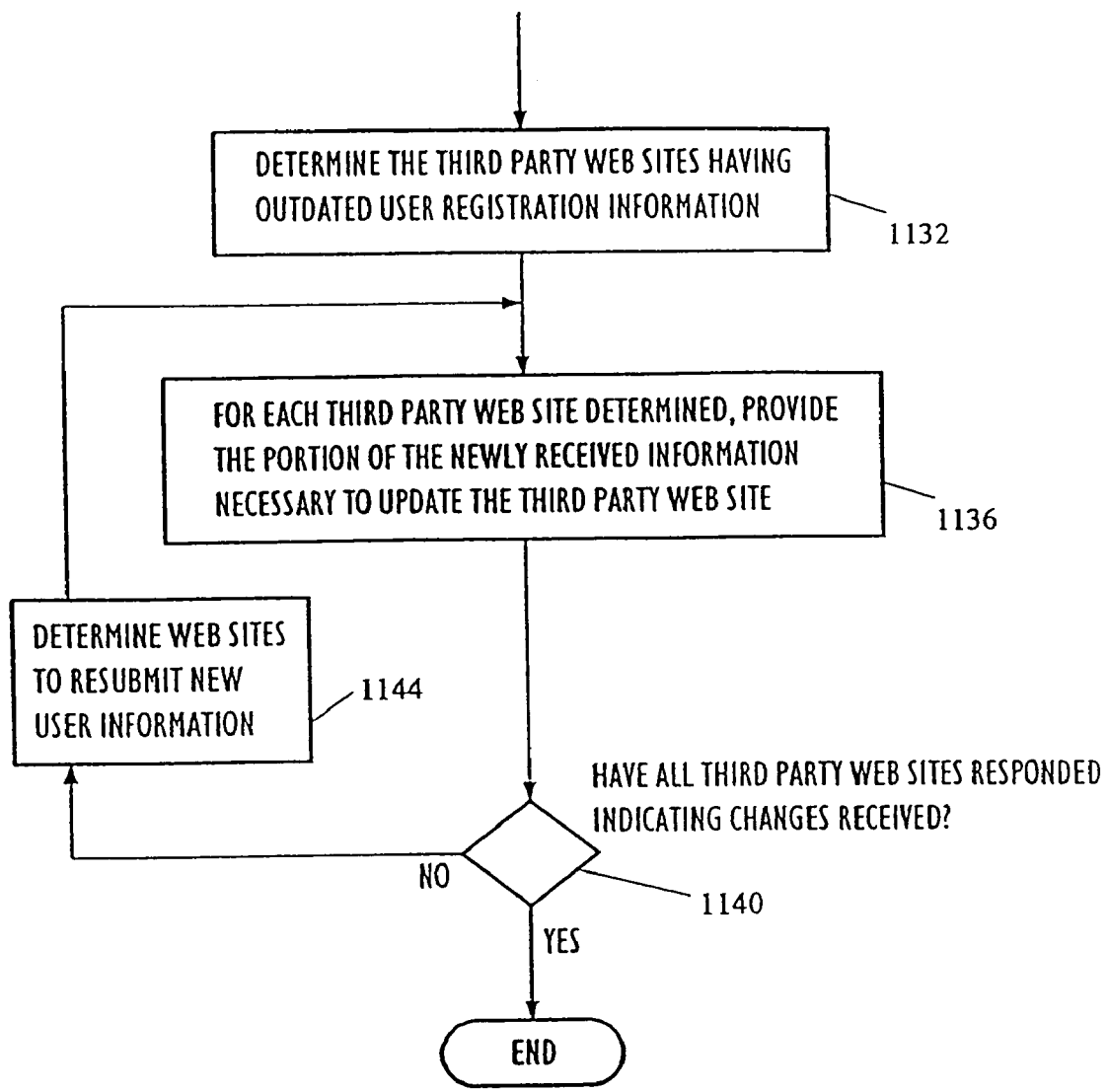

FIGS. 11A and 11B present a flowchart for the steps performed by the present invention when the user changes his/her registrar registration information. That is, the flowchart of FIG. 11 encompasses both the architecture or embodiment of the present invention wherein the user's registration information is stored substantially only at the registrar web site 100, and also the architecture or embodiment wherein the user's registrar information is also stored at the user's client node 108. Accordingly, in step 1104 a determination is made as to where the user's registration information is stored. Note that this step 1104 is unlikely to be explicitly performed by either the present invention or the user. Instead, the embodiment of the present invention determines which of the paths from this step to follow (i.e., if module 156 exists, then the "USER NODE" branch is followed; otherwise, the "REGISTRAR WEB SITE ONLY" branch is followed). Accordingly, assuming that the present invention is embodied such that the user's registration information is stored at the web site 100 only, then step 1108 is encountered wherein the user accesses the registrar web site 100 from his/her WWW client node 108 by entering his/her user ID and optionally password. Subsequently, in step 1112 the registrar web site 100 responds with a web page having a number of options related to the user's registration information and registrar web site 100 processing of this information. Note that such options include a request by the user to modify the user's registration information stored at the registrar web site. Additionally, other options may be also provided to the user including: (a) an option for requesting to be no longer affiliated with the registrar web site 100 and have all the user's registration information deleted; (b) an option for requesting to examine all information regarding the user stored at the registrar web site 100, including all information the registrar web site has obtained from publicly available sources; (c) a request for procedures and/or addresses to contact publicly available databases that registrar has accessed obtaining incorrect user information; and (d) third party web sites 116 that are providing information for a limited period of time and for which the user may be interested. Following step 1112, in step 1116 the user enters new information into an appropriate fill-out form received at the user's WWW client node 108 from the registrar web site 100. Note that this form is likely to be in a page different from the page of options described in step 1112. That is, upon submission of the page of options, the registrar web site 100 responds with a new page(s) having fill-out forms with the presently stored user registration information presented in the forms so that the user may change any of the fields on this page(s).

Note that in at least one embodiment of the present invention, the user is allowed to change his/her registrar user ID and/or password. However, it may be the case that when a user changes his/her registrar user ID, that the new requested user ID has already been assigned to another registrar user. Thus, the registrar web site 100 may respond with a request for further information (such as a request for a different user ID from the user) wherein when the user submits the additional information, the registrar web site 100 again checks to determine if the user is uniquely identifiable. Note that the loop of steps 1120 and 1124 are provided to represent the iterative process described here of changing the user's user ID. Further note that in some embodiments of the present invention, the registrar web site 100 may respond with alternative variations for a new user ID so that the user is not left to guess at a registrar user ID that is acceptable for uniquely identifying the user.

Returning now to step 1104, if the user's registration information is stored locally at the user's client node 108, then step 1128 is performed instead of the steps 1108–1124. However, for simplicity, a discussion of the processing performed in step 1128 is not described in detail here. Instead, a detailed discussion of this step is provided by FIG. 12 and the discussion of FIG. 12 hereinbelow for changing the registration information at the user's client node 108 and for transmitting the changes to the registrar web site 100.

Regardless of the branch of processing taken from step 1104, eventually step 1132 and the subsequent steps of FIG. 11B are encountered wherein the present invention updates or alerts third party web sites having previously received user registration information that this information may be outdated. Thus, the steps 1132–1140 are performed so that the registration information provided to such third party web sites via the present invention is consistent with the newly supplied user registration information. However, in at least one embodiment of the present invention, prior to providing any newly entered user registration information to the third party web sites, such information may be compared or correlated with publicly available information regarding the user that is, for example, accessible via certain third party web sites 116. Further, the user may request his/her newly entered registration information by supplied to only selected web sites to which the user is registered, or alternatively, the user may request that the newly entered registration information be supplied to all web sites to which the user is registered.

Figure 12B:
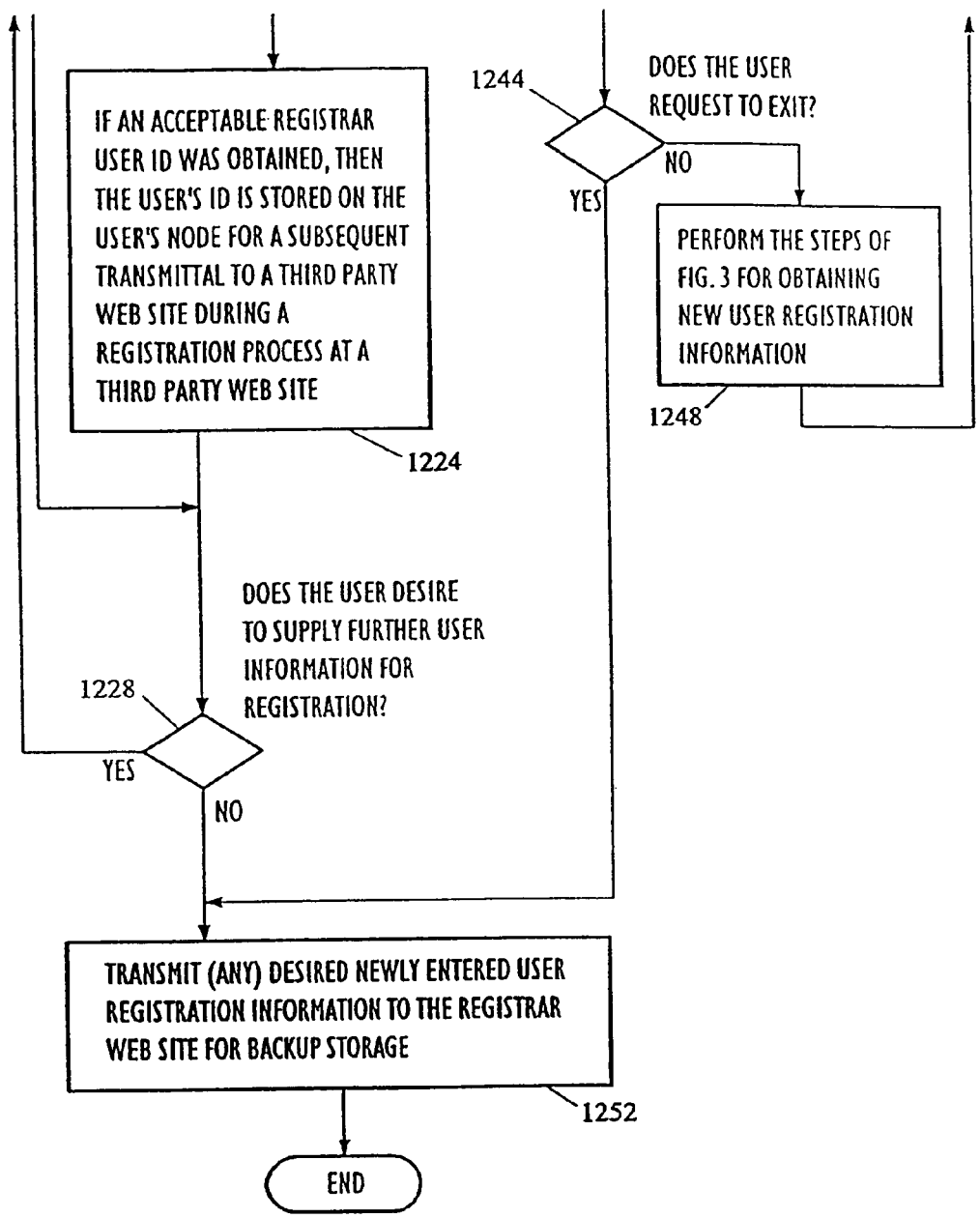
Figure 13B:
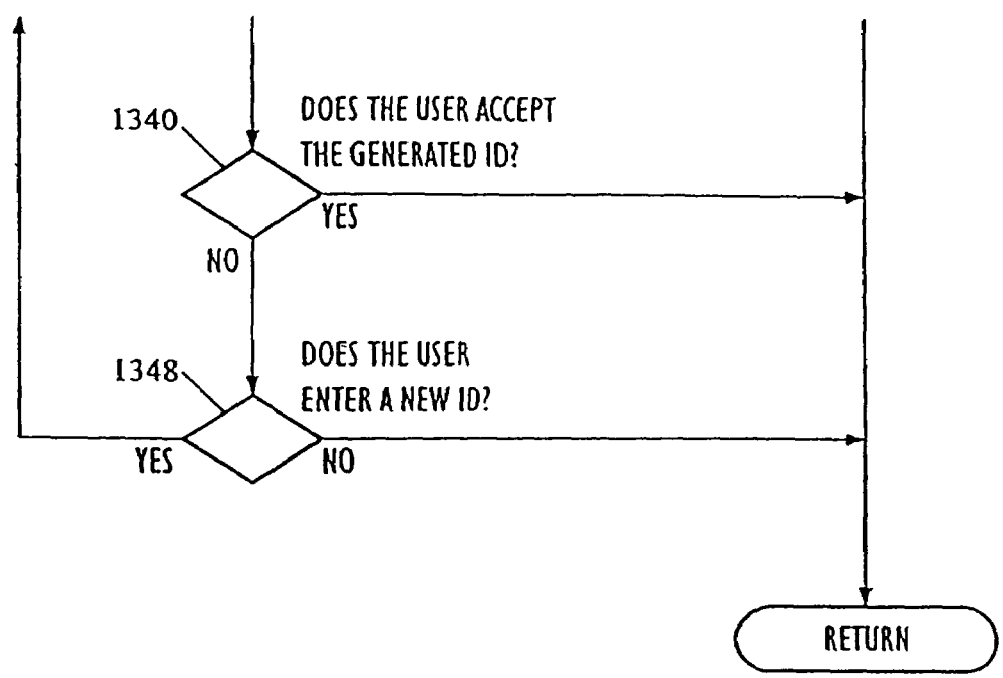

FIG. 12 presents a flowchart of the steps performed when the registrar registration module 156 is provided at the client node 108 and the user enters registration information into this module. Note that the steps of this flowchart may be performed when the user is entering registration information for registering the user with registrar, or when modifying registration information already supplied to registrar. Accordingly, in step 1204 the user requests activation of the registrar registration module 156 on the user's client node 108 for entering information that will subsequently be used for registering substantially automatically cooperating at third party web sites 116 requested by the user. Subsequently, in step 1208 the registrar registration module 156 on the user's client node 108 presents the user with one or more fill-out forms for the user to provide new registration information. Following this, in step 1212 a determination is made as to whether the user requests to obtain a registrar user ID. If so, then in step 1216 the program corresponding to the flowchart of FIG. 13 is performed to provide the user with a valid registrar user ID and optionally password. Subsequently, in step 1220 a determination is made as to whether the program of FIG. 13 returns a valid registrar user ID. If so, then step 1224 is performed wherein the new user's registrar ID is stored on the user's node 108 for a subsequent transmittal to a third party web site during a registration process at a third party web site that accepts the registrar user ID as the web site's ID. Subsequently, regardless of the path taken from step 1220, step 1228 is encountered wherein a determination is made as to whether the user desires to enter further user registration information.

If the user desires to enter further information, then step 1212 is again encountered and a determination is made once again as to whether the user requests to obtain a registrar user ID. However, it is important to note that the steps provided in this flowchart are only an indication of the processing provided by the registrar registration module 156 and the user's browser. In particular, since the user interfaces typically used by World Wide Web browsers allow a user to select the fill-out form fields to modify, the positive branch from step 1212 is taken only when the user enters information in a fill-out form field indicating that a registrar user ID is requested. Similarly, the negative branch from step 1212 is taken whenever user information is entered into other fill-out form fields unrelated to obtaining a registrar user ID.

Accordingly, if the user desires to enter other information than that required to obtain a registrar user ID, then from step 1212, step 1232 is encountered wherein the registrar registration module 156 explicitly requests the user's registrar registration user ID (and optionally password). Subsequently, in step 1236, assuming the user enters a registrar user ID, a determination is made as to whether the registrar user ID is valid. Note that this determination is initially made locally at the user's client node 108 without contacting the registrar web site 100. However, in one embodiment of the present invention, it is an option that if the registrar user ID entered is not found in the client node 108, then the registrar registration module 156 may inquire of the user as to whether he/she desires the registrar web site 100 to be interrogated for the registrar user ID and password and, if found, download the user's registration information to the user's client node 108. If no valid registrar user ID is determined in step 1236, then the program ends in step 1240. Alternatively, if a valid registrar user ID is obtained, then in step 1244 a determination is made as to whether the user requests to exit the present program and thereby stop supplying registration information. Note that this step is similar to step 1212 in that if the user continues to enter registration information in fill-out form fields, then the negative branch from this step is followed and, alternatively, if the user, for example, activates an exit button on the user interface, then the positive branch from step 1244 will be followed. Accordingly, if the negative branch is followed, then in step 1248 the program of FIG. 6 is performed for obtaining new user registration information and, subsequently, step 1212 is encountered (or, more precisely, the user interface is provided that allows the user to request a registrar user ID).

Alternatively, if the positive branch is taken from step 1244, then step 1252 is encountered wherein the registrar registration module 156 transmits (or schedules the transmission of) any newly entered user registration information that the user desires to be transmitted to the registrar web site 100 for backup storage. Thus, in one embodiment of the present invention, the step 1252 provides the user with the option to discard the registration information provided in step 1248 above instead of transmitting this information to the registrar web site 100.

In FIG. 13, a flowchart is presented of the program for obtaining a registrar user ID and optionally password for the embodiment of the present invention wherein the registrar registration module 156 retains the user's registrar user ID (and optionally password) for automatically providing to third party web sites at which the user requests registration using the present invention. Accordingly, in step 1308 the registrar registration module 156 requests the user to select a registrar user ID and optionally a password that can be used to access the user's registration information at both the user's client node 108 and at the registrar web site 100. Assuming that the user enters a user ID and optionally password in step 1308, in step 1312 the registrar registration module 156 transmits the user selected ID and optionally password to the registrar web site 100. Subsequently, in step 1316 a determination is made by the registrar application 128 as to whether the user's selected user ID and optionally password are acceptable to the registrar web site. That is, a registrar application 128 accesses the user registration information database 144 to determine if the selected user ID is sufficiently unique. Note that other steps may be performed between steps 1308 and 1312. For example, the syntax for user IDs and optionally passwords may be checked at the module 156 prior to transmitting the user's selected registration information to the registrar web site 100.

Continuing with step 1316, a determination is made at the registrar web site 100 as to whether the user's selected user ID and optionally password are acceptable to registrar. If so, then in step 1320 a registration application 128 stores the user's ID and optionally password in the user registration information database 144. Note that since it is unlikely that any further information related to the present user is stored at the registrar web site, the process of storing the user's user ID and optionally password includes creating a new record in the database 144 and marking all remaining fields related to registration information for this user to indicate that these fields are as yet not valid. Following this, in step 1324 a registrar application 128 transmits a message to the user's WWW browser 120 indicating that the user's selected user ID and optionally password is acceptable to registrar.

Alternatively, if the negative path is taken from step 1316, then step 1336 is encountered wherein a registrar application 128 attempts to generate an acceptable user ID and optionally password as a substitute for the user's proposed user ID (and optionally password). Note that in generating alternative registration information, the registrar application 128 may use the user supplied information as the basis or "seed" for generating an acceptable user ID (and optionally password) to be transmitted back to the user. Accordingly, in step 1340, once the user is presented with the newly generated registration information on the user's client node 108, the registrar registration module 156 provides the user with the option to accept or reject the generated information. If the user accepts the generated registration information, then the flowchart ends. Alternatively, if the user rejects this information, then in step 1348 a further determination is made by the module 156 as to whether the user enters a new user ID (and optionally password) as an alternative to the generated registration information. If such new user registration information is provided, then step 1312 and steps thereafter are again performed in attempting to provide a registrar user ID (and optionally password) to the user. Alternatively, if the user indicates in step 1348 that no further proposed candidates for a user ID (and optionally password) will be forthcoming, then the flowchart ends without an acceptable registrar user ID being obtained.

The foregoing discussion of the invention has been presented for purposes of illustration and description. Further, the description is not intended to limit the invention to the form disclosed herein. Subsequently, variation and modification commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

The invention claimed is:

1. A computer server configured to facilitate secure access to at least one third party web site by a user using a common user identifier wherein the common user identifier is used by both the computer server and the at least one third party web site to identity the user comprising:

a first software module configured for storing user registration information and a common user identifier associated with the stored user registration information;

a second software module, operatively connected to the first software module, configured for communicating the user registration information to at least one third party web site upon receiving, from the at least one third party web site, the common user identifier, wherein the common user identifier is used by both the computer server and the at least one third party web site to identify the user;

whereupon communication of the registration information to the at least one third party web site, the at least one third party web site utilizes the registration information to authenticate the identity of the user when receiving a request, from the user, instructing the at least one third party web site to perform a given action.

2. A method for registering a user with a third party web site, by utilizing user registration information provided to a registration web site, comprising:

by a third party web site:

receiving a request from a user to access the third party web site;

determining whether the user is registered with the third party web site;

when registered with the third party web site, allowing the user to access the third party web site; and when not registered with the third party web site, further comprising:

providing the user with an option to register directly with the third party web site; and providing the user an option to register using a registration web site by:

directing the user to register with a registration web site;

receiving a notification that the user has registered with the registration web site;

obtaining user registration information from the registration web site; and utilizing the obtained user registration information to register the user with the third party web site.

3. The method of claim 2 further comprising receiving a user identifier and user password established with the registration web site.

4. The method of claim 3 further comprising establishing a connection between the user and the registration web site; wherein, via the connection, user registration information is provided to the registration web site; and a user identifier and user password are associated with the information provided to the registration web site.

5. The method of claim 4 further comprising providing the user identifier and user password to the registration web site prior to obtaining user registration information from the registration web site.

6. The method of claim 5 further comprising providing a third party web site identifier to the registration web site prior to obtaining user registration information from the registration web site.

7. The method of claim 2 wherein the third party web site is accessed via the registration web site.

8. A system for facilitating the utilization, by a user, of a third party web site using user registration information provided, by the user, to a registration web site, comprising:

a first server configured to present a third party web site to a user; and a second server, in communication with the first server, configured to host a registration web site;

wherein upon establishment of a connection between a user client node and at least one of the first server and the second server, the user directs the third party web site to perform a predetermined action by inputting a user identifier and a user password, wherein the user identifier and the user password are associated with user registration information previously provided to the registration web site; whereupon input of the user identifier and the user password the third party web site authenticates the input and, when valid, the third party web site obtains the third party web site the necessary user registration information from the registration web site and performs the predetermined action.

9. The system of claim 8 wherein the first server and the second server are collocated.

10. The system of claim 8 further comprising a registration web site database adapted to store the user identifier, user password and user registration information.

11. The system of claim 10 further comprising a third web site database adapted to store the necessary user registration information obtained from the registration web site.

12. The system of claim 11 wherein the necessary user registration information comprises a subset of the user registration information stored in the registration web site database.

13. The system of claim 8 wherein the client node establishes a connection with at least one of the first server and the second server via the Internet.

\* \* \* \* \*

UNITED STATES PATENT AND TRADEMARK OFFICE
CERTIFICATE OF CORRECTION

| | | |
|---|---|---|
| PATENT NO. | : 7,529,725 B1 | Page 1 of 1 |
| APPLICATION NO. | : 11/032754 | |
| DATED | : May 5, 2009 | |
| INVENTOR(S) | : John R. Klug and Thad D. Peterson | |

It is certified that error appears in the above-identified patent and that said Letters Patent is hereby corrected as shown below:

Claim 8 (column 20, lines 30 and 31) - delete the second occurrence of "the third party web site" appearing on line 30.

Signed and Sealed this

Sixteenth Day of November, 2010

David J. Kappos
*Director of the United States Patent and Trademark Office*